United States Patent
Sasin et al.

[11] Patent Number: 6,011,830
[45] Date of Patent: Jan. 4, 2000

[54] OPERATIONAL TEST DEVICE AND METHOD OF PERFORMING AN OPERATIONAL TEST FOR A SYSTEM UNDER TEST

[75] Inventors: Tiberius Sasin; Steffen Hermanns, both of Aachen; Dieter Kreuer, Düren, all of Germany

[73] Assignee: Telefonaktiebolaget LM Ericsson, Stockholm, Sweden

[21] Appl. No.: 08/987,765

[22] Filed: Dec. 9, 1997

[30] Foreign Application Priority Data

Dec. 10, 1996 [DE] Germany ............... 196 51 334

[51] Int. Cl.⁷ ..................................... H04M 1/24
[52] U.S. Cl. ............................... 379/1; 455/423
[58] Field of Search .................... 379/1–2, 9–11, 379/14–15, 34; 455/423–425, 9, 67.1, 67.4

[56] References Cited

U.S. PATENT DOCUMENTS

| 4,707,849 | 11/1987 | Rault et al. |
| 4,927,789 | 5/1990 | Shirley, Jr. et al. |
| 5,271,000 | 12/1993 | Engbersen et al. ............ 370/244 |
| 5,357,452 | 10/1994 | Pio-di-Savoia et al. ......... 702/108 |
| 5,754,760 | 5/1998 | Warfield ........................ 714/38 |
| 5,809,108 | 9/1998 | Thompson et al. ............. 379/15 |
| 5,875,397 | 2/1999 | Sasin et al. .................... 455/423 |

FOREIGN PATENT DOCUMENTS

| 353759A2 | 2/1990 | European Pat. Off. |
| 418853A2 | 3/1991 | European Pat. Off. |
| 539750A2 | 5/1993 | European Pat. Off. |
| 298206B1 | 2/1995 | European Pat. Off. |
| 689306A2 | 12/1995 | European Pat. Off. |
| 734191A1 | 9/1996 | European Pat. Off. |
| 3130714A1 | 8/1981 | Germany . |
| 3240660A1 | 11/1982 | Germany . |
| 3211967C2 | 1/1984 | Germany . |
| 3212006C2 | 1/1984 | Germany . |
| 3428921A1 | 8/1984 | Germany . |
| 3502564A1 | 1/1985 | Germany . |
| 3706406A1 | 2/1987 | Germany . |
| 4333391C1 | 2/1995 | Germany . |
| 4340968C1 | 2/1995 | Germany . |
| 4311910C2 | 8/1995 | Germany . |
| 69206917T2 | 5/1996 | Germany . |
| WO91/15828 | 10/1991 | WIPO . |
| WO92/03003 | 2/1992 | WIPO . |
| WO94/00932 | 1/1994 | WIPO . |

OTHER PUBLICATIONS

Baker et al., "A Distributed Simulation and Prototyping Testbed for Radio Communication Networks", IEEE Journal on Selected Areas in Communications, vol. 6, No. 1, Jan. 1988, pp. 197–209.

(List continued on next page.)

*Primary Examiner*—Curtis A. Kuntz
*Assistant Examiner*—Duc Nguyen
*Attorney, Agent, or Firm*—Burns, Doane, Swecker & Mathis, L.L.P.

[57] ABSTRACT

The invention relates to an operational test device and a method of executing an operational test for a test system which can assume a number of operating states. A test case generator (TCG) is provided for generating a number of test cases which are sent via a test device interface (INT) to the system under test (SUT). A test state model of the test system is ascertained by a test state model generator (TSTM-G) from information on the hardware configuration of the test system (SUT), information on the possible operating states of the test system (SUT), information on the test commands necessary for bringing about changes in operating state within the test system (SUT), and from traffic values which indicate transitional probabilities ascertained in the test system's real application for the operating states. Test commands are generated on the basis of a Monte-Carlo simulation of this test state model. The operational test device is particularly suitable for use with a Petri net state model for testing a telephone network or in particular a mobile telephone network, such as a GSM network, e.g. for interrupting connection lines therein.

63 Claims, 35 Drawing Sheets

OTHER PUBLICATIONS

Shaikh et al., "Testing Communication Network Routing Algorithms via Statistical Design of Simulation Experiments", European Simulation Multiconference, Nice, France, Jun. 1–3, 1988, pp. 199–203.

Takamatsu et al., "Test Generation for Sequential Circuits Using Parallel Fault Simulation with Random Inputs", Systems & Computers in Japan, vol. 26, No. 10, Sep. 1, 1995, pp. 24–34.

H.D. Desai, "Test Case Management System (TCMS)", IEEE, vol. 3, Nov. 28, 1994, Publication Date Nov. 28, 1994, pp. 1581–1585.

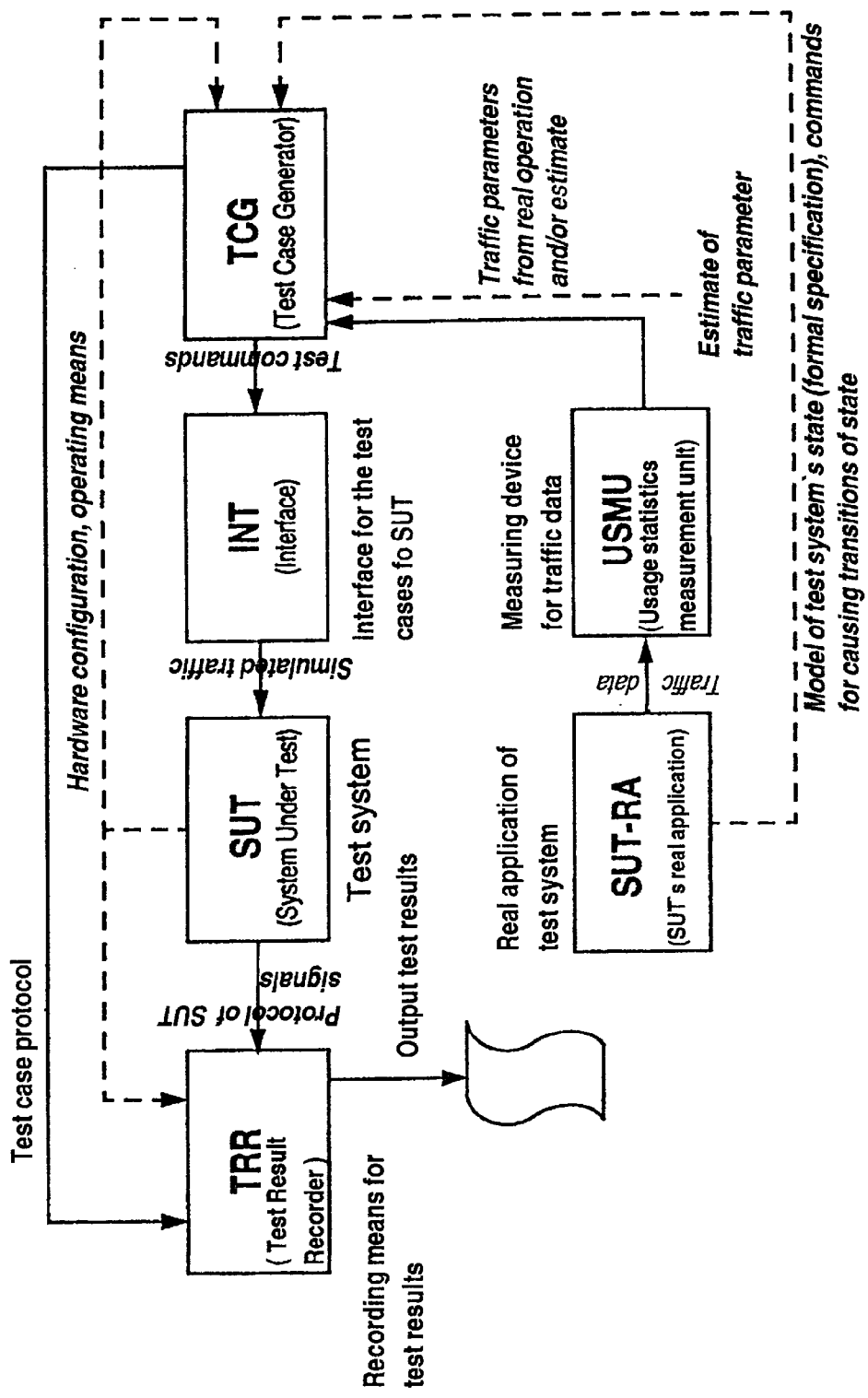
Fig. 1a: general block diagram of the operational system

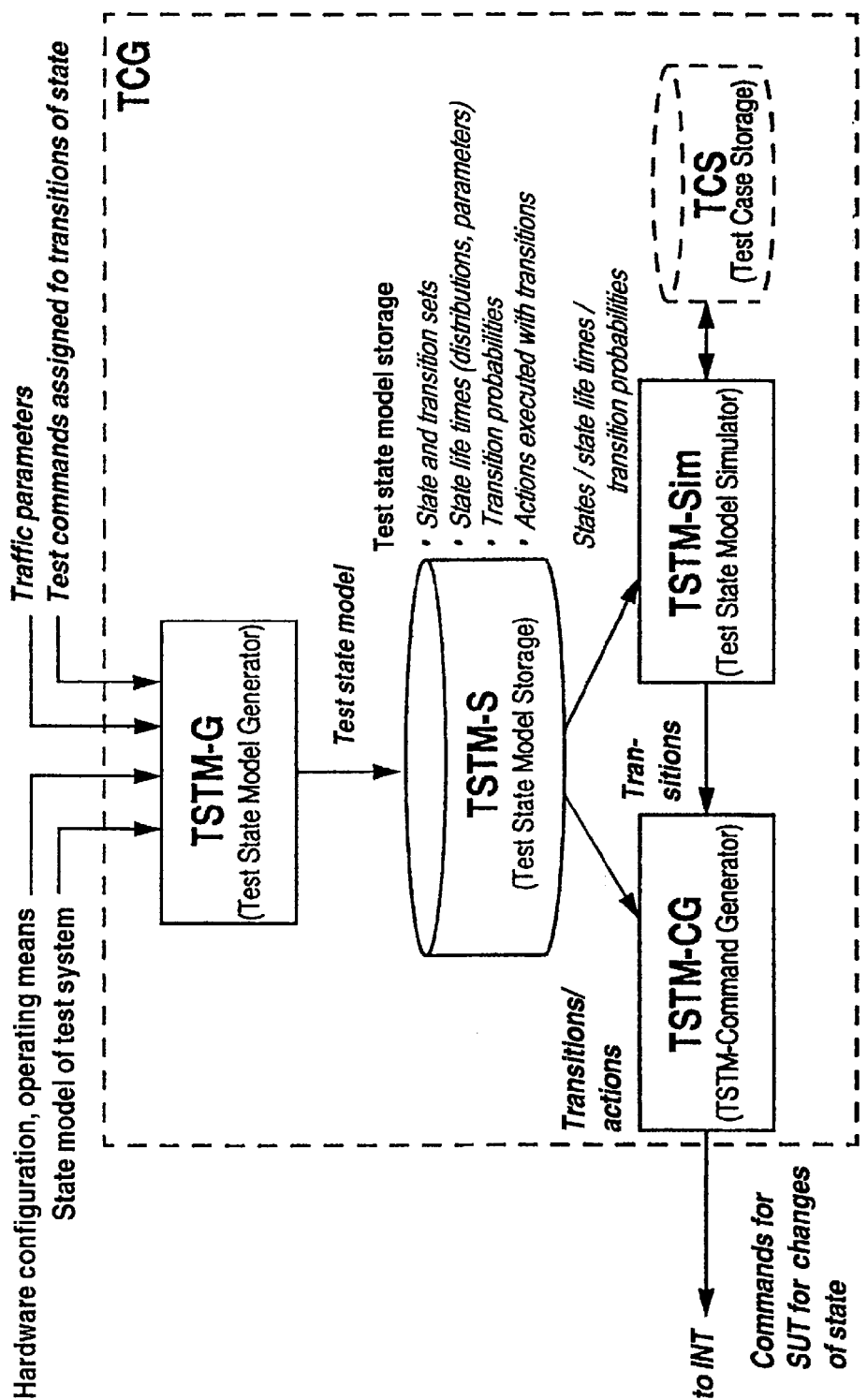
Fig. 1b: Structure of test case generator

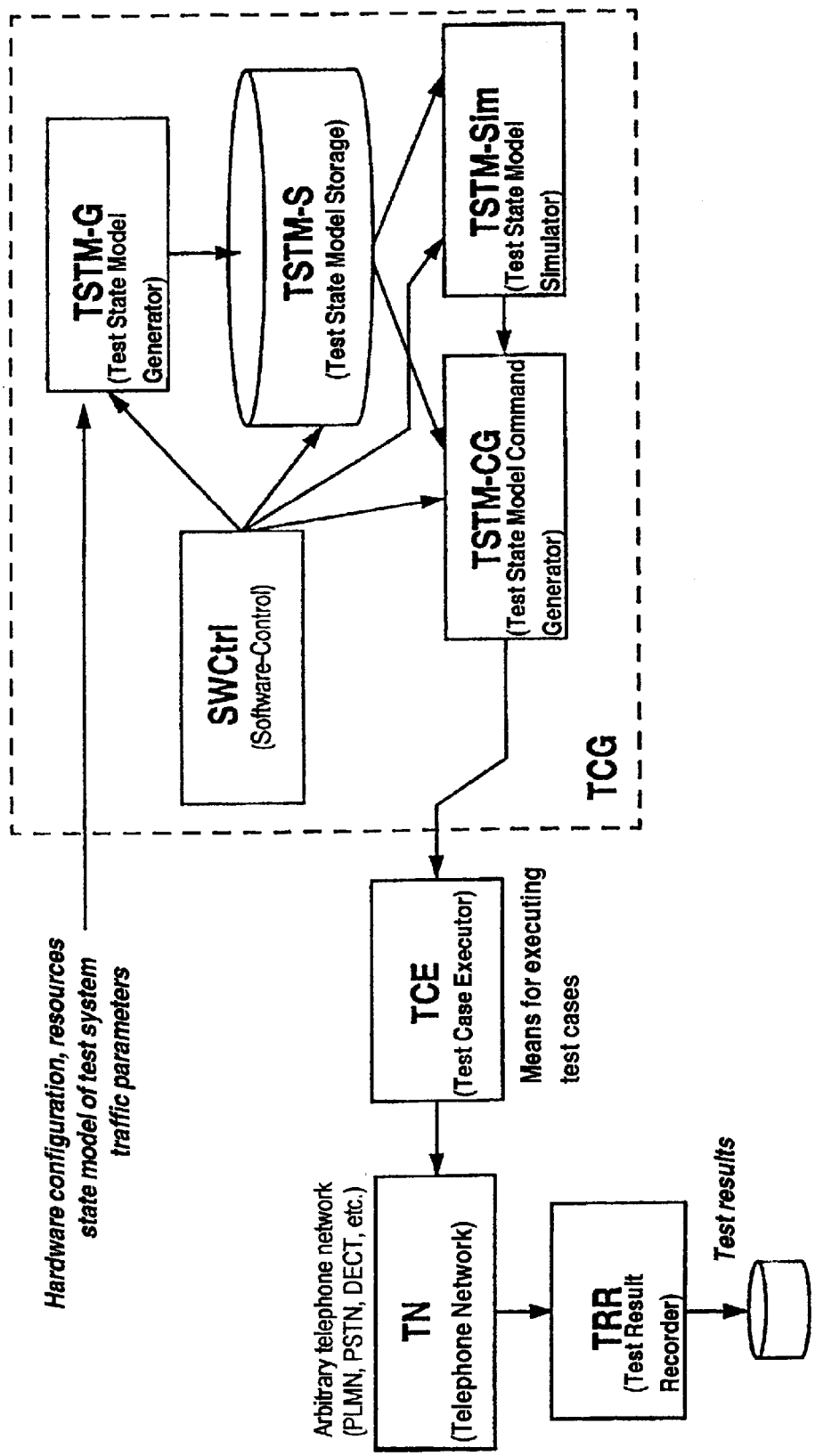
Fig. 2a: Operational test device for testing telephone networks

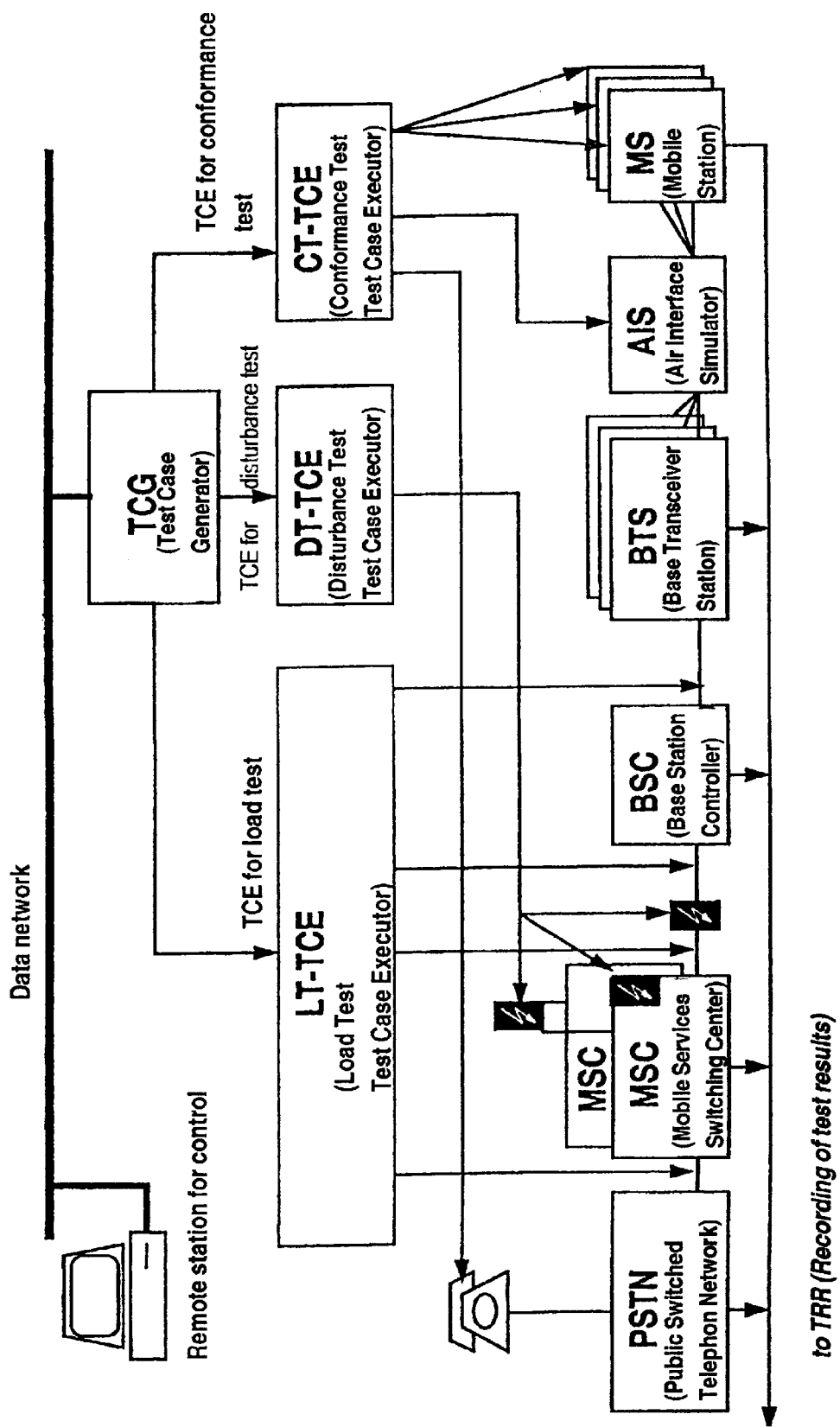
Fig. 2b: Environment for testing a GSM mobile telephone network

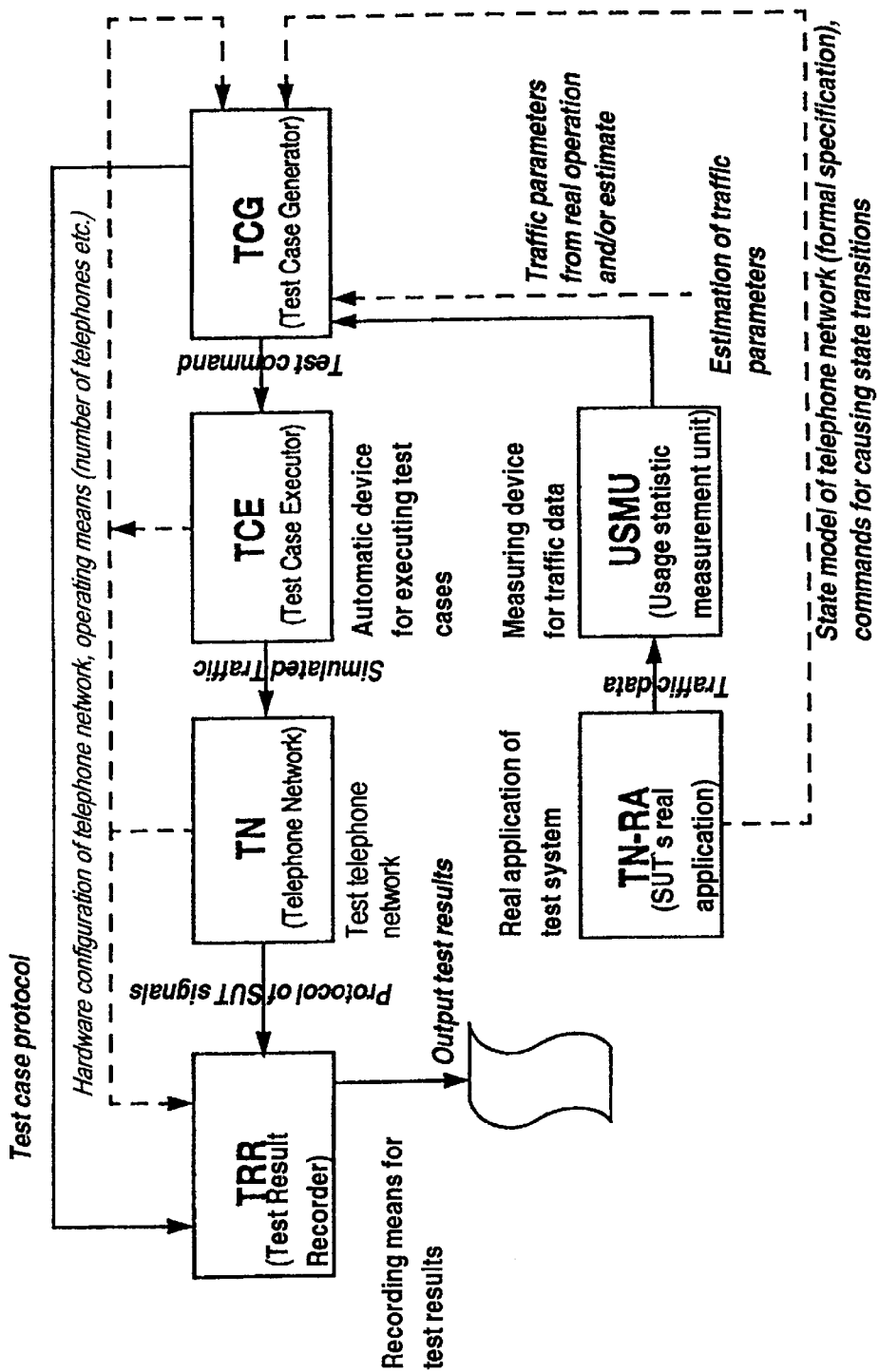
Fig. 2c: Block diagram of operational test device for telephone networks

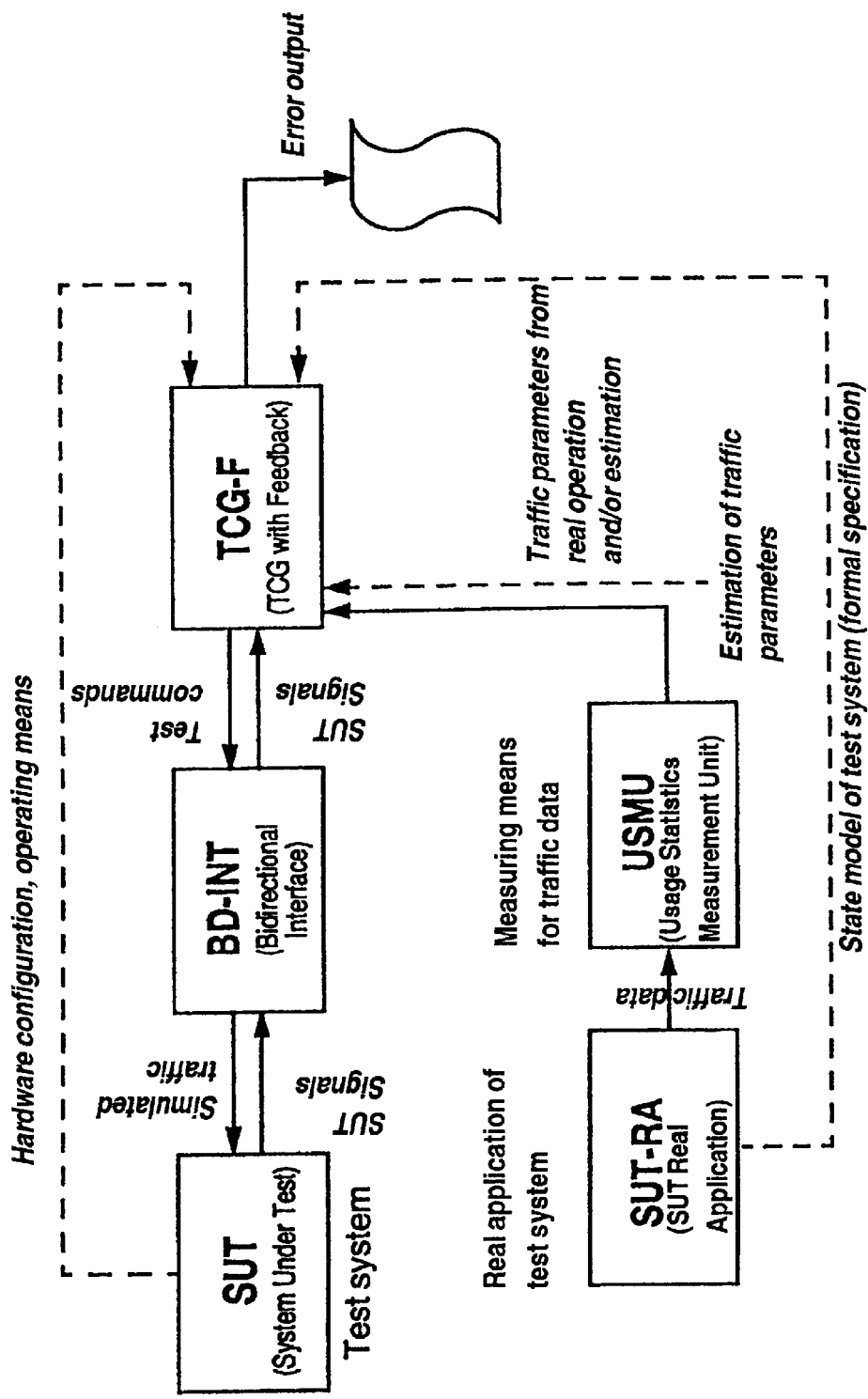
Fig. 3a: Block diagram of the operational test device with feedback

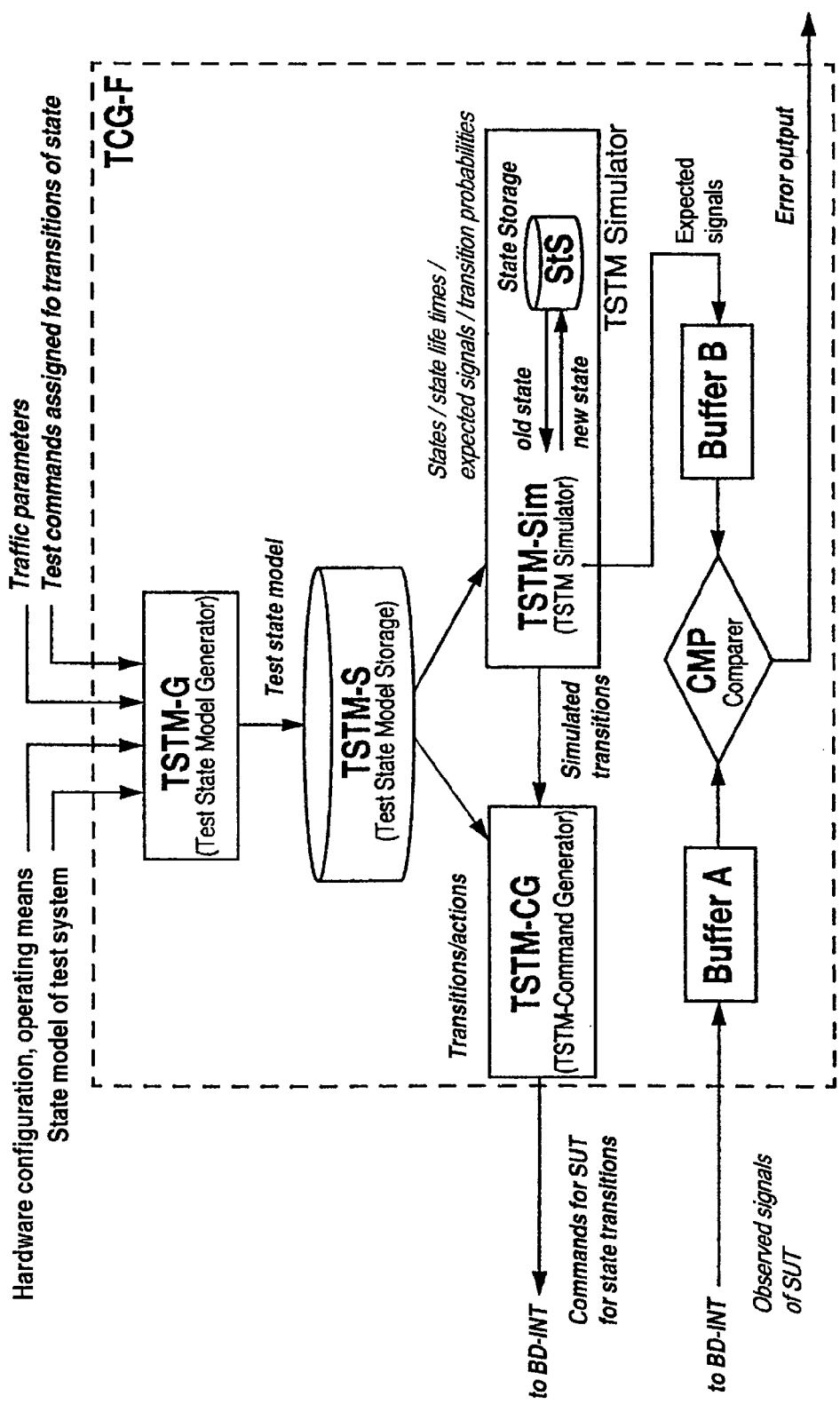
Fig. 3b: Structure of test case generator with feedback

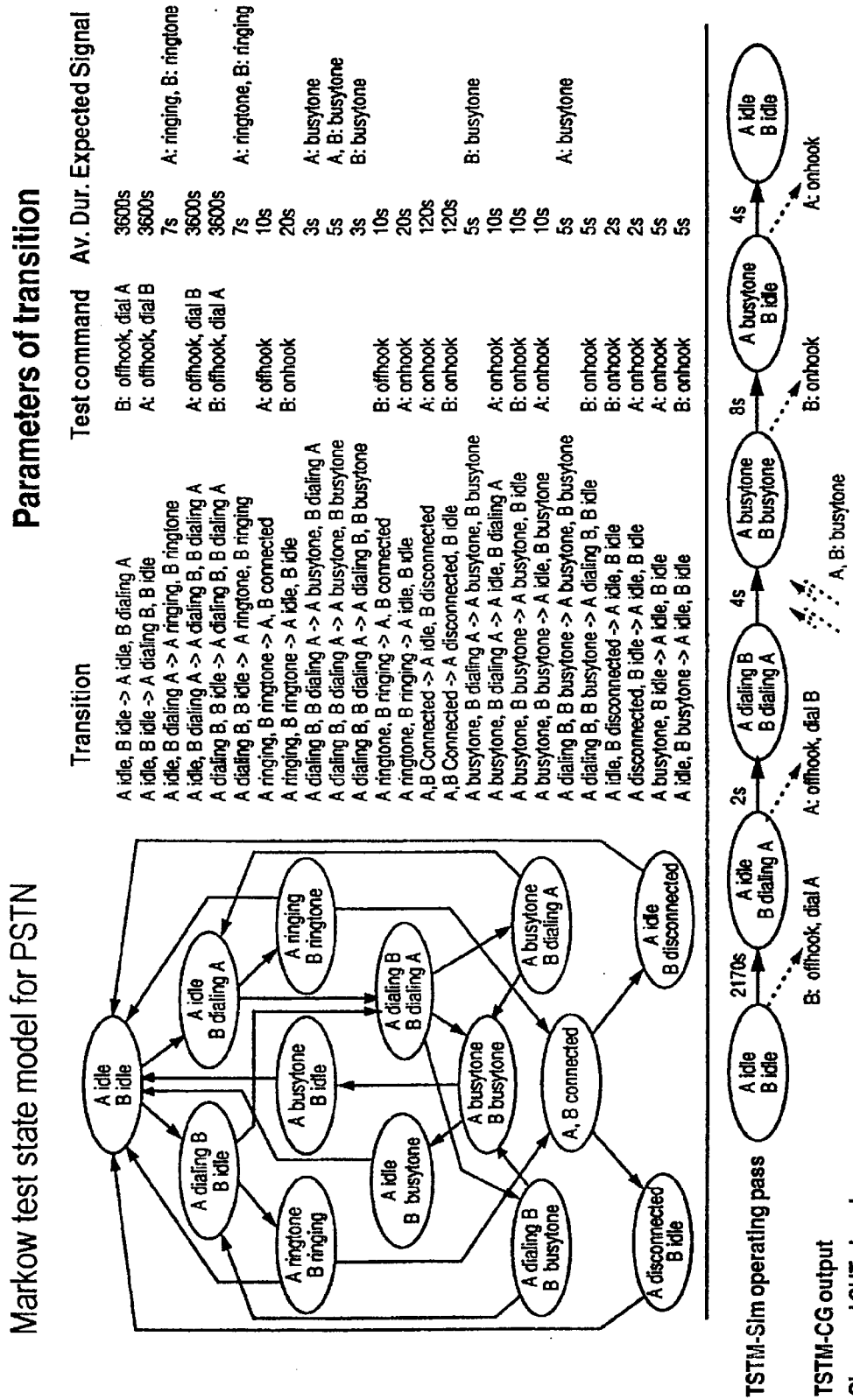
Fig. 3c: Time-continuous Markow chain as test state model

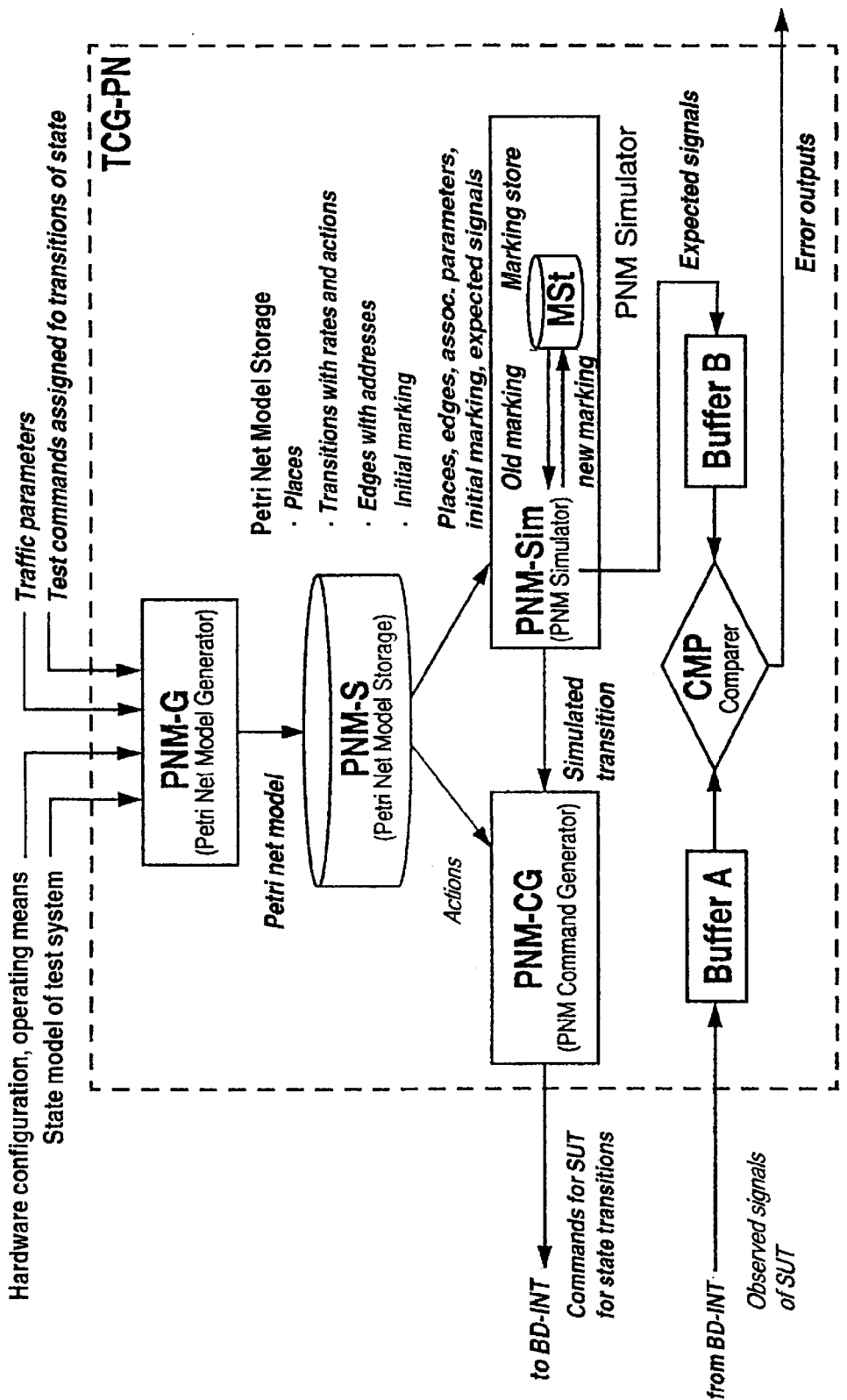
Fig. 4a: Test case generator for Petri net state model

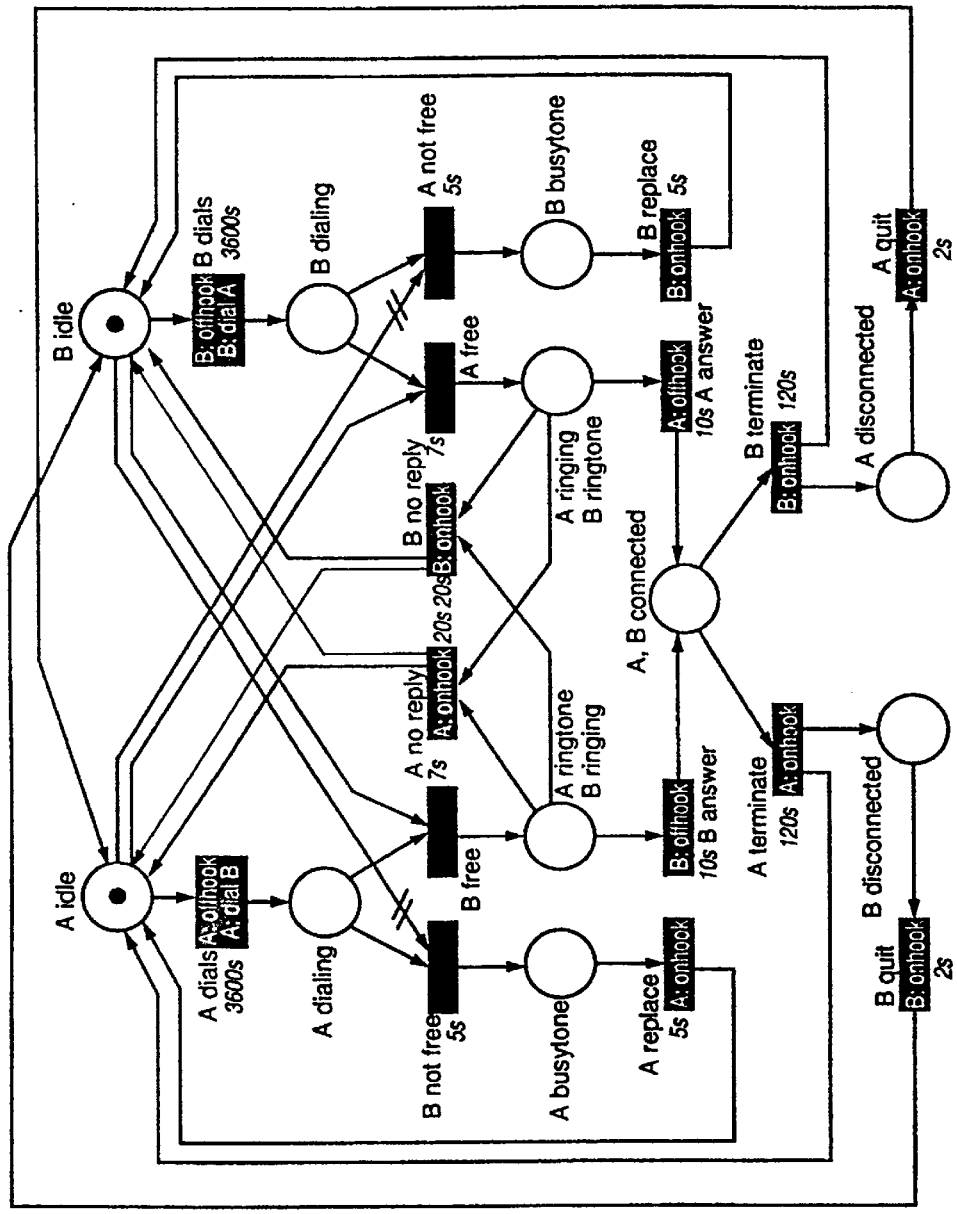
Fig. 4b: Non-colored stochastic Petri net as a test state model

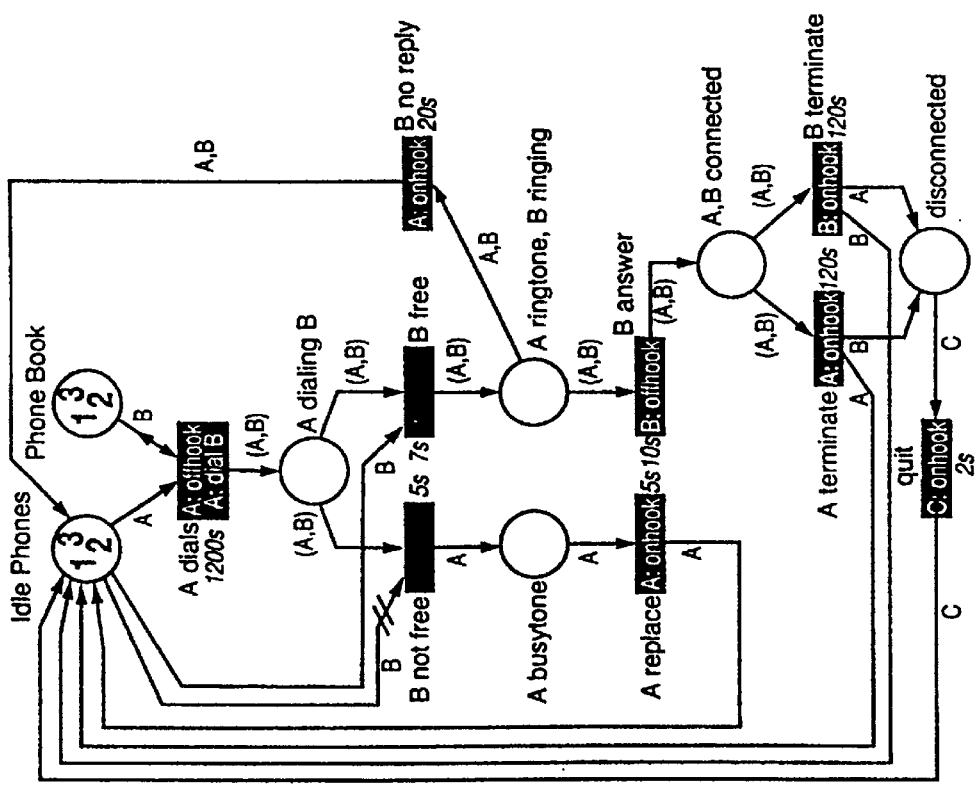
Fig. 4c: Colored stochastic Petri net as a test state model

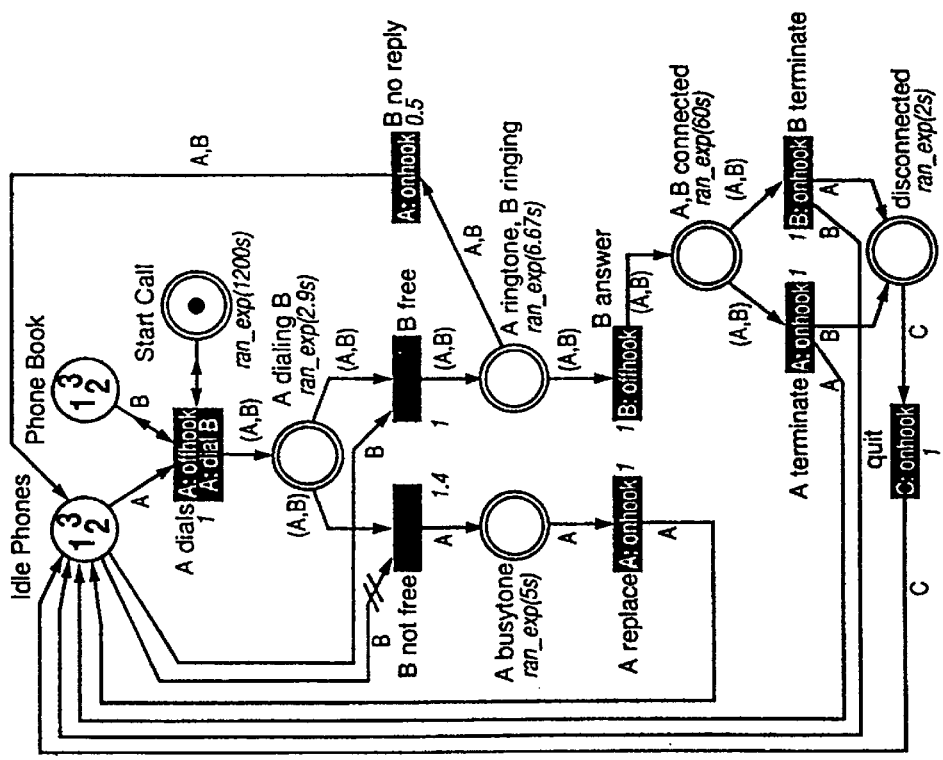
Fig. 4d: Colored Petri net with latency-encumbered places

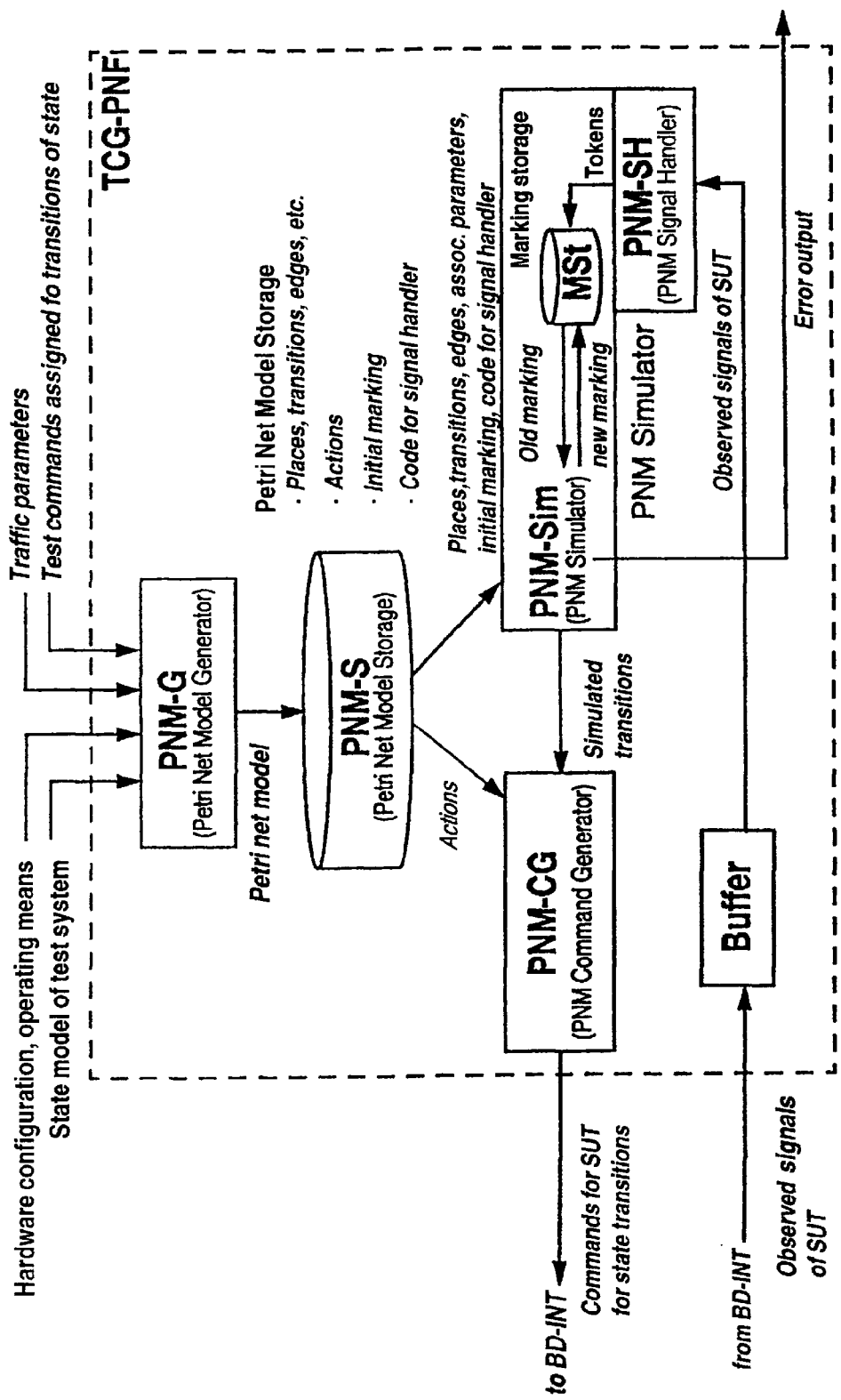
Fig. 5a: TCG for Petri net state models with feedback

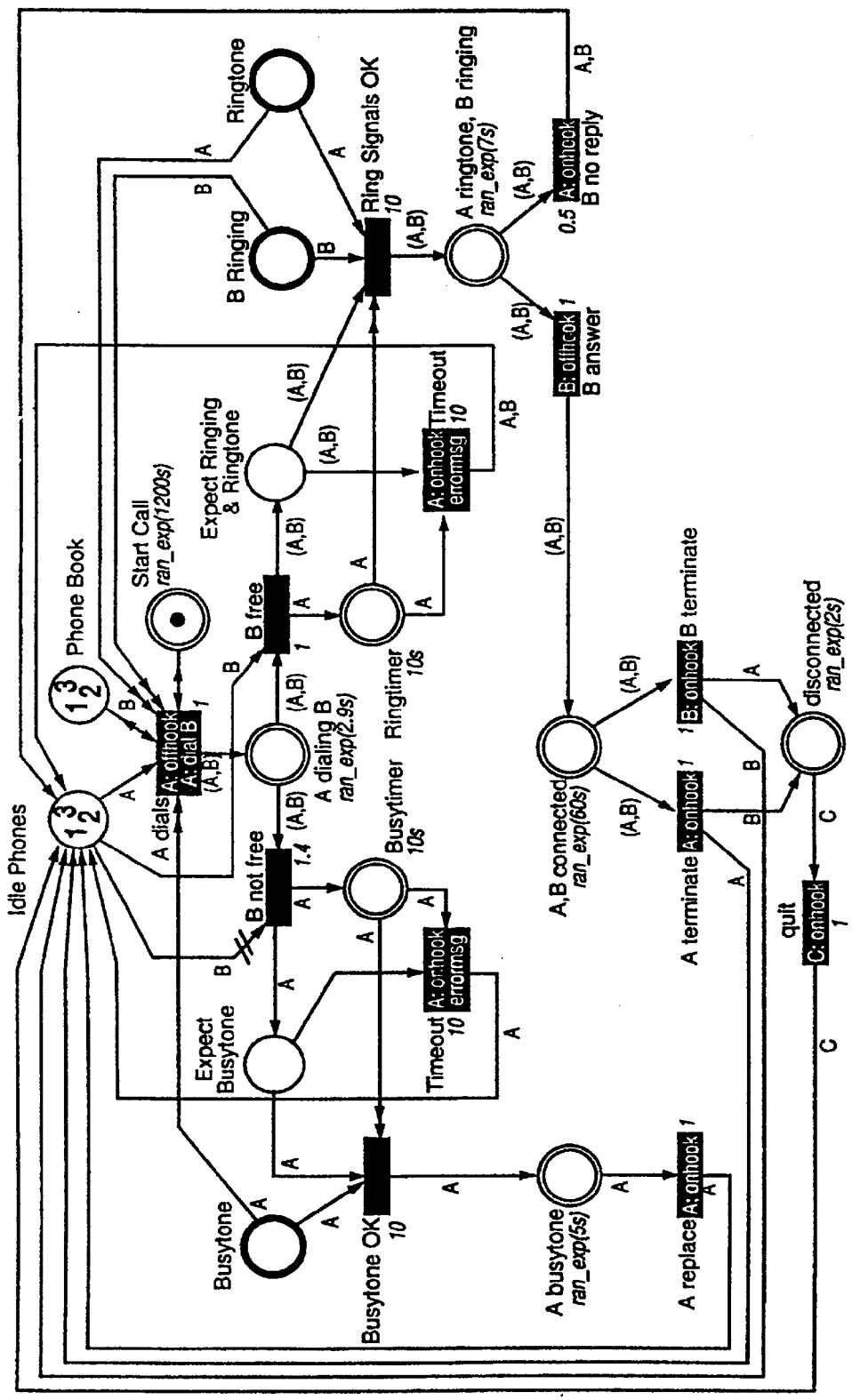
Fig. 5b: Colored Petri net with synchronization places

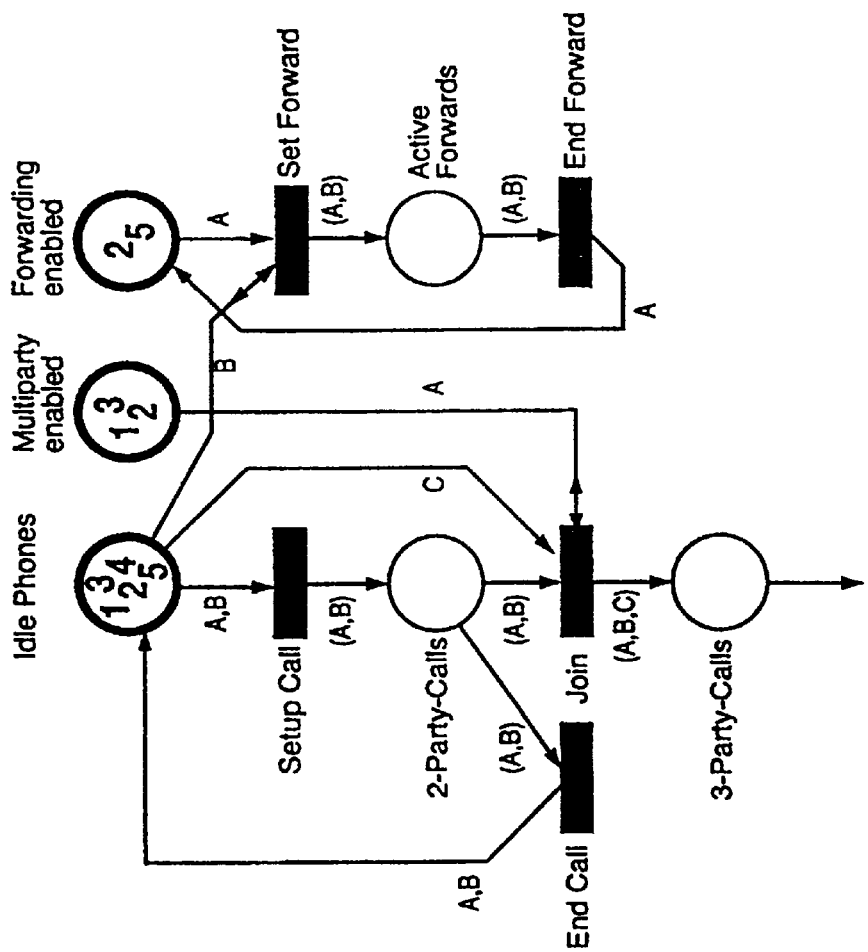
Fig. 5c: Importing of tokens for autoconfiguration

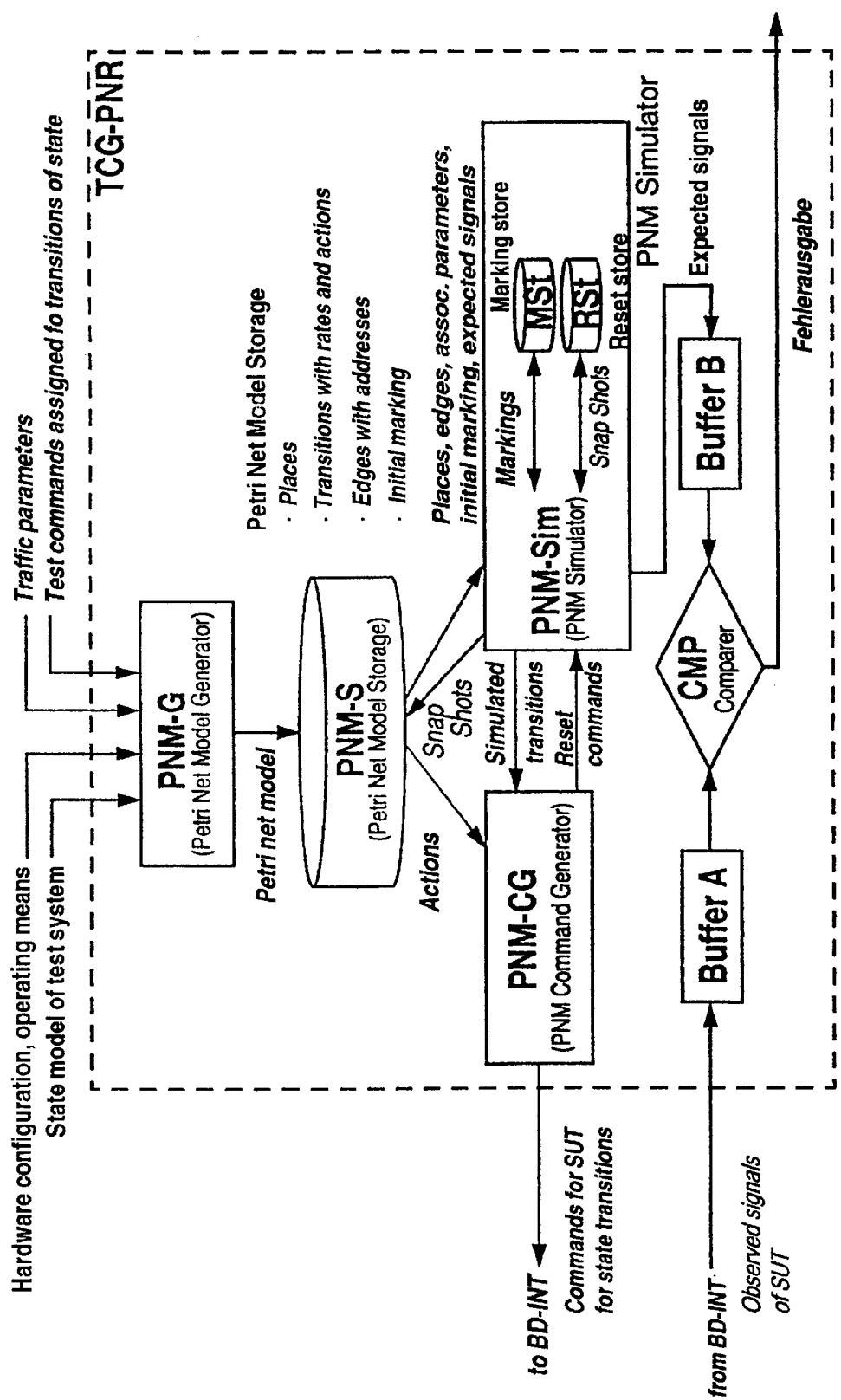
Fig.6 : TCG for Petri net models with reset possibility

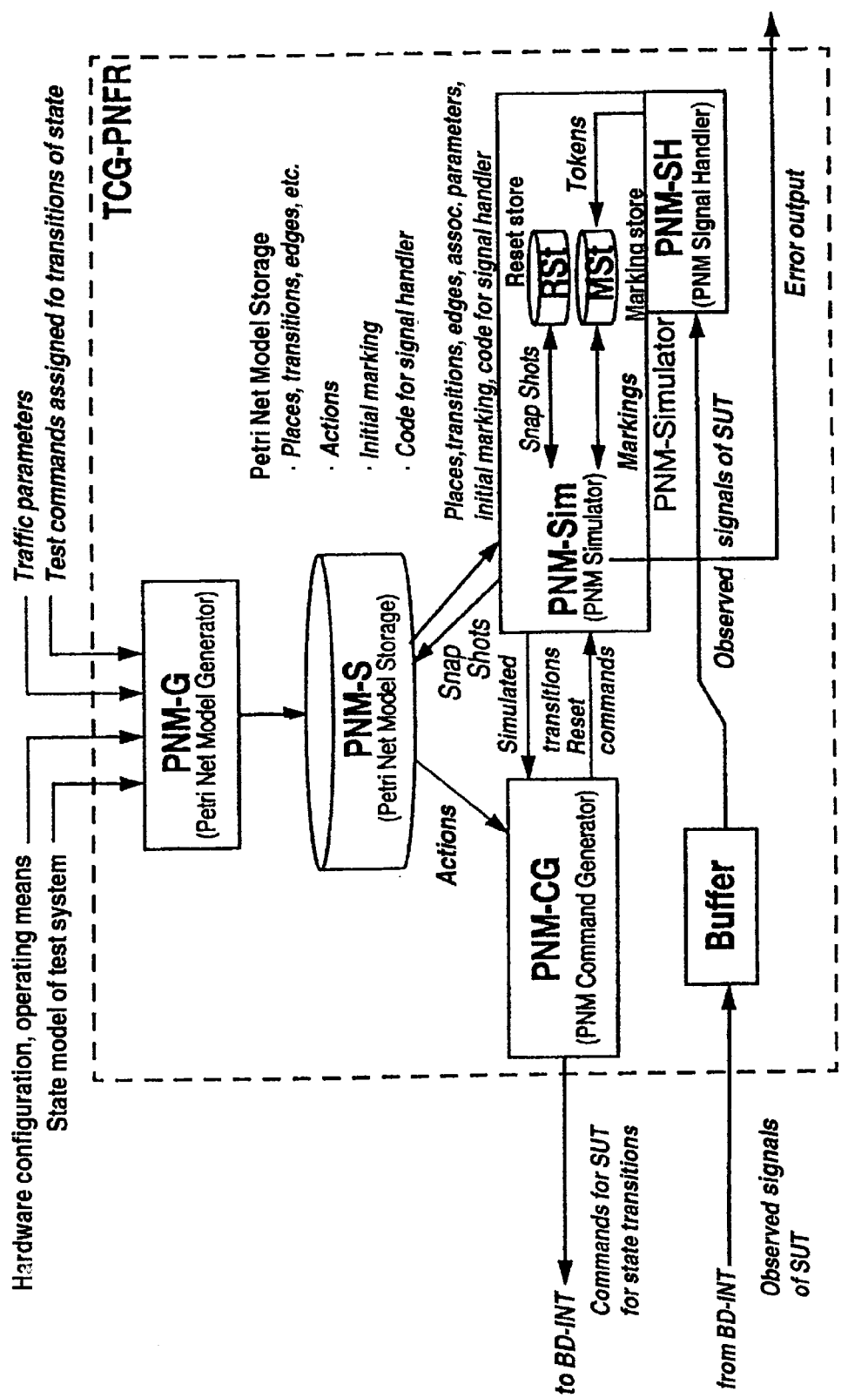
Fig. 7a: Petri net TCG with synchronisation and resetting

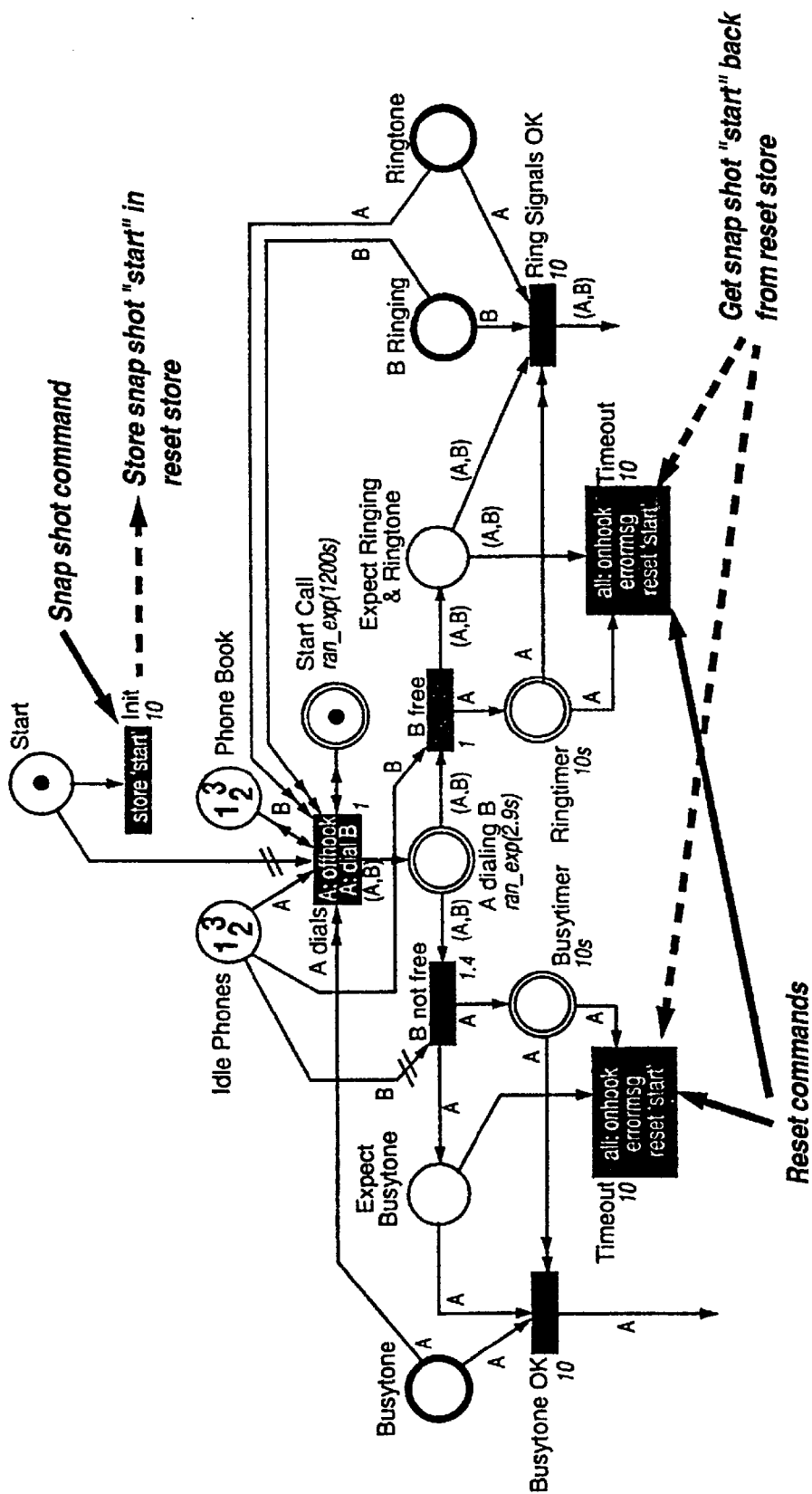
Fig. 7b: Part of network of fig. 5b with resetting at errors

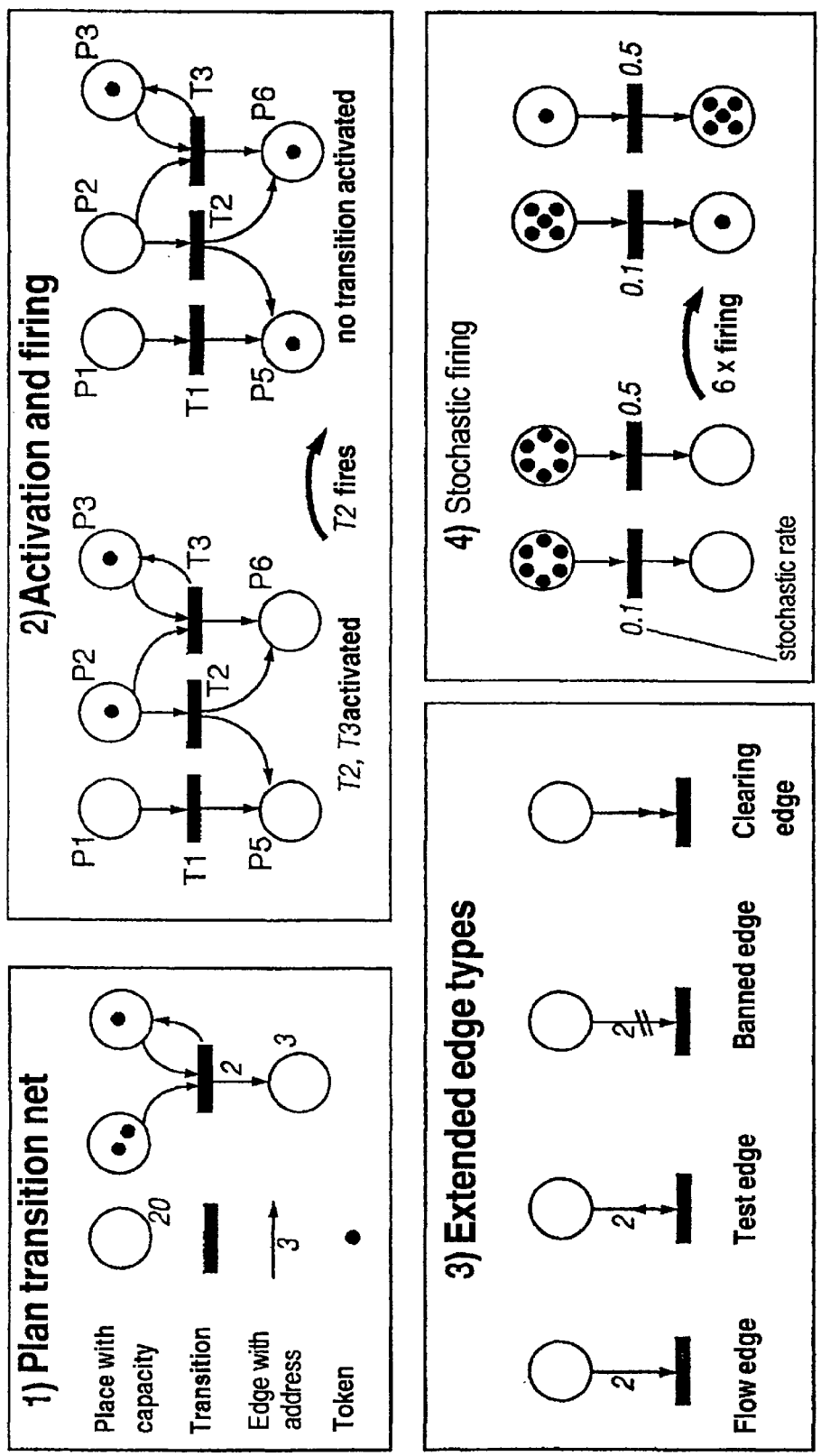
Fig. 8a: Stochsatic Petri nets

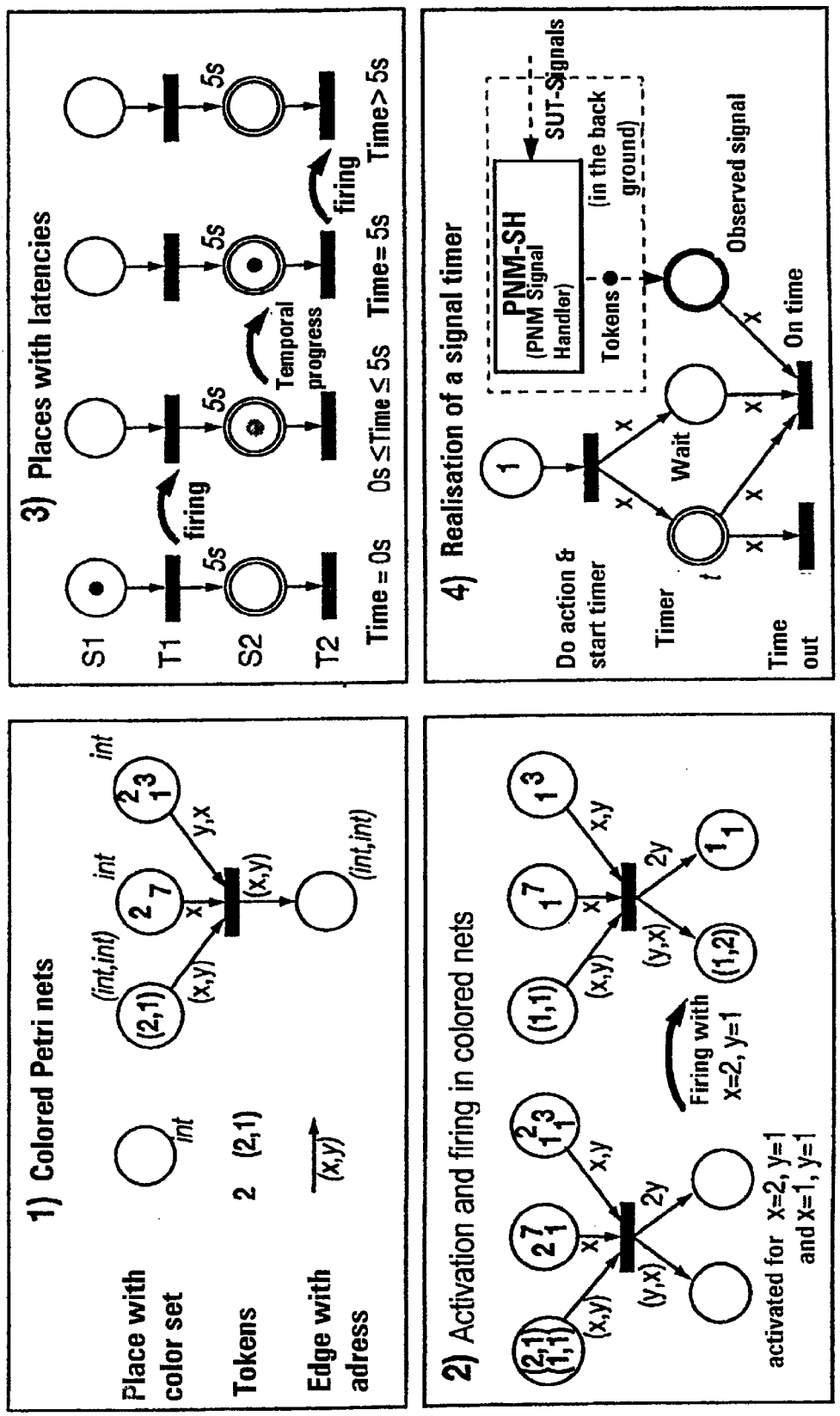
Fig. 8b: Extensions of non-colored stochastic Petri nets

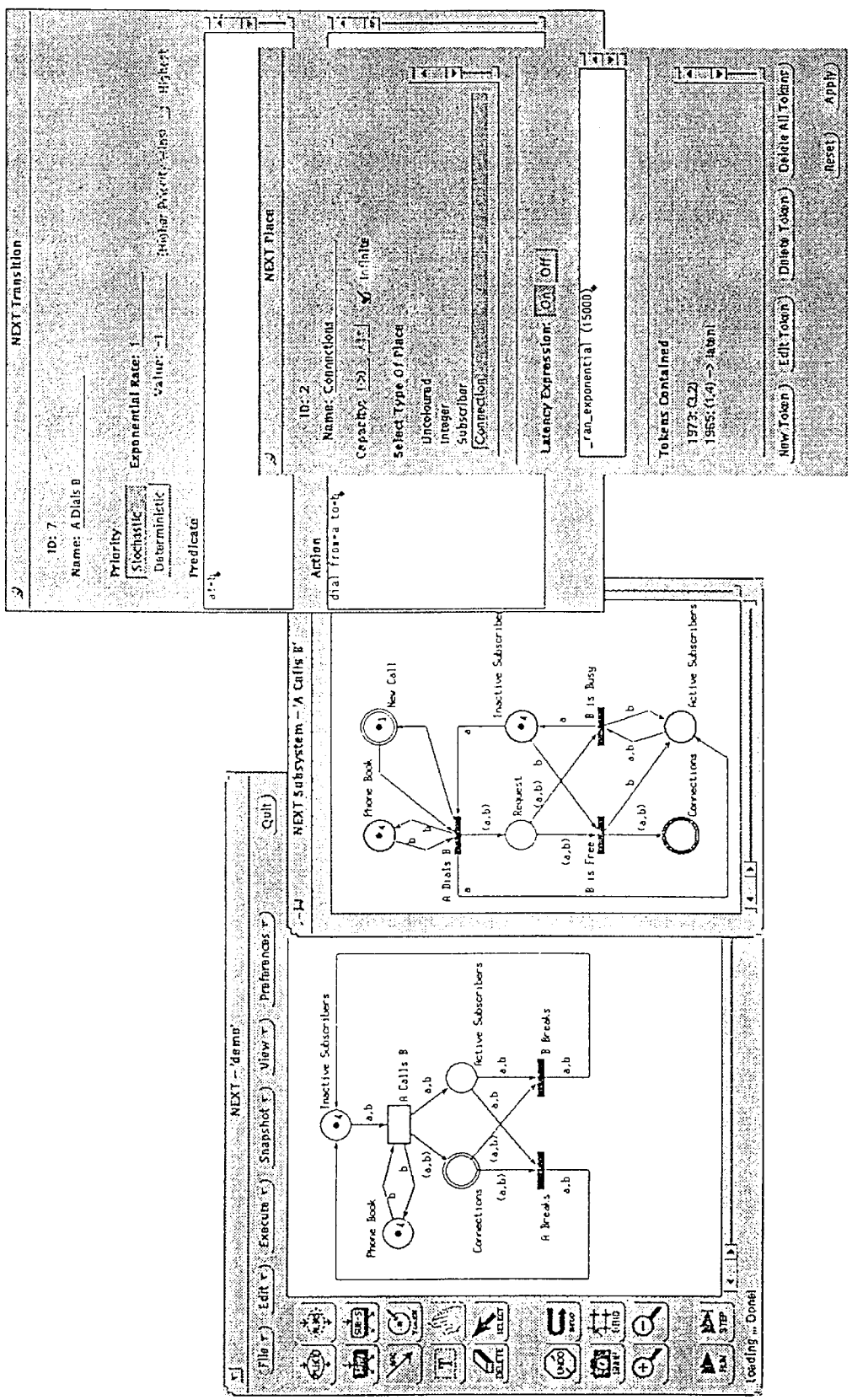
Fig. 8c: Editor view of a Petri net model for a telephone network

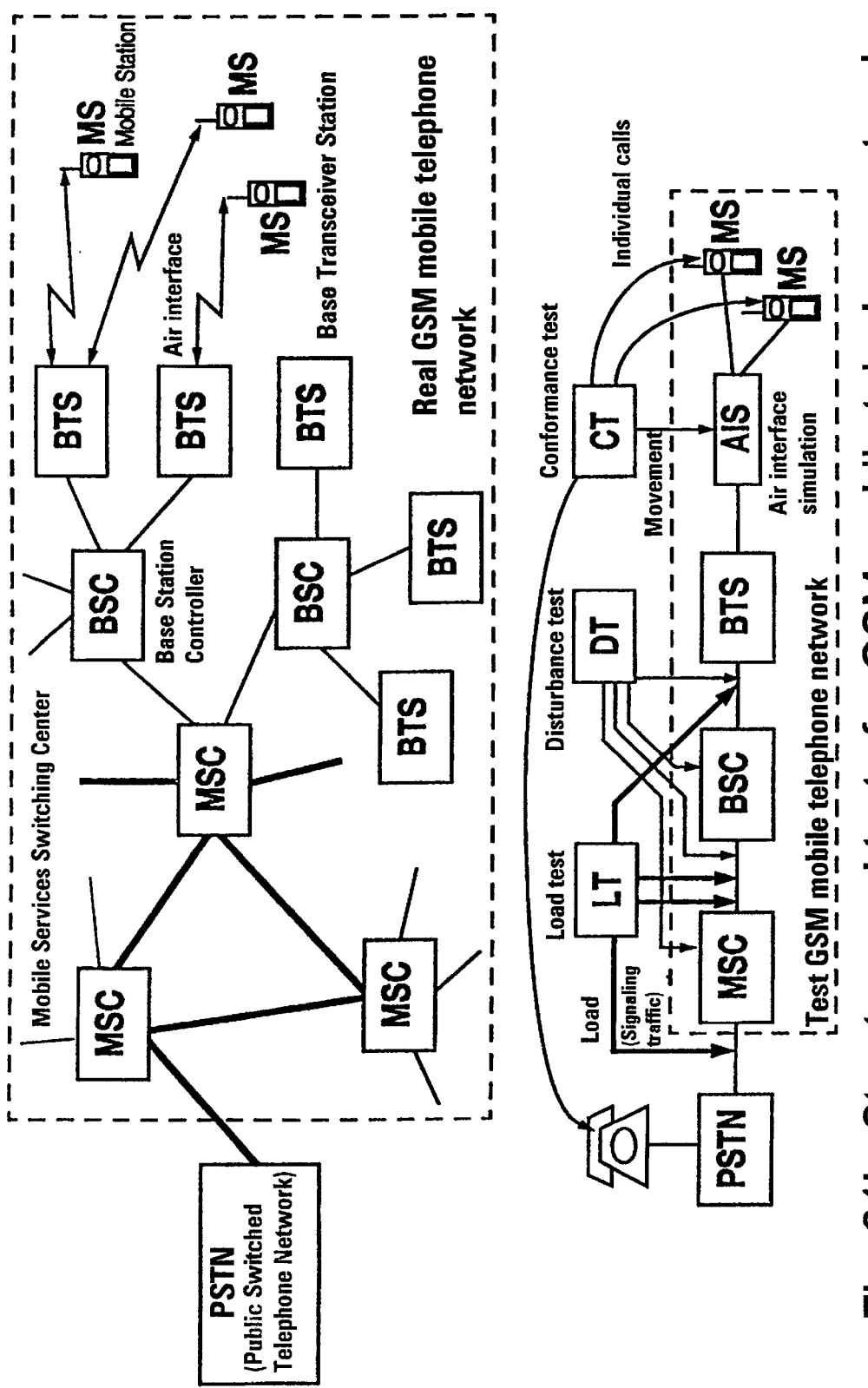
Fig. 21b: Structure and test of a GSM mobile telephone network

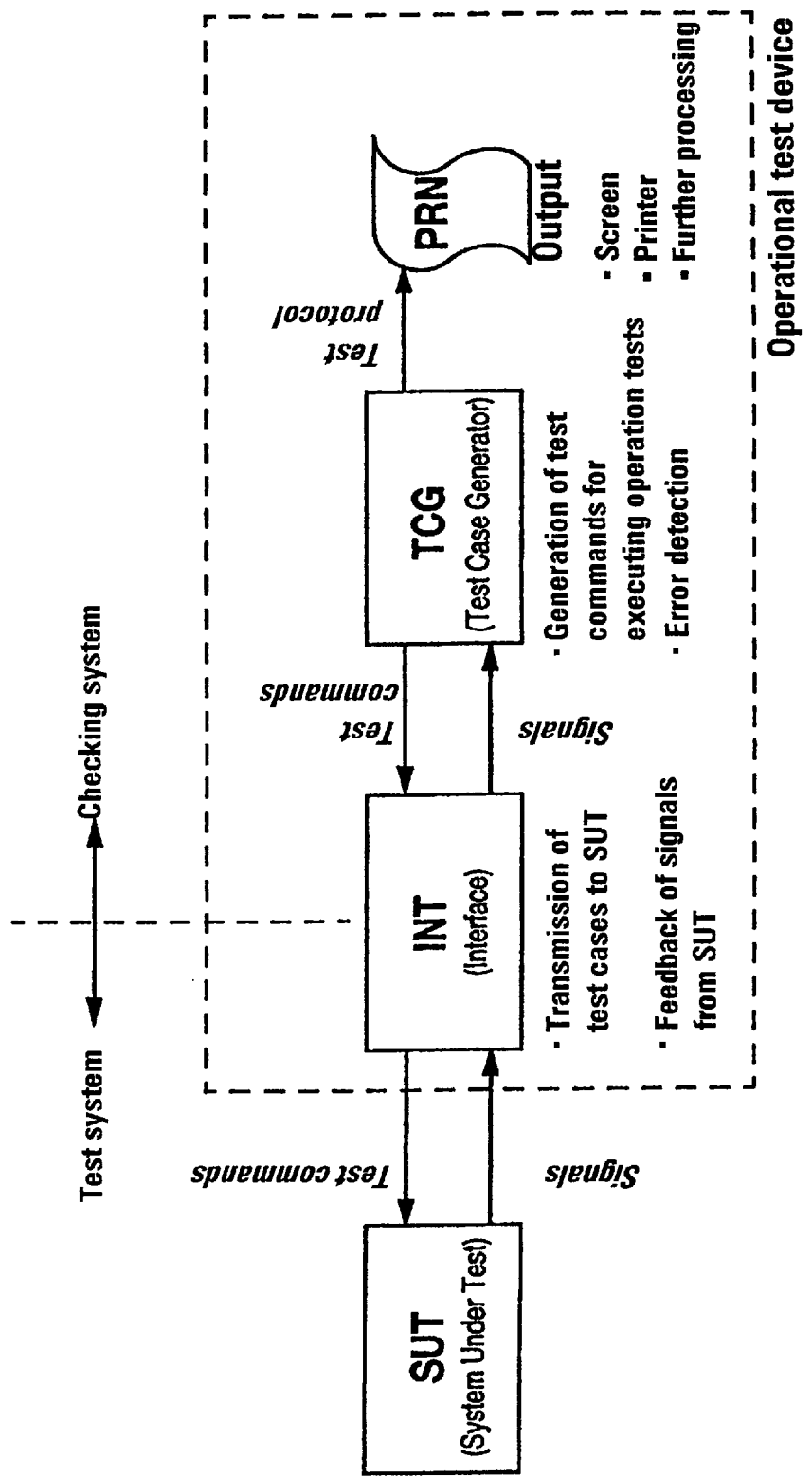
Fig. 21c: Device for automatic black-box testing

OPERATIONAL TEST DEVICE AND METHOD OF PERFORMING AN OPERATIONAL TEST FOR A SYSTEM UNDER TEST

SPECIFICATION

The invention relates to an operational test device and method of performing an operational test for a system under test. In particular, the invention relates to an operational test device for testing operational functions in a communications system, such as a telephone network, particularly a mobile telephone network, for example for performing a load test or a conformance test for a mobile telephone system.

Regardless of whether it includes hardware or software components or a combination of hardware and software components, every product passes through a specific life cycle from the draft stage to the end of its operating time. As shown in FIG. 21a, a coding C of the program, followed by tests, is for example typically performed according to the requirements analysis (RA), the high level design (HLD) and the detailed design (DD) for a system containing software components. The software is then delivered to the client, its operation is initiated and further maintained by the producer (operation & maintenance), until the backup provided by the producer ends with the "outphasing" stage. The tests are divided into various test phases, from the basic test BT via the functional test FT, the integration test IT, the system test ST to the acceptance test AT performed by the client. In test methodology, a distinction is drawn between the white-box test in which the device's internal functions or components are tested, and the black-box test in which only the external interface is tested to check whether the device withstands the predetermined customer-specific requirements. In the basic and functional test phases, the procedure is predominantly based on white-box test methodology. In the integration, system and acceptance tests, the black-box methodology is mainly used (this division is not, however, completely rigid; the significance of the black-box test increases toward later test phases, while that of the white-box test decreases to the same extent).

The acceptance test is an important test phase, since the system or device is supposed to be tested in the customer's presence under test conditions that are supposed to correspond as realistically as possible to those operating conditions to be expected subsequently during application. The customer then decides on the basis of the acceptance test whether the product is able to comply with the specified requirements in actual operating conditions. Since, conditioned by corrections, the coding phase C is frequently prolonged right into those phases characterized by black-box test methodology, stringent requirements from the point of view of time are to be expected of the integration, system and acceptance tests. In the case of more complex systems in which a large number of compatibilities and operational functions has to be tested, the acceptance test is no trivial task and therefore requires a great deal of time, particularly when account is taken of the fact that after corrections, it is necessary to repeat a great many tests that were previously successfully performed by the system to be tested in order to rule out negative effects of the corrections on other parts of the test system (regression test). It is therefore necessary during this phase to use test tools that make it possible to work efficiently. FIG. 21c shows the general structure of an operational test device for the black-box test of a system under test (SUT), with the operational test device comprising a test case generator TCG, an output device PRN and an interface INT. The operational test device outputs test commands via the interface INT to the test system SUT in order to check its operational functions. The test case generator TCG generates a large variety of patterns of test commands in order to check all the operational functions. Reactions generated by the test commands in the form of signals are returned by the SUT via the interface INT to the test device which then performs an error evaluation. Errors are recognizable by an SUT reaction that does not conform to the specification (unexpected signals). Any errors are displayed by the output device PRN. Considerable importance is attached to the interface INT and the test case generator TCG, since patterns of test commands which must correspond as far as possible to real operating conditions are ultimately to be outputted. For instance, the test case generator is supposed to uncover software errors in a system under test by means of statistical usage testing (StUT). In other words, test commands are generated which simulate an extensive use of the SUT with the same characteristics of use (frequency and duration of the individual functions' use, described by specific probability distributions) as in a real operating environment. In consequence, a large number of executed test patterns or test cases can expose those errors that will likewise most frequently occur when the system under test is actually in use. The number of remaining errors, such as of the system software, can be estimated from the number of errors discovered with the test commands after several correction stages. A mean-time-to-failure value (MTTF), which ultimately indicates to the client the level of quality that the system will reveal in real application, can be determined therefrom (system certification). The automatic test case generator performs an automatic black-box test for the SUT test system in which inputs from one or more ST users, depending on the system environment, are simulated. To obtain a conclusive yardstick for the operational properties to be expected under real operating conditions, utmost importance is attached to the generation of the test cases, i.e. the test commands, whereby the time needed for this purpose is to be as short as possible so as to minimize the test's costs. In the case of complex systems, this is no trivial task, as will be explained below using the example of a mobile telephone system as shown in FIG. 21b.

A typical mobile telephone system that satisfies e.g. the GSM standard ("global system for mobile communications") comprises a network of one or more mobile services switching centers MSC which are each connected to several base station controllers BSC, which in turn each communicate with several base transceiver stations BTS, and mobile stations MS. The MS communicate with the BTS by means of radio waves, i.e. via the "air interface". All the other components are connected together via permanent data lines (in certain cases these lines may constitute line-of-sight radiolinks on a physical level, but in the sense of the network structure they are also permanent lines on a logical level). A conventional telephone network, i.e. a public switched telephone network (PSTN), is usually coupled to the mobile telephone system via one (or even more) MSCs.

To carry out a system or acceptance test ST, AT (see FIG. 21a) for such a system, it is necessary to perform both a load test LT and a conformance test CT and perhaps a disturbance test DT as well, as far as possible in combination (FIG. 21b, bottom). In the load test (LT) in which the efficiency of the MSC and BSC switching centers is examined when switching a large number of calls, a high load of calls in the form of signaling traffic is directly applied to these switching centers. For example, a load of up to 500,000 calls to be switched by the MSC/BSC is simulated here and the resultant behavior is evaluated. For this purpose, the load generator has to identify the communication protocols of the signalizing system being used and simulate them for a corresponding number (500,000 in the example) of instances, i.e. independent processes generating the signalizing traffic of individual calls.

The system's behavior in the event of operational malfunctions, e.g. interruption of the signaling links or failure of individual network components, is examined in the disturbance test (DT). A mobile telephone network has sufficient redundancies to compensate such malfunctions entirely or at least in part, for example by rerouting the calls to another switching center. For this purpose, signaling links are deliberately interrupted or processors in MSCs or BSCs are shut down in the disturbance test. Such malfunctions are nowadays manually created, e.g by removing plug-in cards from the switching center hardware. Yet it would also be possible to automate this procedure by means of an device that can open and close the relevant electrical lines on command, and hence to render this procedure accurately reproducible.

The conformance test (CT) checks how the detailed behavior of the mobile telephone network's individual services, such as call rerouting, conference calls etc., looks like when mobile stations MS communicate with one another or with PSTN telephones. These might for example relate to the correct functioning of the services, but also to the maintenance of maximum permissible set-up call times and the like. Bearing in mind the variety of operational functions that are currently placed at the disposal of mobile subscribers in a mobile telephone network, it is necessary to simulate a variety of functions in the conformance test.

Conventional solutions amount to connecting up a plurality of mobile telephones via a coaxial line to a small test network composed of MSCs, BSCs and BTSs (a test via the air interface itself is out of the question since external mobile telephone networks would be disrupted as a result). The desired operational functions are then manually polled by means of the mobile telephones so as to perform, for example, a dialing operation, a set-up call or a call, with manual evaluation of those errors that have arisen, recognizable e.g. by an absence of the ringing signal or an absence of the call-connected signal. More sophisticated computer-aided test devices also include the air interface simulation (AIS) with variable attenuators in the coaxial lines between the mobile telephones and the BTSs so as to simulate the movement of the individual mobile stations and to evaluate the errors that have arisen, e.g. when "handing over" to other radio cells. Typically, just three, in exceptional cases (conference calls) as many as five, mobile telephones can currently be simultaneously used in practice for a conformance test, and several test persons are needed to operate them.

If it is taken into consideration that in a real mobile telephone system, the number of mobile stations participating in the communication is much greater and a variety of functions are made available, the number of only a handful of mobile telephones that can manually undergo such a conformance test is, however, extremely small, making it desirable for it to be possible to perform automated testing based on a larger number of mobile telephones. As a result, the number of tested cases can also be considerably increased while taking the same amount of time. Test cases have to be performed with the same characteristic as in the tested system's real application to enable an MTTF measurement and hence a system certification. Customer services, such as conference calls, voice mail, data transmission etc., have to be made available for example in a mobile telephone communications device; it must be possible to an extent for such services to be activated via the respective telephones. Moreover, specific functions, such as a simple telephone call, are very frequently used by a large number of people, whereas other more specialized functions, for example forwarding calls, mail box functions etc., are used only by a limited number of people and with varying frequency in the course of a day. So that a characteristic MTTF value which takes statistical factors into consideration can therefore be measured, the utilization frequencies of the operational functions during the mobile telephone network's real use must be statistically recorded or (in the event of completely new operational functions) estimated, and reproduced in a statistically representative manner in the operational test based on as large a number of mobile subscribers as possible.

A mobile telephone communications device is therefore a complex system which is usually made available and operated by interlinked hardware and software components.

As mentioned above, the complexity of mobile telephone communications systems requires the individual components or the entire system to be accurately tested. Comprehensive tests are performed to localize software and hardware system errors that arise during operation before systems and developments are approved and released. Conventional test systems do not, however, allow a telephone network's hardware and software to be automatically tested in a comprehensive manner.

For example, DE 3 211 967 describes a circuit arrangement for a device with which different operating and test sequences are effected in a telephone exchange system or in a device connected thereto, and an unusual pattern is displayed, particularly devices used for the simulation of traffic in telephone exchange systems and fitted with corresponding subscriber simulations. Typical system functions such as "engaging", "dialing", "calling", "speaking", can be reproduced or simulated by means of these subscriber simulations. Certain tone voltages generated by a level generator are applied to the subscriber simulations in accordance with the permanently predetermined test program of a program-controlled test device. Monitoring takes place by rating the transmitted audible tones, the call current and if necessary dialing pulses.

The method described in DE 32 119 67 for example suffers from the disadvantage that hardware errors cannot be simulated. Hardware errors for localizing transmission-station errors that have arisen during operation or for testing the communication system are currently localized by removing or reinserting complete slide-in units e.g. of a transmission station and by analyzing operational sequences within the system.

Yet this method neither assists the reproducibility of test cases nor does it support the precision needed in temporally critical situations so as to verify that an error has been eliminated when a series of tests has to be repeatedly performed, e.g. for approving the system's further developments, or when a test sequence has led to incorrect results and the same test situation has to be generated once again. It is necessary to reproduce a test case using very precise time specifications, such as for regression tests, particularly in a real-time system, such as a communication system.

It is also time-consuming to perform test cases manually, necessitating the presence of test personnel at the device to be tested; as a result of this personnel, hardware components can for example be removed and reinstalled and telephones operated, if necessary by hand.

The removal of a transmission station's hardware components also only permits a "test granularity", i.e. the fineness of that screen by means of which an error can be localized—this fineness corresponds to the removed hardware components.

Although the problems associated with testing a product have been described above with particular reference to a mobile telephone system, these problems similarly occur when testing any complex systems, i.e. it is generally desirable for an operational test device to be made available which performs an operational test with test conditions that correspond as far as possible to real operating conditions. As mentioned above, the operational test device also has to perform such a complex operational test in as short a time as possible.

The present invention's object is therefore
to make available an operational test device and a method of performing an operational test for a test system that can perform an operational test in a short time and using test cases; this test simulates operating conditions actually to be expected when the test system is used in a real environment.

This object is solved (claim 1) by an operational test device for performing an operational test for a test system which has operating states corresponding to a real operating system used in a real operating environment, under test conditions, comprising
  a) a test case generator for generating a number of test samples with test commands which are each supposed to produce a desired change in operating state within the test system;
  b) a test device interface for receiving the test commands and for outputting corresponding control signals to the test system so as to bring about the desired changes in operating state;
  c) said test case generator comprising:
    a test state model generator for generating a test state model of the test system from information on the test system's hardware configuration, from information on the real operating system's possible operating states, from traffic values that indicate transitional probabilities ascertained during the operating system's real application for the operating states, and from the test system's permitted test commands;
    a test state-model memory in which the test state model is stored;
    a test state-model simulator which statistically passes through the test state model and generates desired operating state transitions; and
    a test state-model command generator for successively generating the test cases' test commands based on the operating state transitions generated by the test state model simulator.

This object is also solved (claim 31) by a method of performing an operational test for a test system that has operating states corresponding to a real operating system used in a real operating environment, under test conditions, comprising the following steps:
  a) generating a number of test cases with test commands which each display a predetermined change in operating state within the test system, having a test case generator;
  b) receiving the test commands and outputting corresponding operating signals to the test system (SUT) to bring about the predetermined changes in operating state via a test device interface; and
  c1) generating a state model of the test system composed of information on the test system's hardware configuration, information on the test system's possible operating states in real application, information on the test commands necessary for bringing about changes in operating state within the test system, and based on traffic values that display transitional probabilities ascertained during the test system's real application for the operating states, having a test state model generator;
  c2) successively generating randomly controlled changes in state according to the transitional probabilities within the test state model using a test state model simulator; and
  c3) generating the test cases' test commands based on the state transitions generated by the test state model simulator and the test commands linked to these state transitions according to the test state model by means of a test state model command generator.

In the operational test device and the method according to the invention, a test case generator generates test commands according to the states—which have been passed through—of the test system's test state model simulated in a Monte-Carlo simulation. The test state model is generated on the basis of information on the test system's hardware configuration and available operating means, from information on the test system's possible operating states during real use, from test commands needed to bring about these operating states, and from traffic values which display transitional probabilities ascertained during application between the states. In the Monte-Carlo simulation, the operating states in the state model pass through random, though—in accordance with the statistical distribution—frequent transitions and test commands are generated on the basis of the respectively chosen transition to the nearest state. Those transitions that are in reality frequent also frequently arise in the simulation, with the result that errors in those transitions that would arise early on when used by the customer are also revealed early on in the simulation. This principle of the statistical usage test (StUT) thus makes it possible to ascertain inexpensively the most frequently occurring and hence most serious errors, in contrast to the usual traditional test approach in which the tester does in fact select the test cases to the best of his knowledge and belief, but still ultimately selects them at random, without statistical significance and without any claim to completeness, which often means that errors in frequently used test-system functions remain undiscovered.

According to an advantageous embodiment of the invention (claim 33)
  a) the test system (i.e. system under test) relates to a communication device containing a plurality of telephones, particularly mobile telephones, a plurality of electrical connection lines, and at least one transmission station for transmitting signals in the telephone communication device; wherein
  b) the test device interface and the test case generator form a test device for testing the telephone communication device in an operative load condition, said test device comprising:
    b1) a central signal processing device having
      b11) at least one programmable data processing device from which the test commands for testing the telephone communication device are supplied; and b12) a converter device connected to said programmable data processing device and designed to convert digital test signals generated by said programmable data processing device by controlling said test commands into operating signals; and b2) at least one interrupt device connected to said converter device and designed to interrupt systematically, in accordance with said operating signals, individual or groups of electrical connection lines for time intervals predetermined by said converter device's operating signals, wherein b3) on account of the systematic interruptions within said telephone communication device, signal changes are produced which can be signaled when there is a deviation from the associated reference signal changes.

The interrupt device (henceforth also referred to as a disturbance element) may advantageously consist of a plurality of controlled switches that are operated by the programmable data processing device of the central signal processing device in a program-controlled manner. As a result, individual or groups of electrical connection lines within the transmission station or between different transmission stations can be interrupted for defined time intervals. A very high test granularity can also be achieved, i.e. errors can be accurately localized. An operative load condition can be generated for example by a load generator that simulates a plurality of calls. A predetermined basic network load is generated by the load generator during testing.

According to a further embodiment, the interrupt device (disturbance element) can be arranged between the circuit card or cards and the circuit card mount of the transmission station or at the front sides of the transmission-station circuit cards inserted into the circuit card mount. The interrupt station can also be arranged between various transmission stations and several interrupt stations can likewise be arranged in this particular manner.

In such embodiments, a further general advantage is for it to be also possible to provide hardware components and configuration files stored in memory devices, by means of which the mobile telephones and/or the fixed telephones, likewise of a different type, e.g. manufactured by different companies, can be operated and monitored automatically via an interface. In this way, subscribers and their behavior can be simulated by controlling the keypad and microphones as well as by tapping into the call devices and loudspeakers of telephones. In this way, it is also possible to simulate subscriber movements and the presentation of calls between two transmission stations.

The test programs may therefore also contain instructions as to when and how telephones are to be operated and telephone movements simulated. This makes it possible to test a communication device, likewise in conjunction with telephones of different manufacturers, and specific subscriber services can be automatically activated. Identification signals which identify respective telephones participating in a call can also be transmitted via the voice channels by the test device, controlled by test instructions, i.e. the test commands. For this purpose, a voice channel is set up between each pair of telephones of a plurality of telephones in a call involving two telephones or a conference call involving three or more subscribers. A pattern of tone pulses that clearly identifies a first telephone and with a predetermined frequency is then transmitted via the voice channel from the first telephone. The reception of the tone-pulse pattern transmitted via the voice channel is monitored at a second telephone participating in the call. The transmission of the pattern of tone pulses takes place between the first and the second telephone in the presence of voice compression and voice decompression. The pattern of tone pulses is selected such that it is also possible to identify the first telephone when the pattern of tone pulses is received at the second telephone if voice compression and voice decompression is used.

The correct switching of connections in the case of two-phone calls or conference calls can be established, recorded and evaluated. This further enables long-term testing and comprehensive automatic "black-box" testing.

In another embodiment, the central signal processing device may be connected via the programmable data processing device, which may be e.g. a commercially available computer, to a plurality of external programmable data processing devices which may be likewise commercially available computers, via a network for data exchange. In this instance, the programmable data processing device of the central signal processing device acts as a server which is connected via a server process to the converter device and which is connected via hierarchical communication processes, henceforth known as client processes, to the plurality of external programmable data processing devices or data display stations. Test instructions can therefore be executed using the plurality of these stations, conveying data via client processes to the central signal processing device's server which then generates digital control signals and transmits them as part of a server process to the converter device which in turn controls the interrupt device within the transmission station, or controls and monitors the telephones. This also makes it possible to arrange the external data processing devices far away from the data processing device of the central signal processing device and to connect them thereto via e.g. a local network (LAN) or via the internet, or via another remote data transmission device. Test instructions therefore do not need to be executed locally, i.e. tests can also be performed over large distances (remote testing) and hence the test device can be utilized more effectively.

The above object is also solved by test devices as claimed in claims 52 to 63.

Further advantageous embodiments and improvements of the invention are arrived at from the dependent claims.

The invention shall be described in the following by means of its embodiments with reference to the attached drawings.

FIG. 1a shows a general view of the operational test device of the invention;

FIG. 1b shows the structure of the test case generator TCG from FIG. 1a;

FIG. 2a shows a view depicting the structure of the operational test device for testing a telephone network (e.g. a mobile telephone network);

FIG. 2b shows a possible test environment for performing a load test, disturbance test and/or a conformance test in the mobile telephone network schematically represented in FIG. 21b;

FIG. 2c shows a general embodiment of the operational test device for application to a telephone network;

FIG. 3a shows an embodiment of the operational test device in which changes in state are fed back to the test device;

FIG. 3b shows the structure of the associated test case generator TCG-F when changes in state, as shown in FIG. 3a, are fed back to the TCG;

FIG. 3c shows an example of a test state model on the basis of a time-continuous Markow chain for generating test commands for a telephone network;

FIG. 4a shows an embodiment TCG-PN of the TCG for generating test commands by using a stochastic Petri net state model of the system under test;

FIG. 4b shows an example of a non-colored stochastic Petri net for generating test commands for a telephone network involving two telephones;

FIG. 4c shows an example of a colored stochastic Petri net for generating test commands for a telephone network involving a random number of telephones;

FIG. 4d shows the example from FIG. 4c realized with latency-encumbered places instead of time-encumbered transitions;

FIG. 5a shows an embodiment TCG-PNF of the test case generator according to FIG. 4a, but including feedback of changes in state (synchronization) from the test system;

FIG. 5b shows the example from FIG. 4c supplemented by an identification and evaluation of fed-back signals of the telephone network by utilizing synchronization places;

FIG. 5c shows a detail from a colored net in which the identities of the telephones and the "Multiparty" and "Call Forwarding" services subscribed by them are stored in synchronization places in the form of colored tokens;

FIG. 6 shows an embodiment TCG-PNR of the test case generator, with it being possible to reset Petri net state model's states to stored states;

FIG. 7a shows an embodiment TCG-PNFR of the test case generator when the embodiments of FIGS. 4a, 5a and 6 are combined;

FIG. 7b shows a detail from the Petri net according to FIG. 5b in which synchronization and reset is provided when there are errors, as enabled by the test case generator from FIG. 7a;

FIG. 8a shows components and the operating mode of non-colored stochastic Petri nets;

FIG. 8b shows extensions of the non-colored stochastic Petri nets in the form of colored tokens or places and latency-encumbered places;

FIG. 8c shows a view of an example for a Petri net model of a simple telephone network on a Petri net model generator (PNM-G) executed as an editor;

Figure 9:
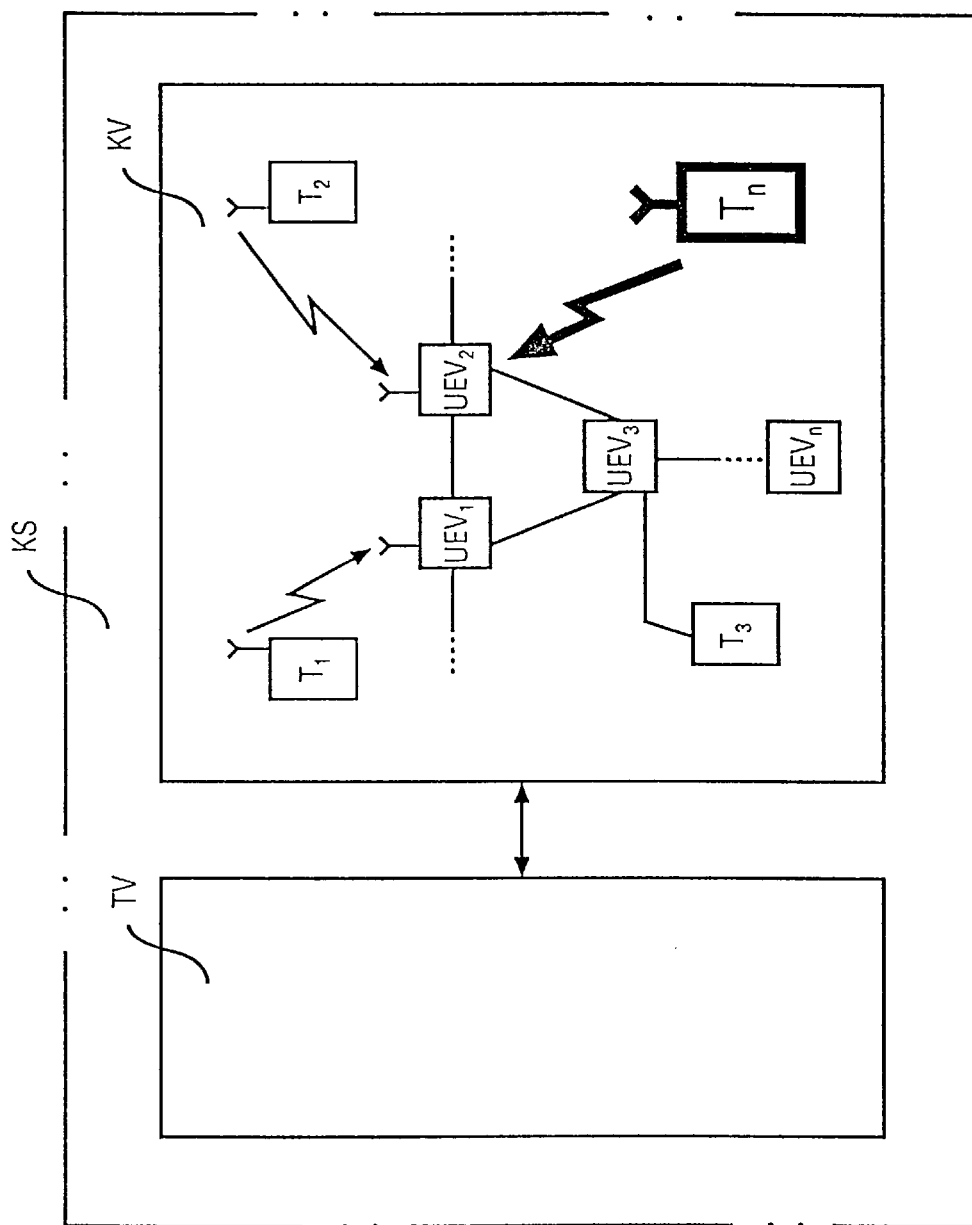
FIGS. 9–11 shows block diagrams of embodiments of the communication system.

FIG. 1 shows a first embodiment of the operational test device that enables a black-box test based on the StUT technique ("statistical usage testing"). The main application of this operational test device is to test a system software for telephone networks, as will be explained below with reference to FIG. 2. FIG. 1a shows the SUT (system under test), which is not specified in further detail here, a TCG (test case generator), an interposed INT (interface), a TRR (test result recorder), an SUT-RA (SUT's real application) and a USMS (usage statistics measurement system).

In terms of the hardware configuration, the SUT corresponds to the real application SUT-RA, as will be subsequently used after testing in the real operating environment.

The TCG receives the SUT's hardware configuration, information on those states that the real test system may or is to assume, information on possible transitions between the states and information on the necessary commands to the SUT in order to bring about such transitions in the SUT. These states relate not only to purely imaginary values but to an extent to actually assumed operating states of the SUT or its users, which also have to be simulated as a traffic source for the purpose of testing. These states are displayed externally by corresponding signals from the test system. If the operational test device is for example used to test a system that is used to control a set of traffic lights, the signals display the state red, amber and green of a particular traffic light. To test other systems as part of the black-box technique, these signals may for example display the flow of material, the stoppage of materials etc. in a production plant. In the black-box method, these signals are evaluated as the sole information on the internal state of the SUT, on account of which it stands out from the white-box test in that it (i.e. the black box test) can directly examine the SUT's internal state.

The TCG also obtains traffic parameters that are either extracted from measurements by means of a measuring device for traffic data (USMU) in the real operating environment, or are estimated, provided that the functions to be tested are new and hence have not yet been used in the SUT-PA. These traffic parameters are parameters of probability distributions indicating how the states vary statistically in the real operating environment. The distributions therefore indicate the transitional probabilities of states which are to be expected when using the SUT in the real operating environment.

In the case of the aforementioned traffic light control operation, these traffic values might for example indicate the frequency with which a traffic light is switched to red at an intersection at a specific time of day if the traffic lights are automatically controlled by the respective number of waiting vehicles; this frequency is in turn characterized by a statistical distribution that depends on the time of day. The information transmitted to the TCG about the SUT's hardware configuration indicates the kind of operating media that can undergo a test and which are present in the SUT, for example the number of traffic lights and vehicles set up in the test system.

The INT is necessary to transform the TCG's test commands into signals which can perform an active control, of for example the traffic lights, within the test system.

The TRR likewise records all the executed test cases and the SUT's observed signals so that it is possible during a subsequent evaluation to verify (automatically or manually) whether the test cases have led to the desired changes in state, i.e. whether the test case was successfully run or not.

As shown in FIG. 1b, the TCG obtains a test state model generator TSTM-G, a test state model storage TSTM-S, a test state model simulator TSTM-Sim and a test state model command generator TSTM-CG. A test case storage TCS may also be optionally present to execute generated test cases only subsequently and/or to be able to re-use them. The TSTM-G is a device for generating a test state model of the test system based on an SUT state model, parameters for the model, and test actions assigned to the respective transitions. Unlike the SUT's state model, in which only the SUT's possible states and possible state transitions are described without further parameters such as transitional probabilities, the test state model is a great deal more specific. The states can for example be linked here to times which in real time or simulated time, model the life time of the respective state by means of a suitable probability distribution (e.g. in an exponentially distributed or constant way). When several transitions into different successive states are possible from one state, the transitions are encumbered with individual probabilities. Alternatively, the transitions may be encumbered with times, with the result that the life time of a state results from the duration as far as the transition that first makes an appearance. Finally, the model may also allow transitions only at discrete points in time, with transitions being possible from a state that returns to the same state. The life time of a state corresponds here to the number of time pulses from the first entry into the state until a transition into another state occurs for the first time.

To generate a suitable test state model, the test state model generator has to obtain information on all the possible states and transitions between these states (SUT's state model), on the traffic parameters (i.e. life times of the states, transitional probabilities etc.) on the test commands to be executed when states change and which are to bring about corresponding changes in states within the SUT, and on the available test hardware (operating means for the test). The TSTM-G uses this information to generate a test state model that contains all the necessary information for a statistical test of the test system using the available test hardware. This model is stored in the TSTM-S.

The TSTM-Sim can now perform a Monte-Carlo simulation of the test state model in that it generates random changes in state on the basis of the test state model's stochastic parameters (life times, transitional probabilities etc.). The TSTM-CG converts the generated changes in state into commands for the SUT so that a random sequence of states within the test state model generates a random sequence of test commands as test cases for the SUT; these test cases are intended to effect corresponding changes in state in this SUT. If this is the case, the test case has been successfully processed by the SUT, otherwise an error was located in the SUT. Information on correct or defective processing of test cases are to be inferred from the recordings of the signals and the generated test cases which are produced by a suitable TRR during the test.

In other words, a test state model is generated from the test system's entered traffic values, the possible states and transitions, from the test commands that have to be issued to the test system in order to bring about corresponding transitions therein, and from the test system's current hardware configuration. On the basis of this model, a number of test cases with test commands is passed through in exactly the same approach and statistical frequency as is to be expected in a real operating environment when using the system currently under test.

For the above example of traffic lights, the TSTM-CG generates test commands that statistically simulate the flow of traffic that allows the set of traffic lights to jump back to its individual states. The operational test device according to the invention can be used to test statistically any test systems on the basis of a state model. In just a short time, just on the basis of the possible SUT states and changes in state, the commands which effect the changes in state, the traffic values and the current hardware configuration of the test system, a test is carried out which tests the test system under those test conditions that actually prevail when using the test system in real operating conditions.

The test cases can be processed by the SUT in real time, with the TCG immediately transmitting the generated cases via the INT interface to the SUT and with all the simulated times corresponding to real time. In another embodiment of the operating device according to the invention, the test cases can first be generated and filed in a test case store TCS in order to be loaded and executed by the TCG only subsequently during the actual test. Advantages of this embodiment include the possibility of displaying and editing the test cases before execution (for example so as to avoid duplicates), of sending them to other locations so as to perform the test there and of performing them several times in the case of repeated tests, without entailing a new simulation.

FIGS. 2a, 2b, 2c show embodiments of the operational test device according to the invention for testing a telephone network on the basis of the state model of a mobile telephone system and/or a PSTN. A special software control SWCtrl is provided for controlling the TCG components. In relation to a telephone network's black box test, it is possible to fall back on existing equipment, such as load generators, as an interface INT (see FIG. 1a); such equipment is responsible for more complicated tasks than the simple forwarding of commands to the SUT, with the result that the INT to the test system is executed here as an independent test case executor TCE. This may for example also be a device that controls the connected telephones or mobile telephones.

For the mobile telephone system shown in FIG. 2b, the TCG simultaneously generates test commands for a load test LT, a conformance test CT and a disturbance test DT.

In the load test, the MSC and BSC switching centers are burdened with a considerable number of simulated telephone connections. In the conformance test, individual services of the mobile telephone network are tested by individually controlling mobile telephones MS and an air interface simulator AIS. The AIS uses variable attenuators to simulate the signal level variations that occur in the real mobile telephone network on the basis of the mobile subscribers' movements between the BTS stations which result in handovers from calls between the BTS stations. In addition, switches between the fixed network and the mobile telephone network can be tested via the control of PSTN telephones.

Finally, in the disturbance test, lines between the switching centers or components within a switching center are rendered inoperative by means of suitable disturbance elements (interrupt devices) so as to verify the mobile telephone network's ability to reconfigure itself during malfunctions.

For the various tests, there is respectively in FIG. 2b an independent device LT-TCE, DT-TCE and CT-TCE for executing test cases TCE for each type of test, because the respective interfaces to the mobile telephone network look extremely different (signaling lines during the load test, mobile telephones or fixed network telephones in the conformance test and disturbance elements, i.e. interrupt devices, in the disturbance test). Of course, a possible execution of the test device might also combine several of these TCEs within one device, provided it has suitable interfaces to the mobile telephone network.

As is apparent in FIG. 2b, the TCG's software control can also take place via a data network from a remote station, making it possible to utilize the test hardware from locations at which such a test hardware is not available ("remote test").

By analogy to the general block diagram in FIG. 1a, the equipment and data flows in the test structure for testing the telephone network are schematically shown in FIG. 2c. The states that can be assumed by the real telephone network or by its subscribers can be derived from the telephone network's formal specifications, such as in a GSM network, simple states like "idle", "dialing", "ringing", "busy", "connected" etc. for the individual telephones. Modern mobile telephone networks make available a plurality of such basic states, as well as states that refer to extended services such as "call forwarded" etc. The traffic parameters that are entered into the test case generator are (if available) derived from actually measured values of a telephone network used in real operating conditions. These are not exclusively specific to a system but are also specific to the environment in which they were measured (location, time etc.), with the result that they can be used to generate a test state model specific to place and time, independent of the test system's hardware configuration. For this purpose, statistical traffic data are measured in a telephone network, such as the frequency that mobile subscribers perform a short simple call at a certain time of day (9–10 a.m.) without using any special services (call forwarded, fax etc.). Such measurements can be performed in a manner that is locally restricted to specific areas so as to measure the traffic's local characteristic there (e.g. the frequency of short calls might be less in more sparsely populated areas than in cities in which a great many businesses conduct predominantly short calls. Different transitional probabilities therefore exist for changes in state exhibited by mobile telephones MS, base station controllers BTS or mobile services switching centers MSC in thinly populated areas, in contrast to those in cities.

The test case generator also obtains information on the current hardware configuration and the operating means of the telephone network to be tested, such as the number of mobile stations, the network's service features ordered by the subscribers, the number of fixed network telephones etc. Finally, the commands to effect changes in state within the telephone network have to be notified to the TCG in order to use the "pick up receiver" command to reach "connected" from "ringing". The TCG uses this information to generate a test state model of the telephone network in which all the possible changes in state with their probabilities and commands to be executed are contained in a manner adapted to the available test hardware. Again on the basis of the generated test state model, the TCG therefore statistically (at random, not in a deterministic sequence) generates test commands which are executed via the test case executor TCE on the hardware components of the test telephone network. In other words, actual calls are generated by the mobile telephones present in the test telephone network, the test telephone network conveys these calls and generates ringing signals, line-clear signals etc. which reflect the changes in state within the test telephone network. The TCE therefore converts the commands generated by the TCG into actual state transitions within the test telephone network.

A different type of TCE for a disturbance test can for example also intentionally generate faults, e.g. interrupting a line between two mobile switching centers MSC, as shown in FIG. 2b. This means that the TCE produces actual changes in state within the mobile telephone system according to the statistically generated test commands. The TCE is therefore a component of the operational test device that generates signals for actual changes in state within the test telephone network. For example, it simulates subscribers (mobile telephones) and their changes in state, such as dialing, telephoning, picking up the receiver, etc. (conformance test), or interference effects on the switching centers (disturbance test) or the signaling traffic of a large number of telephone subscribers (load test).

According to a further embodiment of the invention, as shown in FIGS. 3a, 3b, 3c, the TCG-E generates not only test commands but, compared with FIG. 1a, it also obtains feedback via signals from the test system as a response to the statistically generated test commands. This feedback occurs in the form of signals that are signaled by a bidirectional interface BD-INT from the SUT to the TCG (FIG. 3a). These signals can be used to evaluate errors, as shown in FIG. 3b. In a simple embodiment, the TSTM-Sim generates state sequences that are converted by the TSTM-CG into test cases, i.e. sequences of test commands. The TSTM-Sim contains a state storage StS in which the current state of a test state model is recorded during simulation. The TSTM simulator stores the expected signal in a buffer B for each test command that is sent to the SUT. The observed signals are received by the SUT via the BD-INT and stored in a second buffer A. A comparer CMP which compares the signals in the two buffers A and B interacts with the two buffers A, B. If they match, the signals in both buffers are erased. If they do not match, an error is outputted by the comparer because the test system evidently differs from its specification fixed in the test state model.

For example, the TCG might generate a test command to the mobile station X for selecting the number of a specific mobile station Y. According to the test state model, it is expected that the called mobile station Y rings and that station X hears a line-clear signal, and the test state model simulator therefore stores the expected signals "Y rings" and "X hears line-clear signal" in buffer B (the signals do not necessarily have to be stored in a specific sequence, but might contain time tokens that indicate the time intervals within which the signals are expected). If the corresponding observed signals are received from the SUT (in good time), the comparer does not generate an error; otherwise an error is indicated (signal was not at all received or was not received in good time).

On the basis of the test state model, the TCG therefore statistically generates successive changes in state, generates the associated test commands and evaluates the signals fed back by the test telephone network in relation to the expected signals. The TRR that is necessary in FIG. 1a might thereby be limited to recording errors that the TCG has identified.

FIG. 3c shows a possible embodiment in which the state model generator TSTM-G generates as a test state model a time-continuous Markow chain which is passed through by the test state model simulator TSTM-Sim in a random manner. The left-hand side shows a graphic representation of the Markow chain, the right side shows a table of the parameters of all the possible transitions and at the bottom a possible test case generated during an operating pass, including the temporal progress, TSTM-CG output and the SUT signals. The different nodes ○ designate the possible states of the entire telephone network. These result from possible combinations of the states of individual telephone subscribers, as can be inferred from the telephone network specification. If an individual subscriber can for example assume the states "idle", "dialing", "ring tone", "ringing", "busy tone" and "connected", valid states such as "A idle, B idle", "A dialing B, B idle" and "A, B connected" are obtained for two subscribers, whereas "A idle, B connected" would not be a valid state of the network with two subscribers.

The edges → display the possible transitions between the states. In such a time-continuous Markow chain, average transitions, which are parameters of a random distribution—the exponential distribution—are defined for the individual transitions instead of discrete probabilities. Each possible transition lasts on average the time assigned to it, although in a specific individual case, random times, the probability of which follows from the exponential distribution, are also obtained. In this way, a transition with an average time of 10s may also take place after 5s or 30s, whereby the probability that a transition takes place within a predetermined time interval (0,t) can be calculated from the probability function of the exponential distribution $F(t)=1-\exp(-t/T)$, T=average duration. For 0s–5s, the probability at T=10s is for example $F(5s)=39.34\%$, for 0s–10s $F(10s)=63.21\%$ and for 5s to 10s $F(10s)-F(5s)=63.21\%-39.34\%=23.87\%$.

The dwell time is therefore obtained in a state as minimum time until a possible transition occurs. The probability that a specific transition of several possible ones occurs is calculated from the probability that the specific, randomly generated time duration of this transition is less than the minimum of the durations of the other transitions. The average times T for the individual transitions are calculated from the traffic values.

In a Markow test state model, 14 possible states are needed, as shown in FIG. 3c, for two PSTN telephones A and B, with not even those cases in which a subscriber selects his own number being contained in the depicted model. This nonsensical situation also has to be correctly handled by the telephone network and would therefore have to be tested. The TSTM-Sim statistically generates a state sequence in the chain on account of the exponentially distributed transitional durations, for example for the case shown in the lower part of FIG. 3c. Both subscribers start in state "A idle, B idle" in which they remain for as long as one of the two possible transitions after "A dialing, B idle, " or "A idle, B dialing" occurs, which respectively happens on average after 3600s (see column "average duration" in the parameter tale of FIG. 3c). On average, any one of the two occurs after 1800s, which is then also the average dwell time in the state "A idle, B idle". In the example, A starts by dialing after 2170s, i.e. the transition after "A idle, B dialing A" first occurs randomly. As is evident from the parameter table, a test command "B: off hook, dial A" is executed, i.e. the TSTM-CG transmits the command to pick up the receiver to telephone B followed by a dialing command with A as a parameter (in a specific application, A would be replaced here by the call number of telephone A). In the test system, these commands are intended to cause telephone B to press the corresponding keys, which can be achieved by a suitable test case executor TCE, to which the telephones are connected. In the example, a transition after "A dialing B, B dialing A" (both telephones call each other up) is randomly generated after 2s. The probability that this transition takes place is just 0.2% in the indicated average transitional durations (this follows from the properties of the exponential distribution, which will not be discussed in further detail here), but only very seldom does this situation occur in reality too.

In the next transition after "A busy tone, B busy tone", no command is sent to the SUT, but signals, which are evaluated by the comparer CMP, are received from the SUT during the 4 second duration until the transition (see below). The telephones remain 8 seconds in the state "A busy tone, B busy tone" before first telephone B and 4 seconds later telephone A hangs up and the system is again in the initial state of "A idle, B idle".

As already described with reference to FIGS. 3a, 3b, the TCG is able to subject the fed-back signals to an error evaluation. The Markow test state model is, however, unable to process the fed-back signals for the generation of new test commands, but only the fed-back signals can be compared with the expected signals. The right-hand column "expected signal" in the parameter table serves this purpose. The CMP can compare the received signals with these expected signals and when they do not match, it can register an error. It would even be conceivable to define permissible time limits for the expected signals, with the result that a signal that was not received in good time would be identified as an error.

Figure 14:
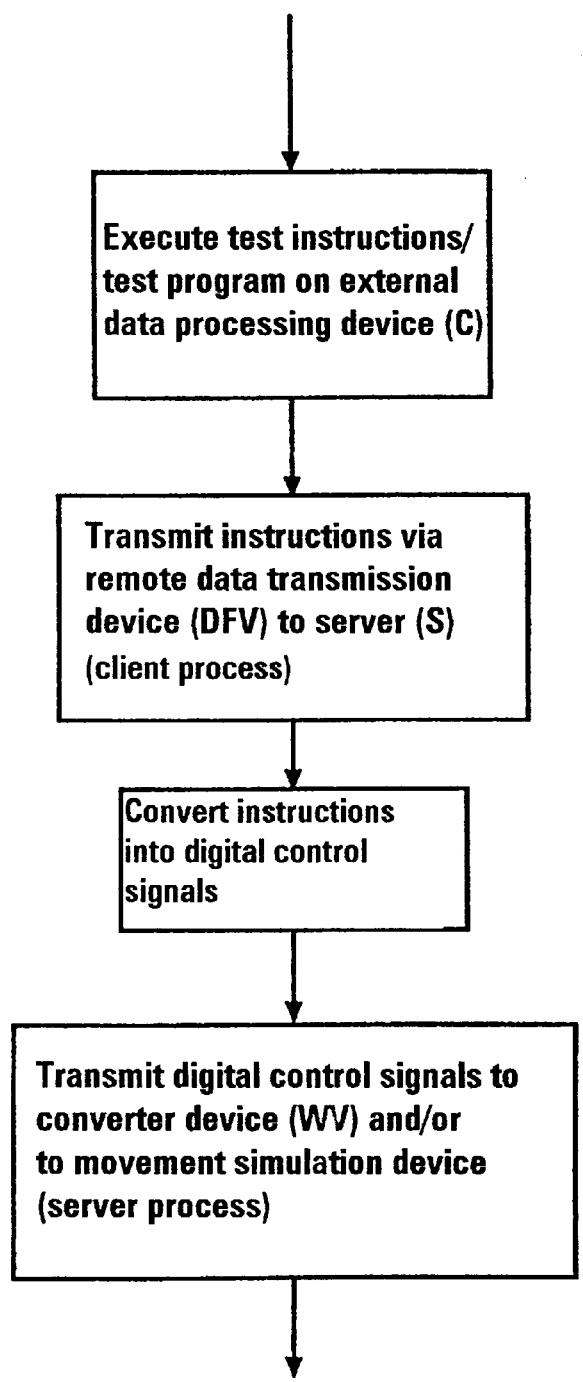
FIG. 14 shows a flow diagram of part of a test sequence.

As evident from FIG. 3c, 14 states ○ are needed in the Markow chain state model with just two telephones. The extent of the Markow chain test state model rises substantially with the normally large number of independent subscribers (mobile telephones or conventional telephones) in a telecommunication network. The Markow chain test state model is, however, suitable for efficient testing using a limited number of telephones, or for testing test systems using just a single user interface (the telephones form for example several user interfaces for a telephone network).

With reference to FIG. 4, an embodiment of the operational test device will be explained below by using a Petri net state model, with a Petri net making it possible to describe very compactly a Markow model with an immense space for states, which space is necessary for describing a mobile telephone system or a telephone system with several dozen or more subscribers.

As shown in FIG. 8a 1), a simple Petri net model comprises places, transitions, edges and tokens. Places are indicated by circles ○ and designate for example the different states of the operating means participating in the test system, such as the operating states of the telephones or those of a connection. Places may contain one or more tokens, with the tokens being represented as small black dots. They may for example indicate the operating means available in the test system, such as the telephones. A specific distribution of tokens in the Petri net is designated as a marking. A specific marking corresponds to a quite specific state of the net. Each possible state of the net is unequivocally assigned to a specific marking. Transitions are represented with filled rectangles and designate the actions or interactions of the operating means, e.g. a set-up connection between two telephones. They may transform markings into new markings and hence produce all the state transitions in the Petri net. Places and transitions are connected together by edges, with one edge always leading from a place to a transition (input edge of the transition or output edge of the place) or from a transition to a place (output edge of transition or input edge of place). A transition may be connected to several places. The places that are connected via input edges of a transition to this transition are designated as the transition's pre-range. In FIG. 8a 1), the two places above the transition form its pre-range. Places connected via output edges of a transition to this transition form the transition's post-range. In the example, the places at the top right and at the bottom form the transition's post-range; in this example, the post-range and pre-range overlap. Conversely, a place may be connected to several transitions. Correspondingly, transitions form a place's pre- or post-range when they are connected by the place's input or output edges to this place. The only existing transition in the example is the pre-range for the places at the bottom and top right, as well as the post-range for the two places at the top.

As shown in FIG. 8a 2), the mode of operation of such a simple Petri net, known in the literature as a "place-transition net", appears as follows: a transition is activated when there is at least one token in all the places of its pre-range. In other words, a transition may only be activated when at least one token is present in all those places from which an edge leads into the transition; a single place without a mark deactivates the transition. In general, several transitions can be simultaneously activated, possibly even by common places in the pre-ranges, i.e. in overlapping pre-ranges of the transitions. To the left of FIG. 8a 2), the transitions T2 and T3 are activated for example, while T1 is not activated since there is no token in P1. One of the activated transitions is randomly selected and is allowed to "fire". When firing, one token from each place of the transition's pre-range is respectively deducted and a new token is stored into each place of the transition's post-range. As a result, a successive marking and hence a new state of the Petri net is obtained from an existing marking. In FIG. 8a 2), T2 is randomly selected for firing. The token is deducted from P2 and new tokens are stored into P5 and P6. T3 could just as well have fired. The two tokens from P2 and P3 would then have been consumed and new tokens would have been stored into P3 and P6. The successive marking would be different in both cases; transitions into different states would therefore be performed.

If the firing transition of another activated transition removes a token from the pre-range, so that this is then deactivated, (as in example T2 the token from P2 which also lies in the pre-range of T3), there was a conflict which was solved by the random selection of the firing transition. Transitions which do not claim any common tokens in the pre-range are, however, conflict-free and can fire successively in any order, with the same final token being respectively obtained (in the example, T1 and T2 or T1 and T3 would be conflict-free if P1 were to contain a token). Such transitions can fire simultaneously.

As shown in FIG. 8a 1), the edges in place-transition nets may also be provided with an edge address, which displays an edge weight. The edge weight indicates how many tokens the edge consumes or produces. An input edge of a transition that is given the address "3" deducts for example three tokens from the associated place in the pre-range. If less than three tokens are present, the transition is deactivated and is unable to fire. An output edge of a transition which bears the address "2" produces two new tokens in the associated place of the post-range when the transition fires.

A further property of place-transition nets is constituted by the capacities of places. If a place has a finite capacity n, it may accept a maximum f n tokens. A transition which as a result of its firing, would increase the number of tokens in this place to more than n is automatically deactivated. If in other words a place in the post-range of a transition has a capacity of 2, the place already contains a token, and if the transition across an output edge with address 2 is connected to this place, this transition is deactivated. As a result of their firing, 2 new tokens would be stored in the place, with the result that the place's capacity would be exceeded by one token.

Places with a finite and an infinite capacity as well as edges with and without an address may arise in a mixed form in the same net. An edge without an address is interpreted as an edge with address 1. A place without a defined capacity has an infinite capacity.

Place-transition nets of the above-described type were described for the first time in 1962 in the PhD thesis by Carl Adam Petri and were used to analyze communicating finite automata. Since this time, they have been used to specify and analyze complex systems with inherent parallelism, e.g. to analyze communication protocols. Manifold extensions and new types of Petri nets have been derived therefrom. The following further types of edges exhibiting behavior other than as extensions are for example envisaged according to the invention.

The following Petri-net edge types are used in FIG. 8a 3):

Flow edge: flow edges are edges of the above-described "normal" type which as input edges of a transition activate same when at least the number of tokens corresponding to the edge weight is contained in the place ○ connected thereby in the pre-range of the transition. As an output edge of a transition, flow edges place the number of tokens corresponding to the edge weight into the place connected to them in the post-range during firing.

Test edge: test edges check the contents of the assigned place in the transition's pre-range. The transition can only fire when the number of tokens corresponding to the edge weight is present in the place. During firing, these tokens are removed and the same number of new tokens is placed back into the place, with the result that the transition de facto fires without changing this place's marking. Test edges are a combination of the transition's input and output flow edges. The same behavior can be achieved by two anti-parallel edges between the transition and place which bear the same address.

Banned edge: banned edges can only be input edges of transitions. They deactivate transitions: the transition may not fire precisely when at least the number of tokens corresponding to the edge weight is present in the associated place. Banned edges realize a negation as an input condition of the transition.

Clearing edge: clearing edges are likewise input edges of transitions. They do not have any influence on the activation or deactivation of a transition. It is immaterial for firing whether and how many tokens are present in the associate place in the pre-range. But if the transition is activated by other edges and if it fires, all those tokens contained in places that are connected via clearing edges to the transition are removed. Since clearing edges in any case remove all the tokens from a place, they do not have any weight. They usually serve to clear up a net with an indefinite marking.

In so-called stochastic Petri nets (SPN), the random selection of the firing transitions can be influenced. This is shown in FIG. 8a 4). For this purpose, stochastic rates or average durations (average duration=1/rate), which are handled similarly to time-continuous Markow chains, are assigned to the transitions. When determining the firing transitions, each activated transition ascertains a random exponentially distributed waiting time, the mean value of which is fixed by the stochastic rate or average duration; each individual random value may, however, be greater or less than the mean value. If several transitions are simultaneously activated, the first to be fired is the one which has ascertained the shortest waiting time. On average, those transitions, the mean values of which (or the stochastic rates of which) are smaller than those of other transitions, fire more frequently. As can be seen in FIG. 8a 4), a transition with a stochastic rate of 0.1 with six instances of firing on average fires just once, a transition with a rate of 0.5 five times. These figures are of course only mean values, and in individual instances this ratio may also look different, as corresponds to stochastic laws.

In a generalization of the stochastic Petri nets, designated as GSPN, there are, in addition to the stochastic transitions with a finite stochastic rate and duration, those with an infinite rate or infinitely short duration. Such deterministic transitions are allowed to fire immediately on being activated and thereby hit all the stochastic transitions. This principle can be continued to a gradation of so-called deterministic priorities which all take precedence over the stochastic rates and have a fixed arrangement among themselves. An activated transition with a higher deterministic priority is always fired before all other deterministic transitions with a lower priority, and before all transitions with a stochastic rate. To simulate time in a simple manner, the average duration of the transition can be regarded as the actual time, as was the case in the Markow chain example in FIG. 3c.

To generate stochastically distributed test cases, a Petri net can be used in an analog manner like a Markow chain, in that the transitions are assigned certain actions which are executed during firing. In FIG. 4a, the structure of a test case generator is depicted on the basis of a Petri net test model The test case generator TCG-PN has a completely analog structure to the general test case generator with feedback TCG-F from FIG. 3b. The test state model generator TSTM-G is replaced by a Petri net model generator PNM-G which stores the generated Petri net model in the Petri net model store PNM-S. The Petri net model simulator PNM-Sim takes over the structure of the Petri net model (place, transitions and edges) with the associated parameters such as edge addresses and stochastic rates and the net's initial marking which is stored in an internal marking store MSt, and simulates the Petri net based on the initial marking in an analog manner to how TSTM-Sim in FIG. 3b simulates a time-continuous Markow chain based on the starting state. The PNM simulator loads respectively the current marking from the marking store MSt, selects the transition to be fired according to the Monte-Carlo principle and writes the resultant sequential marking back into the marking store. The firing transitions are notified to the Petri net model command generator PNM-CG which loads and interprets the associated transition actions from the model store PNM-S. Commands to the SUT are sent as an output. Observed signals are read into buffer A as feedback, while the signal expected on the strength of simulation are stored by the Petri net model simulator PNM-Sim in buffer B. In this case, the comparer CMP is identical to that from FIG. 3b.

Whereas FIG. 4a shows the test case generator according to the invention, which uses a Petri net model, FIG. 4b shows an embodiment of a possible Petri net test model that corresponds to the model from FIG. 3c in terms of its operational mode.

In the example net in FIG. 4b, the stochastic rates are noted as average durations at the transitions. Actions which are to be sent by the PNM-CG to the SUT are marked in the transition symbols. The two tokens in the places "A idle" and "B idle" first indicate that two telephone subscribers are inactive. Each of them can now spontaneously start to dial, since both dial transitions ("A dials" and "B dials") are activated. Both can also simultaneously dial. The average waiting time until a specific subscriber dials is 3600s. Assuming that the transition "B dials" fires, the token is removed from the "B idle" place, a token is placed in the "B dialing" place and the action block indicated in the "B dials" transition is sent by the PNM-CG to the SUT. Two transitions are now activated: "A dials" and "A free", i.e. either A also now starts to dial (this lasts on average 3600s) or he does not (in which case a normal set-up connection occurs on average after 7s). The banned edge from the place "A idle" to the transition "A not free" prevents the transition from being activated as long as A still does not dial. If however "A dials" fires and hence removes the token from "A idle", "A not free" is activated and "A free" deactivated because there is one flow edge from "A idle" to "A free". The net's simulation is continued analogously. The generated test cases exactly correspond to those as were generated in FIG. 3c.

The states of telephones A and B are no longer summarized here within an overall state, but are realized in individual places. In this manner, the Petri net model saves places. This advantage is not yet so apparent in the case of two telephones, but the greater the number of telephones simulated, the greater its effect. The number of places grows in a linear manner with the number of simulated subscribers, while an exponential increase of states is necessary in a Markow chain.

A further reduction in the model's size is achieved with "colored Petri nets" (CPN) or "colored stochastic Petri nets" (CSPN). The tokens of a colored Petri net can be individually distinguished. In the simplest case, the tokens can be imagined as having different colors, in which case there is for example a set of red, yellow, green and blue tokens. Edges might then have addresses in the form of "color x". A transition with two input edges that bear the address "color x" might only fire if the associated places contained tokens of the same color in the pre-range of the transition. Precisely these tokens would then be removed. The Petri net simulator would look for a consistent variable link in this situation, i.e. it would look for tokens in such a way that all the edge addresses "color x" with the same value of x, i.e. the same token color, would be identified, and only tokens of the selected color could activate the transition via the edge. If this fails for lack of existing tokens, the transition is deactivated. As far as activation is concerned, it therefore no longer just depends on the number of tokens in the places of the pre-range, but on the colors of the tokens as well.

In practice, a more general model that interprets the available colors as values of certain data types is used, whereby the data types are designated as color sets. In this way, "light blue", "sky blue" and "ink blue" might form the color set "blue" or 1, 6, 49 may be values of the color set "integer". A place in the colored Petri net may hold only tokens of a certain color set, which is then the color set of this place. Transitions may, on the other hand, be connected to places of differing color sets. Sets of variables as edge addresses control the selection of tokens since a consistent linking of the tokens values to the variables has to be found for them.

FIG. 8b shows this concept. The notation of a colored net is explained in FIG. 8b 1). The color sets belonging to the places are written here in italics next to the place. Tokens are directly represented by their colors (values). Two tokens can be seen here: an integer token and a token that forms a tupel composed of two integer values. This instance nevertheless only relates to a token that admittedly includes two fields for values. By analogy, the following are feasible: tupels with further fields and tupels that combine fields of different data types (flow comma numbers, text, smaller tupels etc.). The edge addresses comprise a list of tokens separated by commas; the values are replaced by variables in these tokens. "(x,y)" designates e.g. a bi-tupel token, "y,x" designates two integer tokens, "(x,y, 2(a,b,c)" describes a bi-tupel token and two tri-tupel tokens. Unaddressed edges are no longer permitted in colored nets and the addresses have to adapt structurally to the color set of the place connected to the edge (i.e. a tupel (a,b) may not for example be marked at an input or output edge of an integer place).

FIG. 8b 2) demonstrates how the process of firing takes its course in a colored net. Since the obligatory edge addresses already indicate the color set of a place, they are no longer marked at the places for greater clarity here. One of the variable links matching the edge addresses of the transition's input edges is first sought; these variable links activate the transition. If none is found, the transition is deactivated. In the example, two links x=2, y=1 and x=1, y=1 are, however, possible. During firing, one of them is randomly chosen, with each of the possible links being selected with equal probability. According to the selected link, the associated tokens are removed from the places via each input edge. In the example, the edge with the address x,y removes the two tokens 2 and 1 from the place at the far right. The address (y,x) at the left output edge now ensures that a new token with the value (1,2) is placed via this edge into the associated place at the bottom left, while by virtue of the address 2y, two tokens with the value 1 are stored by the right output edge in the associated place at the bottom right.

The advantage of the colored Petri nets becomes evident in FIG. 4c. This net has just 7 places instead of 11 in the non-colored net from FIG. 4b. Yet it realizes all the test cases that the non-colored net was able to generate as well, in fact it realizes even further test cases. First of all, it is striking that in this net, three telephones are stored as tokens in the place "Idle Phones". The net simulates all the test cases for three, as well as for more telephones, when a corresponding number of tokens is contained in the initial marking. A new place "Phone Book" again contains the same tokens as "Idle Phones" and controls the choice of the called subscriber. In contrast to the previous examples, this may also be the subscriber placing the call himself: the subscriber can dial his own number. All the subscribers whose number can be dialed are marked in this place. In the "A dials" transition, this number is only sampled, without the marking being altered (test edge). It is not difficult to treat, by means of an independent transition with another stochastic rate, the case in which a subscriber dials himself; but this was dispensed with in the example. The stochastic rate of the "A dials" transition was adapted to the number of subscribers and reduced to an average duration of 1200s, with the result that as in FIG. 4b, each individual subscriber starts a dialing attempt on average after 3600s. After dialing, the token corresponding to the dialing subscriber has been removed from the "Idle Phones" place, and a new tupel token with the values of the caller in the first component and of the called party in the second component has been stored in the place "A dialing B". For example, this might be the tupel (1,1), i.e. subscriber 1 calls himself. In this instance, the transition "B free" is deactivated: since a flow edge with the address "B" leads from "Idle Phones" to "B free" and the edge from "A dialing B" to "B free" through the edge address (A,B) inevitably links the value of B to the value 1 (second component of the token (1,1) in "A dialing B"), no token with the same value of B, i.e. 1, is found in "Idle Phones", because this token had after all been deducted from "A dials" during firing. Yet for precisely the same reason, the banned edge from "Idle Phones" to "B not free" does not have a prohibiting effect on the transition "B not free", because banned edges behave in exactly the opposite manner to flow edges. "B not free" is therefore activated and fires on average after 5s. Since A was linked to the first component of (1,1), a token with the value 1 is stored into the place "A busy tone", thereby simulating that subscriber 1 hears an engaged signal as is to be expected in a common telephone network. The subscriber then has no other choice than to replace the receiver after a short time and to rejoin the "Idle Phones". If on the other hand, a tupel (1,2) is in the place "A dialing B", the token value 2 is still available in "Idle Phones" and the transition "B free" is activated, while "B not free" is not activated (banned edge prevents activation). At the same time, the transition "A dials" is also activated, another subscriber can therefore begin a dialing attempt at any time, which also applies to the called party (e.g. 2 dials 1). Only if the transition "B free" has fired after a simulated set-up connection lasting on average 7 seconds is the called party removed from the "Idle Phones" place (unless he himself is already attempting dialing and hence activates "B not free") and a tupel token with the values of the successfully switched pair of subscribers is stored in "A ring tone, B ringing". The called party is not "idle" any more, although he himself has not yet performed any action; another caller would end in "A busy tone", i.e. he would hear an engaged signal. Based on this place, apart from new attempts at dialing by other subscribers, either called party B is now able to accept the call (transition "B answers" after 10s on average) or caller A hangs up (transition "B no reply" after an average of 20s). In the second instance, both subscribers are again placed into the place "Idle Phones" and a command "A: on hook" is sent by the PNM-CG to the SUT.

As can be seen, the net structure is much more simple than in a non-colored net and yet its powerfulness is far greater. Any large number of telephones can be controlled merely by adding tokens to "Idle Phones" and "Phone Book", without having to introduce further places or transitions. Such a test case generator based on a colored Petri net test model can be used for the first time to perform automatically test cases or test commands for passing through an operational test for a telecommunication system for a large number of simulated subscribers in an extremely short period of time.

The realization of stochastic firing, as shown in FIG. 8a 4), was also used in the two examples from FIGS. 4b and 4c for controlling the net's temporal progress. Since the ascertained transitional durations all comply with an exponential distribution, the ability to model real systems using this type of net is considerably restricted if as a result an analysis is also simplified. A behavior that is better approximated by a gamma distribution than by an exponential distribution is in reality observed for example for the duration of telephone conversations. Yet if other distributions of the transitional durations are allowed, the convenient analysis properties of stochastic Petri nets are lost.

The present invention proposes an arrangement in which the choice of transition and the temporal progress are separated. This arrangement is presented in FIG. 8b 3). Here, the same (non-colored) Petri net is represented at four different times. Here, the transition is no longer captioned with a stochastic rate or duration which would be used in such a net only for selecting the firing transition. The stochastic rate would be totally without meaning here for the temporal progress, since in this type of nets, transitions always fire in a timeless manner. Instead, place S2 is emphasized by a dual ring and is captioned with a time of 5s. S2 is a place with latency, i.e. waiting time.

In the example, T1 first fires at time 0s. No time elapses. In the second Fig, still at time 0s, a token has been stored by T1 into the place with latency S2. A token that is stored in S2 is "latent" for 5s, i.e. to an extent is not really present and hence is not activating for transition T2. This is unchanged until the point in time of 5s. The token's latency then ends and T2 is activated. T2 then fires without temporal progress and removes the token from S2.

The latency was a constant in this example. It can, however, also be indicated by a probability distribution and hence assume another value for each newly stored token. If several tokens are successively placed into the same latent place, their latencies individually apply from the moment of storage. A latent place therefore realizes a waiting queue net with an infinite number of operating stations which all have the same operating time given by the latency. If in FIG. 4c, the place "Idle Phones" is replaced by a place with 3600s latency, this value no longer needs to be adapted to the number of tokens, but more tokens (more subscribers) lead on their own to more dialing attempts per time unit, because every subscriber has his own latency. On the other hand, in common stochastic Petri nets such as FIG. 4c, a transition fires only as frequently as corresponds to its stochastic rate, regardless of how many tokens are available.

FIG. 4d shows the same Petri net as FIG. 4c with latency-encumbered places instead of time-encumbered transitions. The stochastic rates marked at the transitions only serve to determine the transitional firing sequence and hence the relative ratios in the firing frequency between the transitions, without generating a temporal advance. They are therefore designated here only as stochastic priorities. The temporal advance is completely contained within the latency-encumbered places. In this net, the waiting times correspond roughly to those from the net in FIG. 4c. The dwell time of a token in the place "A ring tone, B ringing" in FIG. 4d is for example exponentially distributed with a mean value of 6.67s (given by the expression ran_exp (6.67s) which symbolizes the callup of a random generator for the exponential distribution when determining latency). In FIG. 4c, the dwell time results from superposing the exponentially distributed firing durations of the two transitions "B answer" and "B no reply", which in turn yields an exponential distribution with rate=sum of both transition rates $(1/(10s)+1/(20s)=0.15/s)$ with a mean value $1/(0.15)=$ 6.67s (mean value=rate's reciprocal value). The duration between dialing attempts is simulated in FIG. 4d by a place "Start Call", in which a non-colored token is removed and placed back for the purpose of firing. Since the inserted token is latent, the transition can only fire again after the waiting time of on average 1200s. If the place "Idle Phones" had been executed as a latency-encumbered place, that token in "Idle Phones" which was selected as a called subscriber B would not be available for firing the transition "B free", if it were still latent.

The advantage of latency-encumbered places is that distributions other than the exponential distribution are available so as to model delays. On account of the stochastic priorities, if the temporal progress is disregarded, the Petri net itself continues to behave as a Markow chain (which is designated as an "embedded Markow chain"). This would not be the case if the choice of transitions were controlled by other types of distribution, and hence it would no longer be possible to perform analyses of the net in a great many instances.

In the embodiment of the operational test device shown in FIG. 4, fed-back changes in state can be used by the test system for error evaluation in the comparer CMP, as was explained in FIG. 3b. It must be assumed, however, in the embodiment shown in FIG. 4 that the test system's states, specified by the test commands, each exactly correspond to the current state of the Petri net (i.e. the places occupied by the tokens). If a test command does not result in the expected change in state within the SUT, the Petri nets and the test system do, however, come out of the synchronization so that the further generation of test commands can no longer result in reconstructable changes in state within the SUT and the test run must therefore be stopped. A loss of synchronization between state model and test system does of course mean that an error has been discovered in the SUT, and in some applications it may be sufficient to stop the test run once an error has been found. Yet it is desirable, in order to determine a mean time to failure (MTTF), to be able to continue testing after an error so as to measure a statistic of the error frequency. For this purpose, it is, however, necessary to feed information on the SUT state back to the state model.

The embodiment of the TCG according to the invention as shown in FIG. 5 represents such an improvement of the invention. FIG. 5a first shows the structure of a test case generator on the basis of Petri nets with feedback TCG-PNF. The PNM-simulator contains as an additional element a signal handler PNM-SH which receives and processes the observed signals. As well as the transition actions, the Petri net model conditions contains a code for the signal handler. This model-dependent code instructs the signal handler to place tokens into the marking store MSt in a manner dependent on the observed signals. The SUT's observed signals therefore immediately appear as tokens in certain synchronization places of the Petri net model in order to influence the firing of transitions there and to alter the sequence of simulation. In the Petri net model, suitable transitions and latency-encumbered places can now be used to decide whether the observed signal corresponds to the expected one and whether it was received at the right time. Otherwise an error output may take place as a transition action.

Such a net element of the Petri net according to the invention and which monitors whether a signal is received in good time is depicted in FIG. 8b 4). The Transition "Do Action & Start Timer" transmits a command to the SUT and stores a colored token in the latency-encumbered place "Timer" which has a deterministic latency t. At the same time, a token of the same value is stored in the place "Wait". A place "Observed signal" characterized in bold as a synchronization place serves to accept a colored token generated by the signal handler when a signal is received. The edge addresses "x" are intended to ensure that only suitable signals are accepted. If for example the ringing of the telephone is expected with the number 3, the signal handler has to generate a token with the value 3 if the corresponding signal is received by the SUT. If such a token is received within the latency time t and if it has the color matching the tokens in "Wait" and "Timer", the transition "On Time" is activated and fired. It must be borne in mind that clearing edges always clear all the tokens from a place whether they are latent or not. Only on the basis of these semantics is it also possible, in nets with latency-encumbered places, for the clearing edges to do justice to their actual sense of transforming an imprecisely known token into a well-defined token, since latent tokens might also belong to the undefined marking. If in other words "on Time" fires, the net has decided that the expected signal has been received in good time and that the timer token is deducted. But if the signal is not received, "on Time" is never activated, and instead the transition "Time out" fires after the latency of the token in "Timer" has elapsed. As a result, the net decides that the expect signal was not received in good time and a suitable transition action might print an error. A signal that is received too late subsequently remains in "Observed signal"; but it might also be immediately cleared by a further transition that is exactly active when no signal is expected (indicated by a further place).

FIG. 5b shows the Petri net from FIG. 4d with a synchronization in relation to the SUT, i.e. signals from the SUT are taken into consideration in the net. The net's structure is largely identical to that from FIG. 4d. There are, however, three synchronization places here: "busy tone", "ring tone" and "B ringing" which signal that subscriber A hears a busy tone or a ring tone or that subscriber B's telephone is ringing. Two latency-encumbered places "busy timer" and "ring timer" monitor with the above-described structure whether the signals are received in good time within 10s. "Ring timer" immediately expects here two signals, namely the ring tone at A and the ringing at B. Only if both signals are present as tokens and the values of the tokens correspond to the A or B subscriber does the transition "Ring Signals OK" fire. If on the other hand the "Ring timer" takes its course, the transition "Time out" fires which causes the A subscriber to hang up and uses the command "errormsg" to output an error message. The busy tone is processed in the same way. The clearing edges from the synchronization places to the transition "A dials" are also worth mentioning. They ensure that when a subscriber next attempts to dial another subscriber, all the associated tokens (and only these ones!) are cleared from earlier conversations. Since the clearing edges do not have any influence on the firing of the transition "A dials", it is irrelevant whether tokens are actually present or not.

A similar mechanism can be used to import automatically the operating means available for a test (telephones, base stations etc.) or their characteristics (e.g. the special services ordered by the simulated subscribers such as call forwarding, conference calls etc. that have to be individually released by the network operator in a GSM network for each subscriber) in the test Petri net in the form of tokens (auto-configuration). Before the simulation is started, the number, and in the case of colored Petri nets the identity, of the connected telephones in the net might for example be announced by the bidirectional interface BD-INT in that tokens (in the case of colored nets with the identities as a value) for the relevant telephones are stored into suitable places. If a service is released for a subscriber before or during simulation, a colored token with the subscriber's value might appear in a special synchronization place allocated to the service and containing a token for every subscriber that is allowed to use this service. A precondition for this is that the interface BD-INT supplies this information in the form of signals, be it independently for each change or on request by the Petri net.

FIG. 5c shows a detail from a colored net in which the identities of the telephones and the "Multiparty" and "Call Forwarding" services subscribed by them are stored in synchronization places in the form of colored tokens. In the transition "Setup Call", a call between two telephones is set up (in an extremely simplified form). The transition "Join" makes it possible to add a further subscriber to the formation of a three-party conference if the A subscriber (the one who had initiated the call) has subscribed the multiparty service. Otherwise, the call can only be completed by the transition "End Call". The net also makes it possible for individual subscribers to switch call forwarding to other subscribers, provided that they have subscribed this service. For the sake of clarity, the example net does not show how a subscriber or telephone system is supposed to react to a forwarded call.

The tokens kept in the bold synchronization places can be stored in the places by the signal handler PNM-SH before or during simulation if corresponding signals are supplied by the bidirectional interface BD-INT (autonomously or on request by the Petri net).

As explained with reference to FIGS. 4b and 5b, tokens are placed in an initial state such as in "Idle Phones" and "Phone Book" in order to start the generation of test commands. The transitions fire while the Petri net is being run by the Petri net model simulator PNM-Sim, and tokens are removed from places or added to other places, thereby obtaining new markings. A current "snap shot" while the Petri net is being run therefore exhibits a specific marking of the Petri net. When there is regular synchronization, the test system's external state corresponds to the test system's internal state.

To be able to specify any initial states or intermediate states, it would be desirable to be able to reset the internal states and the external states by means of the test commands. A further embodiment of the test case generator according to the invention, as shown in FIG. 6, makes such resetting possible.

FIG. 6 shows a test case generator, the PNM simulator of which contains a reset store RSt that is able to store temporarily "snap shots", i.e. current markings of the net, while the Petri net is being run. As indicated by an arrow from the PNM-Sim to the PNM-S, these snap shot markings can also be permanently included in the stored Petri net model. There are various reasons why it is beneficial to perform such a storage of markings and to be able to reset the net in these states in one step. If the net is to be started with different initial states, a library of the desired starting states can for example be constructed (e.g. to examine individually the test system's various services). If errors of the test system are discovered, the net can automatically record the marking in which the error was discovered, and the situation can be subsequently analyzed by a human tester by means of the snap shot. Finally, once a test system error has been discovered by the TCG, it is appropriate to transform both the test system and the Petri net model rapidly back into a defined state for the purpose of resynchronization.

When a reset operation is prompted by a corresponding test command (transition action), the Petri net command generator instructs the Petri net model simulator to load a snap shot marking from the reset store RSt and to reset the current marking to this snap shot marking. The Petri net is then shifted in one step back into the state when the snap shot was stored.

FIG. 7 shows an embodiment in which the embodiments of FIGS. 4, 5, 6 are combined, i.e. test commands are generated on the basis of the Petri net state model (FIG. 4), synchronization is performed with colored tokens (FIG. 5) and it is possible to reset to predetermined tokens (FIG. 6).

FIG. 7b shows a simple example in which reset commands are used—after synchronization places have made it possible to discover errors—to shift the net back into the initial state. Part of the net from FIG. 5b is depicted in FIG. 7b, supplemented by actions which see to storing and retrieving snap shot markings. First there is a non-colored place "Start", on the basis of which a banned edge prevents the firing of transition "A dials". Instead, the transition "Init" is activated. If it fires, the token is removed from "Start" and the current marking is stored, on the strength of the command "store 'start'" under the name "start" in the reset store. The snap shot marking "start" therefore no longer contains a token in the place "Start", with the result that the net can immediately fire the transition "A dials". Commands "reset 'start'" which reload the snap shot marking "start" are contained in the "time out" transitions which fire when signals from the SUT are not received in good time. The net is thereby restarted in the initial state. So that the SUT is also shifted into the initial state, all the available telephones (and not just those involved in this call) are hung up by means of the command "all: on hook".

Although the generation of test commands, synchronization and resetting were described specifically with reference to the embodiment for a telephone network, such a generation of test commands, such a feedback of changes in state for synchronization, and such resetting are not limited to testing a telephone network, though the effect is particularly advantageous here. Any test systems can be tested using the described operational test device and assisted by the Petri net model in order to determine the "mean-time-to-failure" values that are crucial for each acceptance test, regardless of the system to be tested.

With reference to FIG. 8c, a more detailed example of a Petri net is finally applied to a simple telephone network. Such representations of Petri nets can be displayed by a test case generator by using the editor shown in FIGS. 2a, 2b, before running the Petri net and while the Petri net is being run too.

In FIG. 8c, a Petri net model generator PNM-G is executed as an editor (NEXT) with which a model for a very simple telephone network was produced. Several windows are opened, including the main window with the editor functions and the top-most level of the Petri net model (NEXT—'dem'), a smaller window in which the transition "A calls B" is modeled as a Petri sub-net with a finer granularity (NEXT subsystem—'A calls B') and two dialog windows which show the contents of a place (NEXT Place) and a transition (NEXT transition). In this Petri net model generator, it is possible to structure the model hierarchically in that transitions can contain subnets; in this instance they are represented by the editor as rectangles filled in white. All the places connected to such subnet transitions are available in the subnet as an input/output place. A subnet is represented in its own window and may in turn contain subnets. In this way, a rather complex Petri net can also be portrayed in a concise manner, just as a complex software program is made clearer by dividing it into subprograms.

The stochastic priorities of the transitions, the test commands (action) to be sent to the SUT and possible predicates are not depicted in the net itself but in a window which can be opened by a click of the mouse for each transition so as to limit the information contained in the net representation to a manageable degree. Predicates are logical expressions which can be specified across the variables of the edge addresses and which have to be satisfied by an activating variable link so that the transition can fire (in the example, it is requested that a has to be unequal to b, i.e. the token b from "Phone Book" and the token a from "Inactive Subscribers" have to have different values, otherwise the transition "A dials B" does not fire). This transition sends as a test command the command "dial from=a to=b", i.e. the token a determines the caller who is to dial the number of the called party, represented by token b. When the command is executed, the variables a and b are replaced by the values of the tokens which are linked to these variables during firing. The transition fires with a stochastic priority which corresponds here to an exponential distribution with rate 1 ("Exponential Rate=1"). Deterministic priorities can also be chosen.

In the window containing information on a place, the place's capacity may be set to a finite or infinite value. The color which all the tokens must have in this place can be set in "Select type of place"; in the example, for the place "Connections", these are tokens of the color "Connection" which is defined as a bi-tupel of integers. The place is encumbered with a latency, since "Latency Expression" is active; the latency expression "_ran_exponential (15000)" describes a random number that is generated by a random generator for exponentially distributed numbers with a mean value of 15000. Each new token therefore receives a new random latency according to this distribution, with the latency being indicated here in ms. Finally, two tokens can be seen in the field "Tokens Contained", the active token (3,2) and the latent token (1,4). Both tokens (just like the place itself and each transition) have an ongoing identification number, here 1973 and 1965, which are used only for internal processing and are insignificant in Petri net semantics. The values 1,2,3 and 4 describe specific telephones in the test system; their call numbers do not need to be known in the model but need only be known to the command generator or the test case executor (INT, TCE), since only there is the finally formulated test command to be sent to the test system generated. Finally, the places window also contains a series of buttons via which new tokens can be defined ("New Token"), the values of tokens can be changed ("Edit Token"), specific tokens can be erased ("Delete Token") or all the tokens can be removed ("Delete All Tokens").

The structure of the depicted Petri net is simple and totally analog to the example represented in FIG. 4d, even though the example's specific implementation is not completely identical.

As described above, in the operational test device and the operational test method according to the invention, a test state model of the telephone network can therefore be generated, displayed or varied by means of an editor only on the basis of the hardware configuration, the possible states, the test commands needed for changing the state, and the traffic values (transitional probabilities or stochastic priorities). The state model simulator executes a randomly controlled simulation of the Petri net on the basis of the transitional priorities and the current marking. When a transition is fired, the text of a transition action is sent to the command generator which interprets the text as a command and transmits a corresponding test command to the test system.

This use of Petri nets for generating test commands or test cases therefore makes available an operational test device which can test a complex test system, for example a telephone network or a mobile telephone network, with test conditions that approximate the operating conditions actually encountered during operation. Operation is automated, thus making it possible to generate a large statistically significant number of test cases in an extremely short time. In consequence, the costs for an integration, system or acceptance test are reduced.

An embodiment of the operational test system will be described in the following, whereby the SUT relates to a general communication device KV, and the aforementioned test case generator TCG and the test device interface INT together form a test device TV. A hardware interruption of the communication devices electrical connection lines (hardware disturber) will be performed by means of the generated test commands.

FIG. 9 shows the general structure of a communication system KS with such a communication device KV and such a test device TV according to this embodiment (KV therefore corresponds to the system to be tested, and KV includes the test device interface and the test case generator).

The communication system KS comprises a communication device KV and a test device TV that are connected together. Selected components of the communication device, telephones $T_1$ to $T_n$ and transmission stations $UEV_1$ to $UEV_n$, are also shown in FIG. 9. $T_1$ and $T_2$ designate mobile telephones, whereas $T_3$ contains a conventional PSTN telephone. Transmission stations $UEV_1$ and $UEV_2$ are also mobile telephone transmission stations which can set up radiocommunication connections to mobile telephones. Transmission station $UEV_3$ may be a transmission station of another communication network or another device for transmitting data within a communication device according to the present invention. The communication device has to ensure, inter alia, that a called mobile telephone can be localized in the net so that if a mobile telephone moves out of a transmission station's catchment area during a call, the corresponding call can be passed on to another transmission station and certain user services can be activated. For the purpose of data exchange, the communication device is connected to the test device by means of which test programs (i.e. one or more sequences of test cases with test commands from the test case generator) and/or test instructions, i.e. test commands for testing the communication device, can be generated and executed.

In other words, in this embodiment, the described communication device KV is controlled with test commands which are generated on the basis of the state model by the test device TV, i.e. the TCG described above.

Figure 10:
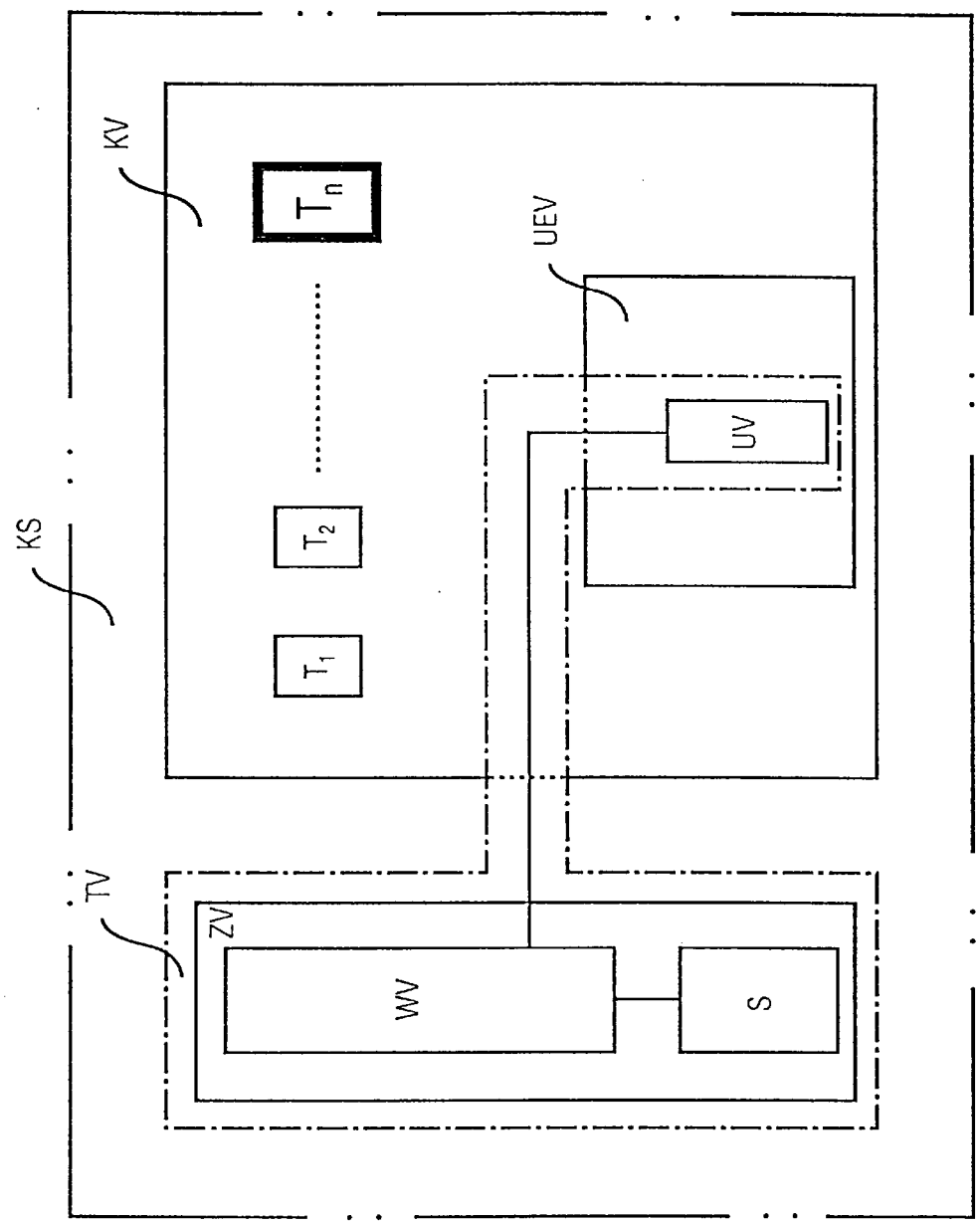

FIG. 10 shows a block diagram of another exemplary embodiment of a communications system according to the present invention. A test device TV comprises a central signal processing device ZV, arranged away from the communication device KV. The test device also comprises an interrupt device UV (i.e. a disturbance element already discussed above) which is arranged within a transmission station UEV of the communication device in order to be able to interrupt a plurality of electrical connection lines of the transmission station UEV systematically or with precise temporal specifications. The interrupt device UV is connected to a converter device WV arranged in the central signal processing device to receive operating signals. The converter device is connected to a programmable data processing device S. This data processing device S is the above-described test case generator TCG.

By means of the programmable data processing device S, test instructions can be automatically generated or interactively generated by an operator. The converter device converts the digital test signals generated in accordance with the test instructions into operating signals and transmits these operating signals to the interrupt device UV, through which individual electrical connection lines or groups of electrical connection lines within the transmission station can be interrupted in accordance with the operating signals for specific time intervals.

The effects of interruptions on the communication system are simultaneously established by e.g. manual dialing, speaking, activation of user services.

In another exemplary embodiment, effects of the interruptions can also be established via a polling station at the transmission station UEV.

Figure 11:
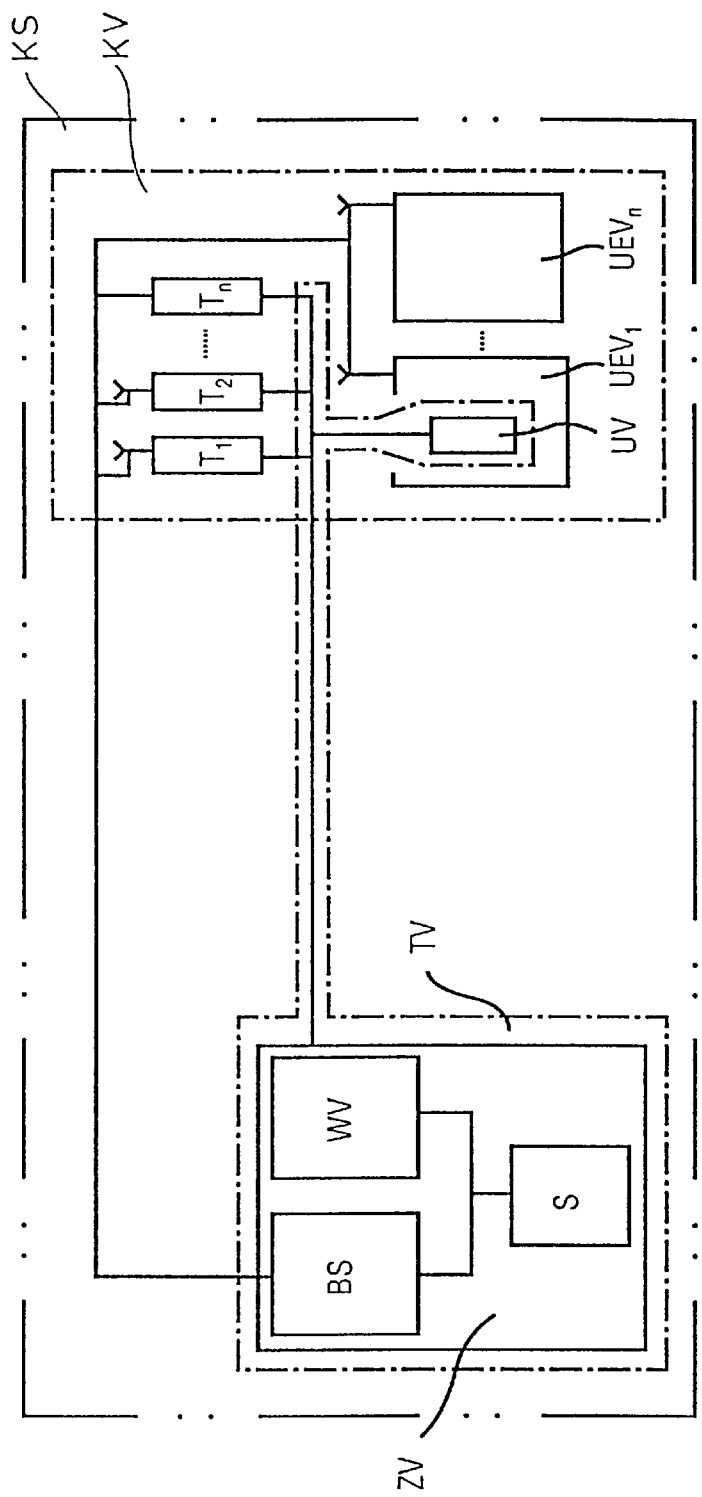

FIG. 11 shows another exemplary embodiment of a communication system according to the present invention. Connection or antenna cables of telephones $T_1$ to $T_n$ and transmission stations $UEV_1$ to $UEV_n$ are connected to a movement simulation circuit BS of the test device, making it possible to simulate or reproduce mobile telephone movements and air paths. The converter device is also connected to telephones $T_1$ to $T_n$ and to an interrupt device UV within the transmission station $UEV_1$ so as to control the telephones and interrupt device on the basis of operating signals and to receive response signals from the telephones (i.e. these operating response signals correspond to the test system's observed signals shown in FIGS. 5a et seq. and which are fed back to the test case generator for the Petri net TCG-PNF). The movement simulation circuit and converter device are each connected to the programmable data processing device S (test case generator).

During testing, test instructions (test commands) supplied by the programmable data processing device (i.e. test commands that are generated by the TCG on the basis of the state model) for operating the interrupt device, as already described by means of FIG. 10, as well as test instructions for the mobile telephones' simulated movement between transmission stations. The converter device also supplies operating signals for operating the telephones' keypads and microphones and receives response signals from the loudspeakers and call devices of the telephones.

Attention is drawn to the fact that the connection or antenna cables of the telephones and interrupt devices $UV_{1-n}$ do not have to be connected to the movement simulation circuit BS if no movement simulation is necessary. Additional interrupt devices $UV_{1-n}$ may be provided in one or more transmission stations $UEV_{1-n}$.

Figure 12:
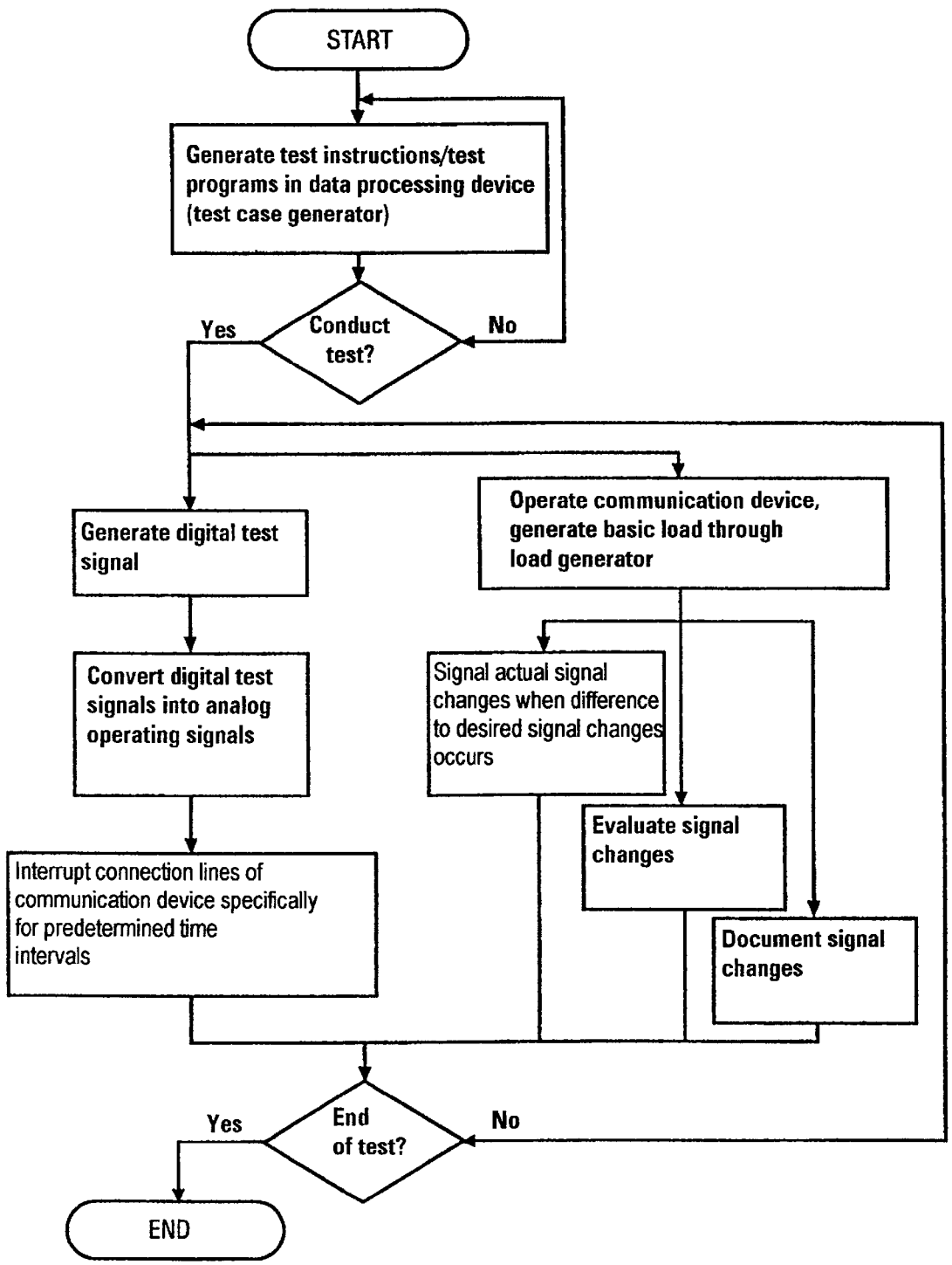
FIG. 12 shows a flow diagram of a test sequence.

FIG. 12 shows a flow diagram of a test process in a communication system according to FIG. 10. Instructions (commands) for testing the communication device are generated in the programmable data processing device S, or test instructions or test programs that are stored in a memory medium are called up and executed. If the execution of the test instructions/test programs is desired, digital test signals which are transmitted to the converter device WV and converted there into operating signals are generated by the programmable data processing device S. The operating signals control the interrupt device UV. One or more of the electrical connection lines within the transmission station UEV is/are therefore systematically interrupted for defined time intervals. At the same time, the communication device KV is manually operated, e.g. dialing, speaking. The function of the communication device KV is recorded or recorded data are automatically evaluated in the programmable data processing device S.

According to the communication system shown in FIG. 11, the net can also be automatically operated by controlling test instructions/test programs. In this instance, digital test signals generated by the TCG are converted by the data processing device S within the converter device WV into additional operating signals in order to operate the keypads and microphones of telephones $T_1$ to $T_n$. Operating signals, transmitted from the communication device KV via voice channels, from the loudspeakers, and operating signals from the call devices of the telephones within the converter device WV are also converted into digital operating response signals and are transmitted to the programmable data processing device S and recorded or evaluated there.

Identification signals which identify respective telephones participating in a call can be transmitted in a manner controlled by test instructions via the voice channels via the test device TV. For this purpose, a voice channel is set up between each pair of telephones of a plurality of telephones in a call involving two telephones or in a conference call involving three or more subscribers, and a pattern of tone pulses that clearly identifies a first telephone is transmitted via the voice channel based on the first telephone. The reception of the pattern of tone pulses transmitted via the voice channel is monitored in a second telephone participating in the call. The transmission of the pattern of tone pulses between the first and the second telephone takes place in the presence of voice compression and voice decompression, as is usual for example in GSM. The pattern of tone pulses is selected in such a way that it is also possible to identify the first telephone when the pattern of tone pulses is received at the second telephone if voice compression and voice decompression are used.

Figure 13:
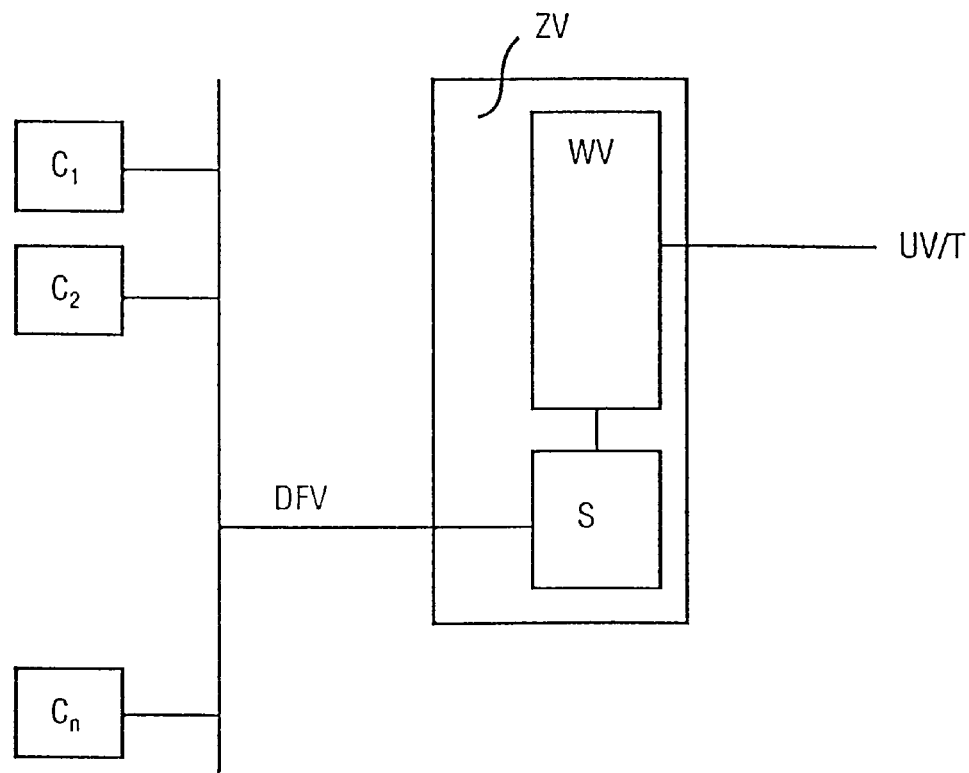
FIG. 13 shows a block diagram of part of a test device.

FIG. 13 shows a partial view of a test device according to the present invention. A plurality of external data processing devices or data display stations $C_1$ to $C_n$ is connected via a remote data transmission station DFV to the programmable data processing device S. The external programmable data processing devices $C_1$ to $C_n$ are clients, while the programmable data processing device S is a server. In the exemplary embodiment depicted, test instructions or test programs can be generated and/or executed on the external data processing devices.

FIG. 14 shows a flow diagram of a corresponding test process. Independent test programs or test instructions can be executed on one or more of the external data processing devices. The test instructions are transmitted by the external data processing devices via the remote data transmission station DFV to the programmable data processing device S (server) in a "client" process. In accordance with the instructions transmitted in the client process, the server S generates digital control signals that are transmitted to the converter device or to the movement simulation device in a "server" process.

Figure 15:
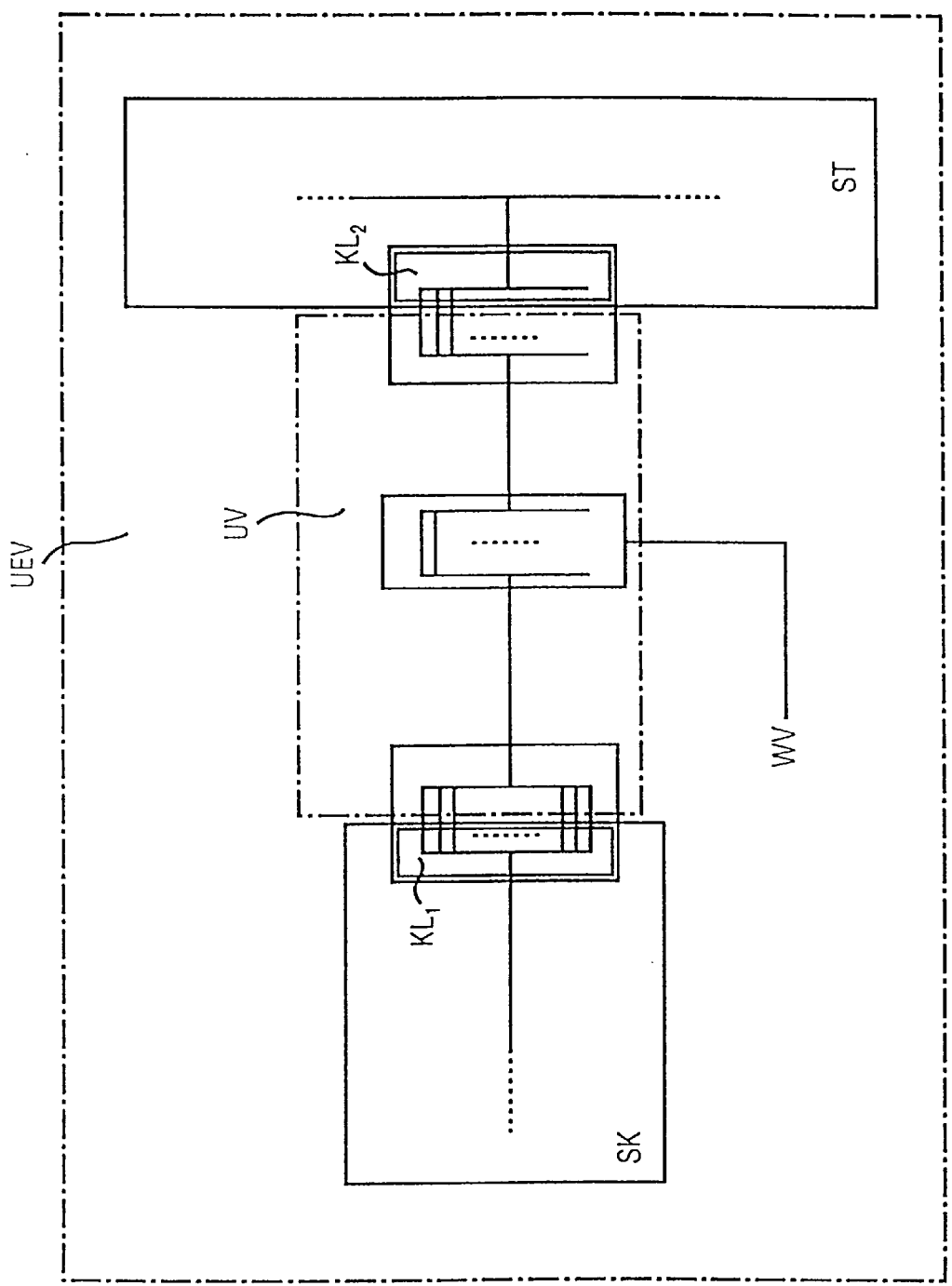
FIG. 15 shows a block diagram of an interrupt device arranged within a transmission station.

FIG. 15 shows a block diagram for the arrangement of an interrupt device according to the present invention in a transmission station. The interrupt device is interconnected between the contact strips $KL_1$ and $KL_2$ of a circuit card SK or of a circuit card carrier ST that are normally directly connected together. In this way, individual line connections between the circuit card carrier ST and circuit cards SK can be systematically interrupted for specific time intervals.

Unlike in the depicted exemplary embodiment, a plurality of circuit cards and numerous interrupt devices can also be provided in the transmission station.

Figure 16:
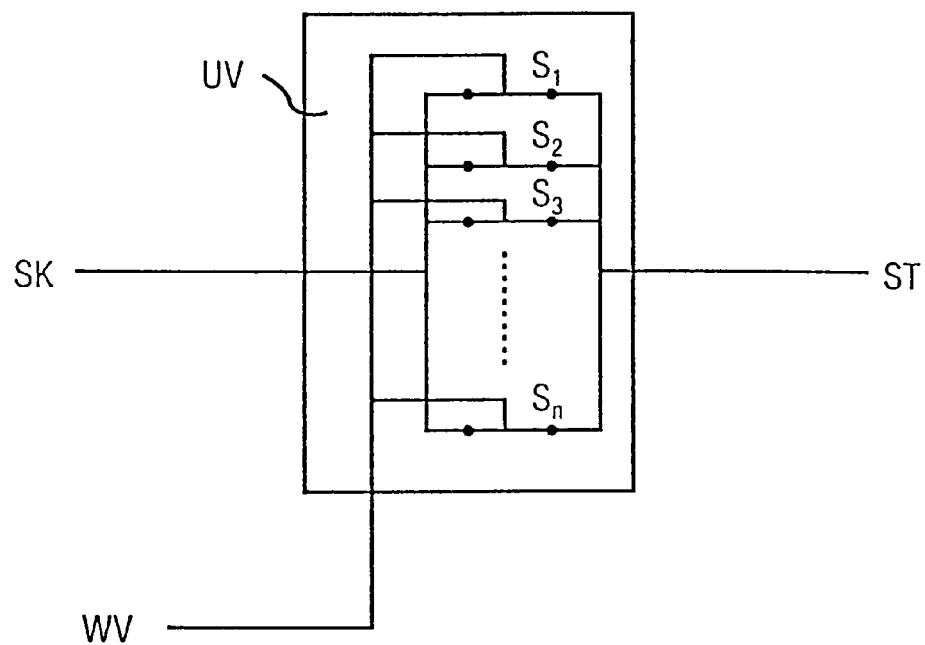
FIG. 16 shows a block diagram of part of an interrupt device.

FIG. 16 shows a further example of an interrupt device according to the present invention. A plurality of controllable switches is designated by $S_1$ to $S_n$. Individual or several of the switches can be opened by operating signals from the converter device WV for specific time intervals. In this way, connection lines between a circuit card and a circuit card carrier are interrupted.

Figure 17:
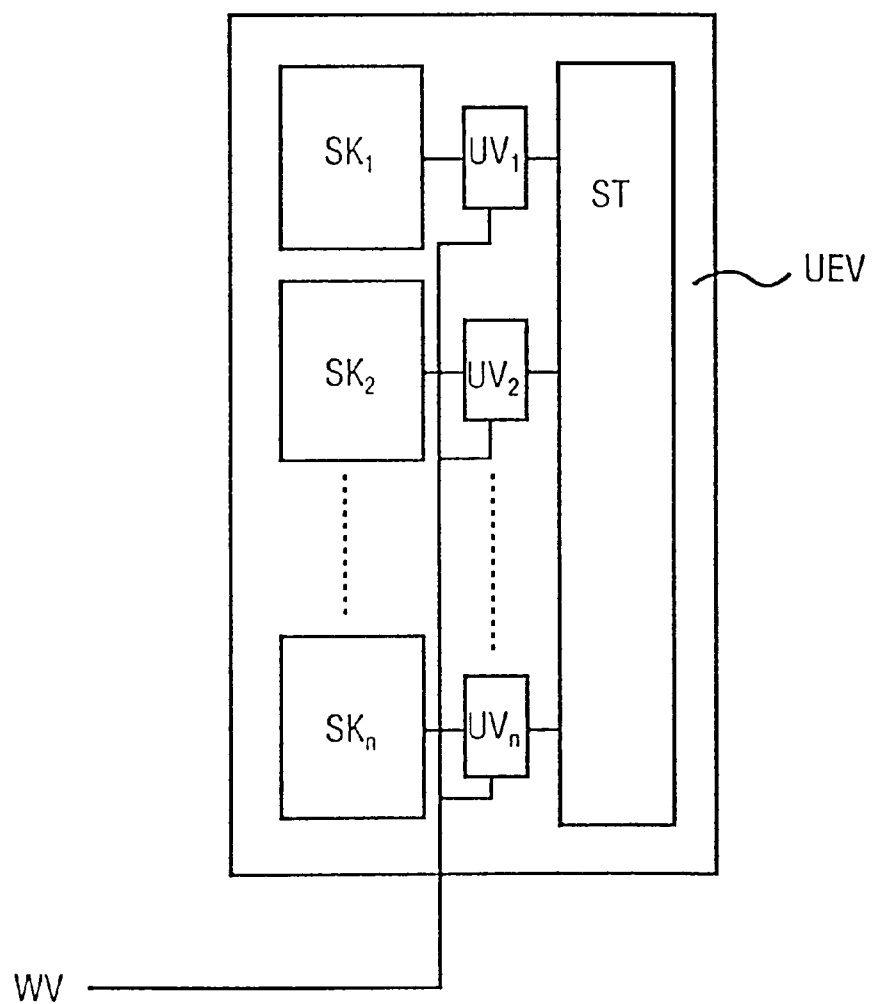
FIG. 17 shows an arrangement of a plurality of interrupt devices within a transmission station.

FIG. 17 shows another view of an arrangement of interrupt devices according to the present invention. The transmission station includes a plurality of circuit cards $SK_1$ to $SK_n$ that are connected to a circuit card carrier ST via a plurality of interrupt devices $UV_1$ to $UV_n$ each controllable by the converter device.

Figure 18:
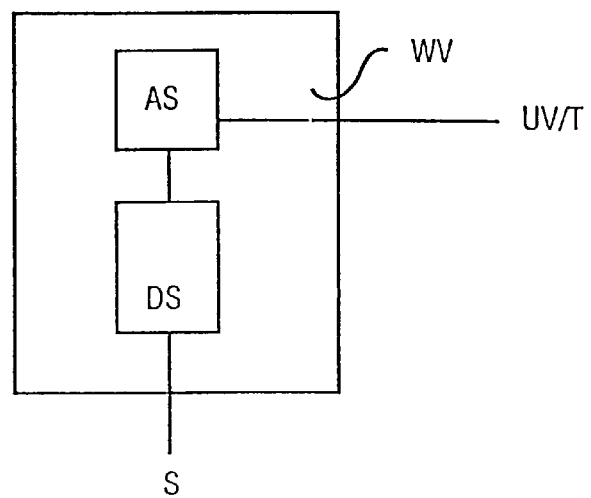
FIG. 18 shows an example of a converter device.

FIG. 18 shows an exemplary embodiment of a converter device WV according to the present invention. A digital control circuit DS is connected to a conversion circuit AS. The digital control circuit DS is fitted with logic circuits and memories in which special configuration files for telephones etc. are stored for transmission stations UEV in order to adapt converter device WV. The circuit is fitted with a logic and with filters necessary for generating operating signals. By using the configuration files stored in memory devices of the digital control circuit DS, test instructions received by the programmable data processing device S are converted by the digital control circuit DS into digital control signals which are transmitted to conversion circuit AS. In the conversion circuit, the digital control signals are converted into analog operating signals adapted to the respective target devices (telephones of various manufacturers, various types of transmission station) and which are then transmitted so as to operate interrupt devices UV in transmission stations UEV or are transmitted to selected telephones.

Figure 19:
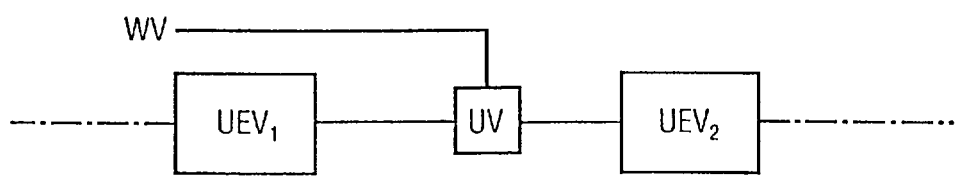
FIG. 19 shows an example of an arrangement of an interrupt device between transmission stations.

FIG. 19 shows an exemplary embodiment of part of a communication device KV according to the present invention. An interrupt device UV is arranged here in such a way that it can interrupt electrical connections between different transmission stations UEV. For this purpose, the interrupt device UV is arranged between two transmission stations UEV. In other exemplary embodiments, further interrupt devices UV can also be arranged between further transmission stations UEV.

Figure 20:
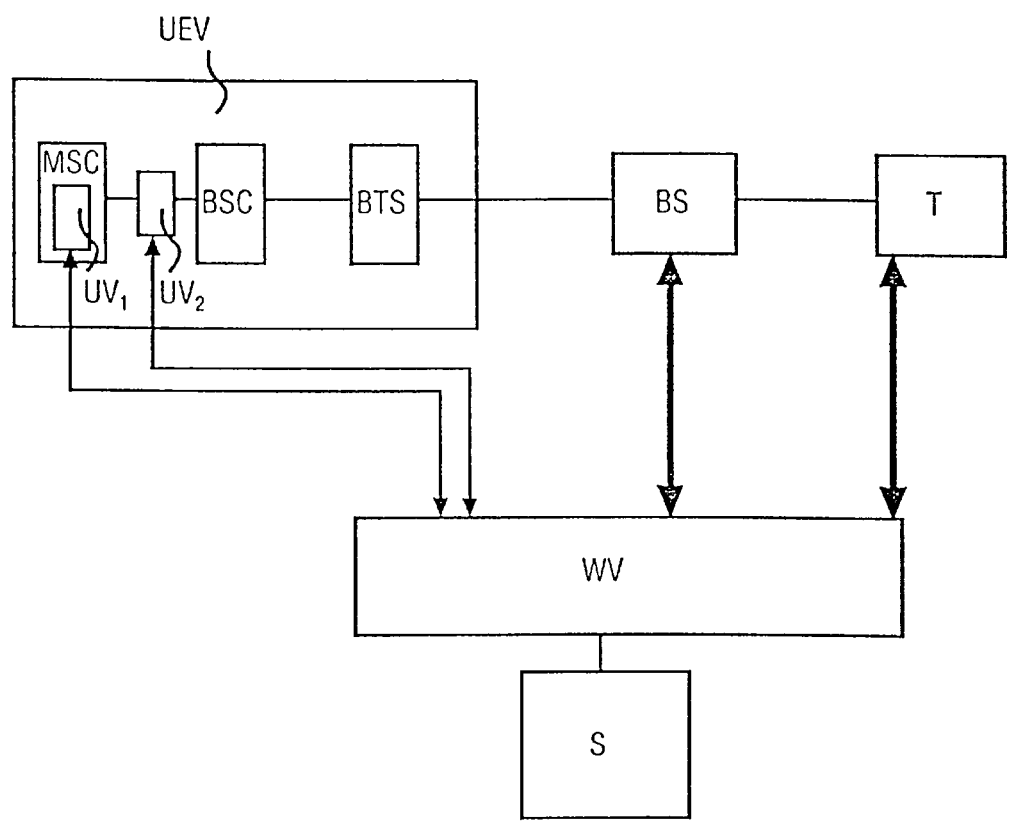
FIG. 20 shows a block diagram of a communications system.
Figure 21:
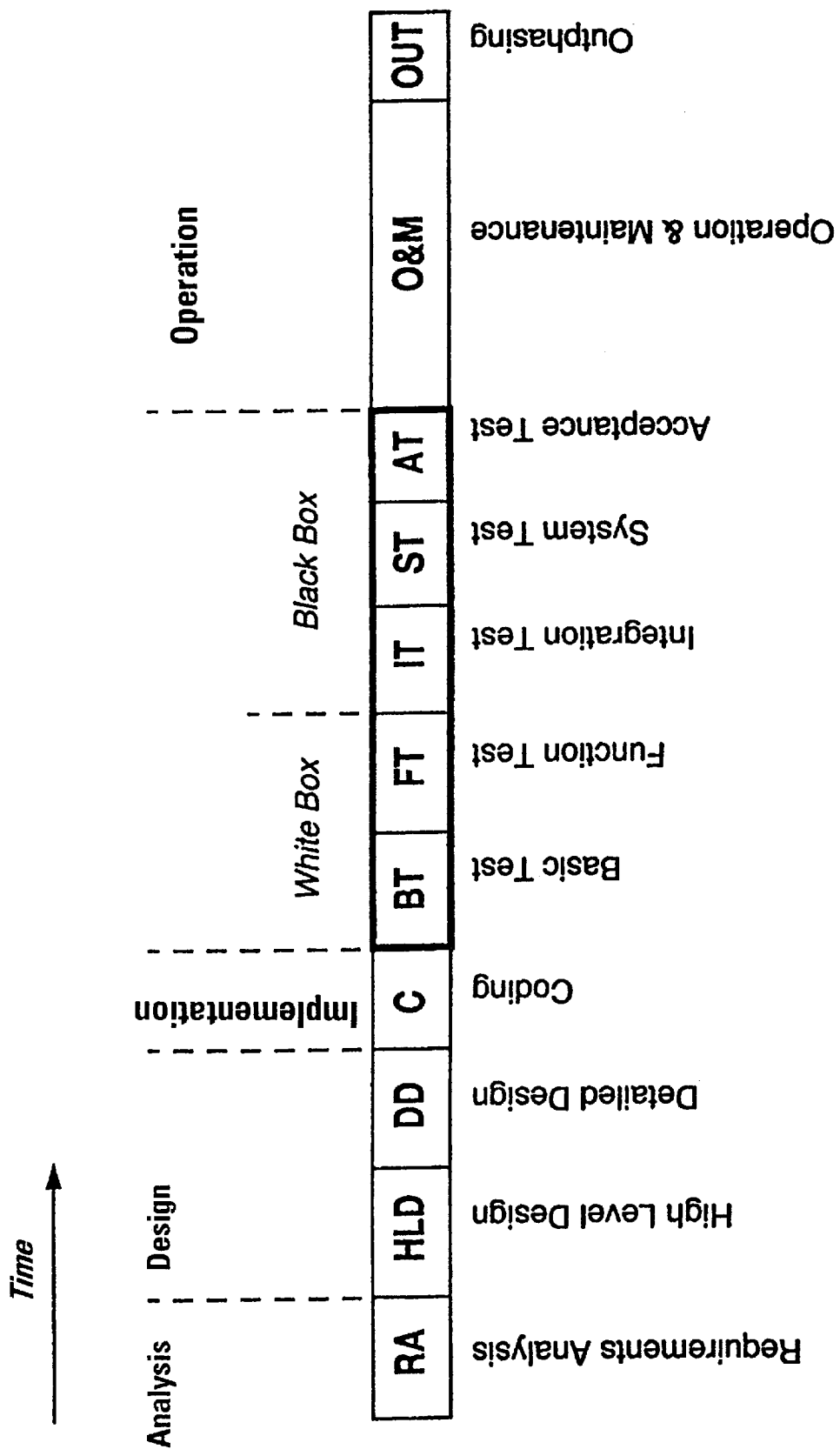
FIG. 21a shows a diagram that depicts the development process of a software product, particularly during the test phase.
FIG. 21b shows the structure of an actual mobile telephone network according to the GSM standard, and a minimum GSM test network that undergoes a load test, a disturbance test and a conformance test.
FIG. 21c shows a general representation of a test environment for automatically testing a test system in a black-box manner.

FIG. 20 shows a block diagram of another exemplary embodiment of a communication system according to the present invention. The transmission station UEV is a GSM transmission station that contains a mobile services switching center MSC, a base switching center BSC and a base transceiver station BTS for transmitting signals in the communication device KV. A movement simulation circuit BS is connected between a base transceiver station BTS and the mobile telephone T; this BS circuit simulates movements of the mobile telephone T in a manner controlled by the converter device WV. The telephone T and interrupt devices $UV_1$ and $UV_2$ are also connected to the converter device WV so as to be controlled by operating signals from the converter device WV, and to transmit response signals to the converter device WV. The converter device WV is controlled by a programmable data processing device S, as already described on the basis of FIG. 10.

The following designations are used in FIGS. 9–20:

| | |
|---|---|
| KS | a communication system, |
| KV | a communication device, |
| TV | a test device, |
| $UEV_{1-n}$ | a transmission station |
| S | a programmable data processing device of a central signal processing device (server), |
| WV | a converter device |
| $T_{1-n}$ | a telephone |
| $C_{1-n}$ | an external programmable data processing device |
| DFV | a remote data transmission device, |
| SK | a circuit card of the transmission station, |
| ST | a circuit card carrier of the transmission station |
| KL | a contact strip |
| DS | a digital control circuit and |
| AS | a conversion circuit |
| BS | a movement simulation circuit |
| ZV | a central signal processing device |
| MSC | a mobile services switching center |
| BSC | a base switching center |
| BTS | a base transceiver station |
| UV | an interrupt device (disturbance element) |

The embodiments in FIGS. 9–20 therefore describe examples for testing a telephone communication device, wherein test commands from which real operating signals are generated for controlling the interrupt hardware by means of a converter are generated by a test case generator TCG, i.e. by the data processing device. Just as generally shown in FIG. 5a et seq., the operating response signals can also be fed back to the test case generator for the purpose of synchronization or resetting. All the embodiments described with reference to FIGS. 1–8 are therefore applicable to the embodiments in FIGS. 9–20.

In FIGS. 1–8, the test case generator and the interface were regarded separately, but the interface can also be assigned to the test case generator. For example, the test case generator and the interface are combined into a test device TV in FIGS. 9–20, whereby the data processing device of the central signal processing device in turn takes over the test case generator function, and the other units such as converter device and interrupt device correspond to the interface.

The type of test system to which the operational test device and the method according to the invention are applied therefore merely depends on the interface INT or TCE used (the latter if the interface assumes more complex tasks such as load generation and it is thereby executed as a means for executing test cases (TCE)), which on account of the test commands converts the desired changes in state into actual signals within the test system and feeds them back to the test case generator in a manner corresponding to the changes in state.

We claim:

1. An operational test device for executing an operational test (LT, DT, CT) for a test system (SUT) that has operating states corresponding to a real operating system (SUT-RA) used in a real operating environment, under test conditions, comprising:
   a) a test case generator (TCG) for generating a number of test cases (TC) with test commands that are each intended to produce a desired change in operating state within said test system;
   b) a test device interface (INT) for receiving said test commands and for outputting corresponding operating signals to the test system (SUT) for bringing about said desired changes in operating state;
   c) said test case generator (TCG) comprising:
      a test state model generator (TSTS-G, PNM-G) for generating a test state model of the test system (SUT) from information on the hardware configuration of the test system (SUT), information on the possible operating states of said real operating system (SUT-RA), from traffic values that indicate transitional probabilities ascertained during the real application of said operating system (SUT-RA) for said operating states, and from the permitted test commands of the test system (SUT);
      a test state model store (TSTM-S, PNM-S) in which said test state model is stored;
      a test state model simulator (TSTM-Sim, PNM-Sim) that statistically passes through said test state model and in doing so generates desired operating state transitions; and
      a test state model command generator (TSTM-CG, PNM-CG) for successively generating the test commands of said test cases (TC) on the basis of said operating state transitions generated by said test state model simulator.

2. An operational test device according to claim 1, wherein
   said test state model command generator (TSTM-CG, PNM-CG) passes through said test state model in a Monte-Carlo simulation in a random manner, but according to natural statistical rules.

3. An operational test device according to claim 2, wherein
   said test device interface (INT) receives from said test system (SUT) operating response signals which each indicate a change in operating state executed in said test system as a response to the respective operating signal, and outputs corresponding operating response signals to said test case generator (TCG).

4. An operational test device according to claim 3, wherein
   said test case generator (TCG) includes a comparer (CMP), said test state model simulator (TSTM-Sim, PNM-Sim) generating expected operating response signals of said test system (SUT) on the basis of said state model and storing them in a store (buffer B), storing the operating response signals generated by said test system (SUT) in response to the successively transmitted test commands in a store (buffer A), said comparer (CMP) comparing the operating response signals observed by said test system with expected operating response signals generated during simulation, and generating an error output when said stored expected and observed operating response signals do not match.

5. An operational test device according to claim 2, wherein
   said test state model generator (TSTM-G) generates a test state model of the test system (SUT) on the basis of a Markow chain model.

6. An operational test device according to claim 2, wherein
   said test case generator (TCG) generates test commands that indicate a corresponding operational function to be executed by the test system (SUT) when there is a change in state within said test system.

7. An operational test device according to claim 2, wherein
   said test state model generator (PNM-G) generates a test state model of the test system (SUT) on the basis of a Petri net model (PNM).

8. An operational test device according to claim 2, wherein
   the test system (SUT) is a telephone network and/or a mobile telephone network.

9. An operational test device according to claim 8, wherein
   said test case generator (TCG) transmits test commands for performing a load test (LT) by means of a load test command generator (LT-TCE) to a switching center (MSC) and/or local switching center (BSC) of a mobile telephone network.

10. An operational test device according to claim 8, wherein
    said test case generator (TCG) generates test commands for a conformance test (CT) by means of a conformance test command generator (CT-TCE) which controls a series of mobile telephones (MS) and an air interface simulator (AIS), and generates in this manner the user traffic of a mobile telephone network.

11. An operational test device according to claim 8, wherein
    said test case generator (TCG) generates test commands for a disturbance test (DT) by means of a disturbance test command generator (DT-TCE) which can systematically interrupt or disrupt lines between the switching centers of a mobile telephone network and/or can render inoperative or disrupt components within a switching center computer.

12. An operational test device according to claim 8, wherein
    said mobile telephone network is a GSM mobile telephone network and said telephone network is a conventional public switched telephone network (PSTN).

13. An operational test device according to claim 7, wherein
    a) said test state model generator (TSTM-G) executed as a Petri net model generator (PNM-G) writes the generated Petri net state model of the test system (SUT) into a Petri net model store (PNM-S);
    b) said test state model simulator (TSTM-Sim, PNM-Sim) is a Petri net model simulator (PNM-Sim) that contains a Petri net marking store (MSt) used to store a current operating state of said Petri net;

c) said Petri net model simulator (PNM-Sim) reads the current state of said Petri net model from said Petri net marking store (MSt) as a current marking of all the places with tokens (●), reads the Petri net state model (PNM) of said test system (SUT) from said Petri net model store (PNM-S), selects in a randomly controlled manner one of the possible state transitions given by the current marking and the structure of said Petri net model, calculates the new marking resulting from this state transition and stores it as a current marking in the marking store (MSt); and d) said test state model command generator is a Petri net model command generator (PNM-CG) which is informed by said Petri net model simulator (PNM-Sim) about the performed transition, with the result that it loads from said Petri net model store (PNM-S) the corresponding test commands which constitute said generated test case, and passes them on to the test system (SUT).

14. An operational test device according to claim 13, wherein said test state model store (TSTM-S, PNM-S) is a Petri net model store (PNM-S) which is provided for storing
places (○) of said Petri net, said places indicating the possible operating states of individual operating means, services or components of said test system (SUT);
transitions (|) of said Petri net, said transitions describing the possible changes in state within said state model and including the operational function to be executed in the form of actions; and
edges (→) which connect places to transitions and transitions to edges and which indicate the conditions that have to be satisfied before or after a transition is switched, wherein these conditions are given by that marking of the places connected to the transition via edges which is necessary for said transition and results therefrom; and
an initial marking of the places of said Petri net state model (PNM), comprising tokens (●) that specify the model's initial state before starting the simulation or test case generation.

15. An operational test device according to claim 3, wherein a) said test state model generator (TSTM-G) executed as a Petri net model generator (PNM-G) writes the generated Petri net state model of said test system (SUT) into a Petri net model store (PNM-S);

b) said test state model simulator (TSTM-Sim, PNM-Sim) is a Petri net model simulator (PNM-Sim) that contains a Petri net marking store (MSt) used to store a current operating state of said Petri net;

c) said Petri net model simulator (PNM-Sim) reads the current state of said Petri net model from said Petri net marking store (MSt) as a current marking of all the places with tokens (●), reads the Petri net state model (PNM) of said test system (SUT) from said Petri net model store (PNM-S), selects in a randomly controlled manner one of the possible state transitions given by the current marking and the structure of said Petri net model, calculates the new marking resulting from this state transition and stores it as a current marking in the marking store (MSt);

d) said test state model command generator is a Petri net model command generator (PNM-CG) which is informed by said Petri net model simulator (PNM-Sim) about the performed transition, with the result that it loads from said Petri net model store (PNM-S) the corresponding test commands which constitute said generated test case, and passes them on to the test system (SUT); and said test case generator (TCG) further comprises:

a signal handler (PNM-SH) for receiving said operating response signals, for detecting a current change in state of the test system (SUT) from said operating response signals, and for outputting a current change in state in the form of tokens to said Petri net marking store (MSt) for synchronizing the current state of said Petri net to the current operating state of said test system (SUT).

16. An operational test device according to claim 15, wherein said test case generator (TCG) generates test commands that indicate a corresponding operational function to be executed by the test system (SUT) when there is a change in state within said test system; and when said operating response signals indicate not only the mere occurrence of a change in state but also an operational function executed when there is a change in state within the test system (SUT) in response to the outputting of said test command, said signal handler (PNM-SH) passes on to said Petri net marking store (MSt) not only the occurrence of a change in state but also a value (colored token) corresponding to said executed operational function for updating the current state for the purpose of synchronization.

17. An operational test device according to claim 14, wherein said signal handler (PNM-SH) generates from the information on the hardware configuration a number of tokens (●) which each indicate an operating means available within said test system or a state thereof (auto-configuration).

18. An operational test device according to claim 6, wherein said signal handler (PNM-SH) generates from the information on the hardware configuration a number of tokens (●) which each indicate an operating means available within said test system or a state thereof (auto-configuration); and said signal handler generates colored tokens (●) which indicate not only the presence of an operating means within said test system but also its identity in the form of a value.

19. An operational test device according to claim 17, wherein said Petri net model store (PNM-S) comprises a predetermined number of synchronization places (○), wherein a transition (|) connected to such a synchronization place (○) and if necessary to other places (○) via input edges can only be fired when said signal handler (PNM-SH) announces a change in state within the test system (SUT) via this synchronization place (○) within said Petri net state model in that on account of a response operating signal, said signal handler places a token into said synchronization place (○).

20. An operational test device according to claim 18, wherein said Petri net model store (PNM-S) comprises a predetermined number of synchronization places (○), wherein a transition (|) connected to such a synchronization place (o) and if necessary to other places (○) via input edges can only be fired when said signal handler (PNM-SH) announces a change in state within the test system (SUT) via this synchronization place (o) within said Petri net state model in that on account of a response operating signal, said signal handler places a token into said synchronization place (o); and said Petri net model store (PNM-S) comprises a predetermined number of colored synchronization places (o), wherein a transition (|) connected to such a colored synchronization site (o) and other colored sites (○) via input edges with edge addresses can only be fired when as a result of a response operating signal said signal handler (PNM-SH) places a colored token into said synchronization place (o), the value of which matches that of the tokens in all said colored places (○) that are connected via input edges of the same edge address to said transition (|).

21. An operational test device according to claim 14, wherein said Petri net model store (PNM-S) comprises a predetermined number of synchronization places (o), wherein a transition (|) connected to such a synchronization place (o) and if necessary to other places (○) via input edges can only be fired when said signal handler (PNM-SH) announces a change in state within said test system (SUT) via this synchronization place (o) within said Petri net state model in that on account of a response operating signal, said signal handler places a token into said synchronization place (o); and a place (○) or a synchronization place (o) is provided with a latency (ΔT) so that a token stored therein is activated only after a delay time (ΔT) predetermined by the latency expires, wherein the latency comprises a fixed or a random value given by a stochastic distribution and which varies from token to token according to this stochastic distribution, and wherein latencies realize either a real time interval (real time) or a simulated time interval (virtual or simulation time).

22. An operational test device according to claim 13, wherein a) a reset state store (RSt) is present that can store at least a marking of said Petri net as a reset state (snap shot); and b) said Petri net model simulator (PNM-Sim) comprises a reset means (RS) to read a reset state (snap shot) out of said reset store (RSt) and to reset the current state of said Petri net (i.e. the current marking) within said Petri net marking store (MSt) to said read-out reset state.

23. An operational test device according to claim 22, wherein at least one predetermined reset marking (snap shot) is stored in said reset state store (RSt) and said reset means (RS) sets the current distribution of the tokens in said Petri net marking store (MSt) to said reset distribution of tokens.

24. An operational test device according to claim 22, wherein said reset state store (RS) stores as reset states said Petri net's current markings (snap shots) which the Petri net assumes during simulation.

25. An operational test device according to claim 15, wherein said test case generator (TCG) generates test commands that indicate a corresponding operational function to be executed by said test system (SUT) when there is a change in state within said test system; and when said operating response signals indicate not only the mere occurrence of a change in state but also an operational function executed when there is a change in state within the test system (SUT) in response to the outputting of said test command, said signal handler (PNM-SH) passes on to said Petri net marking store (MSt) not only the occurrence of a change in state but also a value (colored token) corresponding to said executed operational function for updating the current state for the purpose of synchronization;

a) a reset state store (RSt) is present that can store at least a marking of said Petri net as a reset state (snap shot); and b) said Petri net model simulator (PNM-Sim) comprises a reset means (RS) to read a reset state (snap shot) out of said reset store (RSt) and to reset the current state of said Petri net (i.e. the current marking) within said Petri net marking store (MSt) to said read-out reset state; and when there is a lack of agreement between the current state of said test system (SUT) and the current state of said Petri net, said reset means (RS) resets the state of said Petri net to a reset state (snap shot) and test commands are simultaneously generated for resetting the test system (SUT) to a state corresponding to said reset state.

26. An operational test device according to claim 8, wherein said test state model store (TSTM-S, PNM-S) is a Petri net model store (PNM-S) which is provided for storing places (○) of said Petri net, said places indicating the possible operating states of individual operating means, services or components of said test system (SUT);

transitions (|) of said Petri net, said transitions describing the possible changes in state within said state model and including the operational function to be executed in the form of actions; and edges (→) which connect places to transitions and transitions to edges and which indicate the conditions that have to be satisfied before or after a transition is switched, wherein these conditions are given by that marking of the places connected to the transition via edges which is necessary for said transition and results therefrom; and an initial marking of the places of said Petri net state model (PNM), comprising tokens (●) that specify the model's initial state before starting the simulation or test case generation; and a) said tokens (●) represent the subscribers of the telephone network, connections between them, other network services used by them, and/or timers;

b) said places (○) indicate the states which can be assumed by said subscribers, connections between said subscribers, telephone network services used by said subscribers, or timers within said test system (SUT); and c) said transitions (|) represent operational functions by which said subscribers within said net can produce a change in state, or reflect changes in state of the subscribers themselves.

27. An operational test device according to claim 26, wherein said subscribers are telephones of a conventional telephone network (PSTN) or are mobile telephones of a mobile telephone network.

28. An operational test device according to claim 14, wherein
said transitions can fire with a deterministic priority or a stochastic priority, thus enabling both random and deterministic command sequences to be generated.

29. An operational test device according to claim 21, wherein
latency-encumbered places are used in real time for generating test cases and identifying errors for the test system (SUT) in that the simulation of latencies is performed in real time and delayed state transitions controlled in this manner by latencies in said Petri net model (PN) lead to corresponding delays in the state transitions of the test system (SUT), and the punctual occurrence of state changes in the test system (SUT), which by means of fed-back signals of the test system (SUT) is rendered identifiable in the form of tokens generated in synchronization places, is monitored by means of latency-encumbered places that are switched as timers in said Petri net model (PN).

30. An operational test device according to claim 2, wherein
said test state model is stored permanently or temporarily, i.e. during its simulation, within said test state model store (TSTM-S, PNM-S).

31. A method of executing an operational test (LT, DT, CT) for a test system (SUT) which has operating states corresponding to a real operating system (SUT-RA) used in a real operating environment, under test conditions, comprising the following steps:
a) generating a number of test cases (TC) with test commands which each indicate a predetermined change in operating state within said test system, having a test case generator (TCG);
b) receiving said test commands and outputting corresponding operating signals to said test system (SUT) for bringing about said predetermined changes in operating state via a test device interface (INT); and
c1) generating a state model of said test system from information on the hardware configuration of said test system (SUT), information on the possible operating states of said test system in a real application (SUT-RA), information on the test commands needed for bringing about changes in operating state within the test system (SUT), and from traffic values which indicate transitional probabilities ascertained in the test system's real application for said operating states, having a test state model generator (TSTM-G, PNM-G);
c2) successively generating randomly controlled state changes according to said transitional probabilities within said test state model (TSTM) having a test state model simulator (TSTM-Sim, PNM-Sim); and
c3) generating test commands of said test cases (TC) on the basis of said state transitions generated by said test state model simulator (TSTM-Sim) and the test commands linked to these state transitions in accordance with said test state model (TSTM, PNM) as a result of a test state model command generator (TSTM-CG, PNM-CG).

32. A method according to claim 31, wherein
said operating signals are outputted as a test device interface (INT) via a device for executing test cases (TCE).

33. An operational test device according to claim 1, wherein
a) the test system (SUT) is formed by a telephone communication device (KV) that contains a plurality of telephones ($T_1$ to $T_n$), particularly mobile telephones, a plurality of electrical connection lines, as well as at least one transmission station (UEV) for transmitting signals within said telephone communication device (KV); and
b) the test device interface (INT) and test case generator (TCG) form a test device (TV) for testing said telephone communication device (KV) in an operative load condition, said test device (TV) comprising:
b1) a central signal processing device (ZV) having
b11) at least one programmable data processing device (S) by which said test commands for testing said telephone communication device (KV) are supplied; and
b12) a converter device (WV) connected to said programmable data processing device (S) and designed to convert digital signals, generated by said programmable data processing device (S) by controlling said test commands, into said operating signals; and
b2) at least one interrupt device (UV) connected to said converter device (WV) and designed to interrupt systematically, in accordance with said operating signals, individual or groups of electrical connection lines for time intervals predetermined by said operating signals of said converter device (WV), wherein
b3) on account of said systematic interruptions in said telephone communication device (KV), signal changes are produced which can be signaled when there is a deviation from the associated reference signal changes.

34. An operational test device according to claim 33, wherein
individual or groups of electrical connection lines arranged within at least said one transmission station (UEV) and/or between different transmission stations (UEV) can be interrupted by said interrupt device (UV).

35. An operational test device according to claim 33, wherein
response signals obtained from said transmission station (UEV) by said converter device (WV) can be converted into digital operating response signals.

36. An operational test device according claim 1, wherein
said converter device (WV) is designed
to control operatively the keypads and microphones of said telephones ($T_n$) by said programmable data processing device (S) by controlling further test instructions; and
to convert response signals received from loudspeakers and call devices of said telephones ($T_n$) into digital operating response signals and to transmit them to said programmable data processing device (S) and to store them there.

37. An operational test device according to claim 1, wherein
said test device (TV) also comprises a connection device through which said converter device (WV) is connected to each of said telephones ($T_1$–$T_n$), and through which said operating signals are transmitted from said converter device (WV) to selected telephones ($T_n$) and response signals are transmitted from telephones ($T_n$) dialed by these signals or from said selected telephones ($T_n$) to said converter device (WV).

38. An operational test device according to claim 37, wherein said connection device comprises:
- an adapter on said telephone connected to the telephone's keypad, microphone, loudspeaker and call device; and
- a detachable connection line provided between said adapter on said telephone and said converter device.

39. An operational test device according to claim 1, wherein
said converter device (WV) comprises a storage device, and data specific to the telephone and/or specific to the transmission station are stored in configuration files of said memory device of said converter device (WV), thereby adapting said converter device (WV) to different telephones and/or transmission stations (UEV).

40. An operational test device according to claim 1, wherein
said programmable data processing device (S) of said central signal processing device (ZV) is connected via a remote data transmission device (DFV) to a plurality of external programmable data processing devices ($C_1$–$C_n$) and/or data display devices.

41. An operational test device according to claim 40, wherein
a local network (LAN) is provided for remote data transmission.

42. An operational test device according to claim 40, wherein
an internet connection is provided for remote data transmission.

43. An operational test device according to claim 1, wherein
said at least one interrupt device (UV) is arranged between contact strips (KL1) of at least one circuit card (SK) and contact strips (KL2) of a circuit card carrier (ST) of said transmission station (UEV).

44. An operational test device according to claim 43, wherein
a plurality of circuit cards is connected together in series and each comprises its own address, and that said circuit cards can be controlled via a single control line.

45. An operational test device according to claim 33, wherein
said at least one interrupt device (UV) is arranged on the respective front end of said circuit cards (SK) of said transmission station (UEV) connected to a circuit card carrier (ST).

46. An operational test device according to claim 1, wherein
said transmission station (UEV) is a GSM transmission station comprising a mobile services switching center (MSC), a base switching center (BSC) and a base transceiver station (BTS).

47. A method according to claim 31, wherein
said operational test (LT, DT, CT) is executed to test a test system (SUT) comprising a telephone communication device (KV) in an operative load condition, which contains a plurality of telephones ($T_1$–$T_n$), particularly mobile telephones, a plurality of electrical connection lines and at least one transmission station (UEV) for transmitting signals within said telephone communication device (KV), wherein
said test device interface (INT) and said test case generator (TCG) form a test device (TV) for testing said telephone communication device (KV) in a load condition; and
said method comprises the following steps:
- generating and executing said test commands with a programmable data processing device (S) of a central signal processing device (ZV) of said test device (TV) for testing said telephone communication device (KV);
- transmitting digital test signals generated according to said test commands to a converter device (WV) and converting said digital test signals into operating signals for systematically interrupting at least one electrical connection line of said plurality of electrical connection lines;
- transmitting said operating signals from said converter device (WV) to an interrupt device (UV) and operationally controlling said interrupt device (UV) according to said operating signals to interrupt at least one electrical connection line for time intervals predetermined by said operating signals,
- comparing the actual signal changes produced on account of said systematic interruptions with the associated reference signal changes and
- signaling deviations of said actual signal changes from said reference signal changes.

48. A method according to claim 47, wherein the following steps are provided:
- operationally controlling the keypads and microphones of said telephones by means of said converter device (WV) by controlling further test commands; and
- receiving response signals from loudspeakers and call devices of said telephones and converting said response signals into digital operating signals, and transmitting said digital operating response signals to said programmable data processing device (S).

49. A method according to claim 47, wherein the following steps are provided:
- setting up a voice channel between each pair of telephones of a plurality of telephones ($T_1$ to $T_n$) in a call involving two parties or a conference call involving three or more participants;
- on the basis of said first telephone, repeatedly transmitting with a predetermined frequency via said voice channel a pattern of tone pulses that clearly identifies said first telephone;
- having a second telephone participating in the call monitor the reception of said first telephone's pattern of tone pulses transmitted via said voice channel;
- wherein the transmission of said pattern of tone pulses between said first and second telephones includes voice compression and voice decompression; and
- said pattern of tone pulses being selected such that an identification of said first telephone is possible when said pattern of tone pulses is received at said second telephone if voice compression and voice decompression are used.

50. A method according to one of the claims 47, wherein the following steps are provided:
- transmitting operating signals from said converter device (WV) to telephones selected according to said test commands via a connection device; and
- transmitting response signals of dialed telephones to said converter device via said connection device.

51. A method according to claim 47 wherein
data are transmitted via a remote data transmission device (DFV) between said programmable data processing device (S) of said test device (TV) and a plurality of external programmable data processing devices ($C_1$–$C_n$) and/or data display devices.

52. An operational test device for executing an operational test (LT, DT, CT) for a test system (SUT) that has operating states corresponding to a real operating system (SUT-RA) used in a real operating environment, under test conditions, comprising:
   a) a test case generator (TCG) for generating a number of test cases (TC) with test commands that are each intended to produce a desired change in operating state within said test system;
   b) a test device interface (INT) for receiving said test commands and for outputting corresponding operating signals to the test system (SUT) for bringing about said desired changes in operating state;
   c) said test case generator (TCG) comprising:
      a test state model generator (TSTS-G, PNM-G) for generating a test state model of the test system (SUT) from information on the hardware configuration of the test system (SUT), information on the possible operating states of said real operating system (SUT-RA), from traffic values that indicate transitional probabilities ascertained during the real application of said operating system (SUT-RA) for said operating states, and from the permitted test commands of the test system (SUT);
      a test state model store (TSTM-S, PNM-S) in which said test state model is stored;
      a test state model simulator (TSTM-Sim, PNM-Sim) that statistically passes through said test state model and in doing so generates desired operating state transitions;
      a test state model command generator (TSTM-CG, PNM-CG) for successively generating the test commands of said test cases (TC) on the basis of said operating state transitions generated by said test state model simulator; and
   d) wherein said test device interface (INT) receives from said test system (SUT) operating response signals which each indicate a change in operating state executed in said test system as a response to the respective operating signal, and outputs corresponding operating response signals to said test case generator (TCG).

53. An operational test device for executing an operational test (LT, DT, CT) for a test system (SUT) that has operating states corresponding to a real operating system (SUT-RA) used in a real operating environment, under test conditions, comprising:
   a) a test case generator (TCG) for generating a number of test cases (TC) with test commands that are each intended to produce a desired change in operating state within said test system;
   b) a test device interface (INT) for receiving said test commands and for outputting corresponding operating signals to the test system (SUT) for bringing about said desired changes in operating state;
   c) said test case generator (TCG) comprising:
      a test state model generator (TSTS-G, PNM-G) for generating a test state model of the test system (SUT) from information on the hardware configuration of the test system (SUT), information on the possible operating states of said real operating system (SUT-RA), from traffic values that indicate transitional probabilities ascertained during the real application of said operating system (SUT-RA) for said operating states, and from the permitted test commands of the test system (SUT);
      a test state model store (TSTM-S, PNM-S) in which said test state model is stored;
      a test state model simulator (TSTM-Sim, PNM-Sim) that statistically passes through said test state model and in doing so generates desired operating state transitions;
      a test state model command generator (TSTM-CG, PNM-CG) for successively generating the test commands of said test cases (TC) on the basis of said operating state transitions generated by said test state model simulator; wherein
   d) said test device interface (INT) receives from said test system (SUT) operating response signals which each indicate a change in operating state executed in said test system as a response to the respective operating signal, and outputs corresponding operating response signals to said test case generator (TCG); and
   e) said test case generator (TCG) includes a comparer (CMP), said test state model simulator (TSTM-Sim, PNM-Sim) generating expected operating response signals of said test system (SUT) on the basis of said state model and storing them in a store (buffer B), storing the operating response signals generated by said test system (SUT) in response to the successively transmitted test commands in a store (buffer A), said comparer (CMP) comparing the operating response signals observed by said test system with expected operating response signals generated during simulation, and generating an error output when said stored expected and observed operating response signals do not match.

54. An operational test device for executing an operational test (LT, DT, CT) for a test system (SUT) that has operating states corresponding to a real operating system (SUT-RA) used in a real operating environment, under test conditions, comprising:
   a) a test case generator (TCG) for generating a number of test cases (TC) with test commands that are each intended to produce a desired change in operating state within said test system;
   b) a test device interface (INT) for receiving said test commands and for outputting corresponding operating signals to the test system (SUT) for bringing about said desired changes in operating state;
   c) said test case generator (TCG) comprising:
      a test state model generator (TSTS-G, PNM-G) for generating a test state model of the test system (SUT) from information on the hardware configuration of the test system (SUT), information on the possible operating states of said real operating system (SUT-RA), from traffic values that indicate transitional probabilities ascertained during the real application of said operating system (SUT-RA) for said operating states, and from the permitted test commands of the test system (SUT);
      a test state model store (TSTM-S, PNM-S) in which said test state model is stored;
      a test state model simulator (TSTM-Sim, PNM-Sim) that statistically passes through said test state model and in doing so generates desired operating state transitions;
      a test state model command generator (TSTM-CG, PNM-CG) for successively generating the test commands of said test cases (TC) on the basis of said operating state transitions generated by said test state model simulator; wherein d) said test state model command generator (TSTM-CG, PNM-CG) passes through said test state model in a Monte-Carlo simulation in a random manner, but according to natural statistical rules; and e) said test state model generator (PNM-G) generates a test state model of the test system (SUT) on the basis of a Petri net model (PNM).

55. An operational test device for executing an operational test (LT, DT, CT) for a test system (SUT) that has operating states corresponding to a real operating system (SUT-RA) used in a real operating environment, under test conditions, comprising:

a) a test case generator (TCG) for generating a number of test cases (TC) with test commands that are each intended to produce a desired change in operating state within said test system;

b) a test device interface (INT) for receiving said test commands and for outputting corresponding operating signals to the test system (SUT) for bringing about said desired changes in operating state;

c) said test case generator (TCG) comprising:
a test state model generator (TSTS-G, PNM-G) for generating a test state model of the test system (SUT) from information on the hardware configuration of the test system (SUT), information on the possible operating states of said real operating system (SUT-RA), from traffic values that indicate transitional probabilities ascertained during the real application of said operating system (SUT-RA) for said operating states, and from the permitted test commands of the test system (SUT);
a test state model store (TSTM-S, PNM-S) in which said test state model is stored;
a test state model simulator (TSTM-Sim, PNM-Sim) that statistically passes through said test state model and in doing so generates desired operating state transitions;
a test state model command generator (TSTM-CG, PNM-CG) for successively generating the test commands of said test cases (TC) on the basis of said operating state transitions generated by said test state model simulator; wherein d) said test state model command generator (TSTM-CG, PNM-CG) passes through said test state model in a Monte-Carlo simulation in a random manner, but according to natural statistical rules; and e) the test system (SUT) is a telephone network and/or a mobile telephone network.

56. An operational test device for executing an operational test (LT, DT, CT) for a test system (SUT) that has operating states corresponding to a real operating system (SUT-RA) used in a real operating environment, under test conditions, comprising:

a) a test case generator (TCG) for generating a number of test cases (TC) with test commands that are each intended to produce a desired change in operating state within said test system;

b) a test device interface (INT) for receiving said test commands and for outputting corresponding operating signals to the test system (SUT) for bringing about said desired changes in operating state;

c) said test case generator (TCG) comprising:
a test state model generator (TSTS-G, PNM-G) for generating a test state model of the test system (SUT) from information on the hardware configuration of the test system (SUT), information on the possible operating states of said real operating system (SUT-RA), from traffic values that indicate transitional probabilities ascertained during the real application of said operating system (SUT-RA) for said operating states, and from the permitted test commands of the test system (SUT);
a test state model store (TSTM-S, PNM-S) in which said test state model is stored;
a test state model simulator (TSTM-Sim, PNM-Sim) that statistically passes through said test state model and in doing so generates desired operating state transitions;
a test state model command generator (TSTM-CG, PNM-CG) for successively generating the test commands of said test cases (TC) on the basis of said operating state transitions generated by said test state model simulator; wherein d) said test state model command generator (TSTM-CG, PNM-CG) passes through said test state model in a Monte-Carlo simulation in a random manner, but according to natural statistical rules;

e) the test system (SUT) is a telephone network and/or a mobile telephone network; and f) said test case generator (TCG) transmits test commands for performing a load test (LT) by means of a load test command generator (LT-TCE) to a switching center (MSC) and/or local switching center (BSC) of a mobile telephone network.

57. An operational test device for executing an operational test (LT, DT, CT) for a test system (SUT) that has operating states corresponding to a real operating system (SUT-RA) used in a real operating environment, under test conditions, comprising:

a) a test case generator (TCG) for generating a number of test cases (TC) with test commands that are each intended to produce a desired change in operating state within said test system;

b) a test device interface (INT) for receiving said test commands and for outputting corresponding operating signals to the test system (SUT) for bringing about said desired changes in operating state;

c) said test case generator (TCG) comprising:
a test state model generator (TSTS-G, PNM-G) for generating a test state model of the test system (SUT) from information on the hardware configuration of the test system (SUT), information on the possible operating states of said real operating system (SUT-RA), from traffic values that indicate transitional probabilities ascertained during the real application of said operating system (SUT-RA) for said operating states, and from the permitted test commands of the test system (SUT);
a test state model store (TSTM-S, PNM-S) in which said test state model is stored;
a test state model simulator (TSTM-Sim, PNM-Sim) that statistically passes through said test state model and in doing so generates desired operating state transitions;
a test state model command generator (TSTM-CG, PNM-CG) for successively generating the test commands of said test cases (TC) on the basis of said operating state transitions generated by said test state model simulator; wherein d) said test state model command generator (TSTM-CG, PNM-CG) passes through said test state model in a Monte-Carlo simulation in a random manner, but according to natural statistical rules;

e) the test system (SUT) is a telephone network and/or a mobile telephone network; and f) said test case generator (TCG) generates test commands for a conformance test (CT) by means of a conformance test command generator (CT-TCE) which controls a series of mobile telephones (MS) and an air interface simulator (AIS), and generates in this manner the user traffic of a mobile telephone network.

58. An operational test device for executing an operational test (LT, DT, CT) for a test system (SUT) that has operating states corresponding to a real operating system (SUT-RA) used in a real operating environment, under test conditions, comprising:

a) a test case generator (TCG) for generating a number of test cases (TC) with test commands that are each intended to produce a desired change in operating state within said test system;

b) a test device interface (INT) for receiving said test commands and for outputting corresponding operating signals to the test system (SUT) for bringing about said desired changes in operating state;

c) said test case generator (TCG) comprising:
 a test state model generator (TSTS-G, PNM-G) for generating a test state model of the test system (SUT) from information on the hardware configuration of the test system (SUT), information on the possible operating states of said real operating system (SUT-RA), from traffic values that indicate transitional probabilities ascertained during the real application of said operating system (SUT-RA) for said operating states, and from the permitted test commands of the test system (SUT);
 a test state model store (TSTM-S, PNM-S) in which said test state model is stored;
 a test state model simulator (TSTM-Sim, PNM-Sim) that statistically passes through said test state model and in doing so generates desired operating state transitions;
 a test state model command generator (TSTM-CG, PNM-CG) for successively generating the test commands of said test cases (TC) on the basis of said operating state transitions generated by said test state model simulator; wherein d) said test state model command generator (TSTM-CG, PNM-CG) passes through said test state model in a Monte-Carlo simulation in a random manner, but according to natural statistical rules;

e) the test system (SUT) is a telephone network and/or a mobile telephone network; and f) said test case generator (TCG) generates test commands for a disturbance test (DT) by means of a disturbance test command generator (DT-TCE) which can systematically interrupt or disrupt lines between the switching centers of a mobile telephone network and/or can render inoperative or disrupt components within a switching center computer.

59. An operational test device for executing an operational test (LT, DT, CT) for a test system (SUT) that has operating states corresponding to a real operating system (SUT-RA) used in a real operating environment, under test conditions, comprising:

a) a test case generator (TCG) for generating a number of test cases (TC) with test commands that are each intended to produce a desired change in operating state within said test system;

b) a test device interface (INT) for receiving said test commands and for outputting corresponding operating signals to the test system (SUT) for bringing about said desired changes in operating state;

c) said test case generator (TCG) comprising:
 a test state model generator (TSTS-G, PNM-G) for generating a test state model of the test system (SUT) from information on the hardware configuration of the test system (SUT), information on the possible operating states of said real operating system (SUT-RA), from traffic values that indicate transitional probabilities ascertained during the real application of said operating system (SUT-RA) for said operating states, and from the permitted test commands of the test system (SUT);
 a test state model store (TSTM-S, PNM-S) in which said test state model is stored;
 a test state model simulator (TSTM-Sim, PNM-Sim) that statistically passes through said test state model and in doing so generates desired operating state transitions;
 a test state model command generator (TSTM-CG, PNM-CG) for successively generating the test commands of said test cases (TC) on the basis of said operating state transitions generated by said test state model simulator; wherein d) said test state model command generator (TSTM-CG, PNM-CG) passes through said test state model in a Monte-Carlo simulation in a random manner, but according to natural statistical rules;

e) said test state model generator (PNM-G) generates a test state model of the test system (SUT) on the basis of a Petri net model (PNM);

f) said test state model generator (TSTM-G) executed as a Petri net model generator (PNM-G) writes the generated Petri net state model of the test system (SUT) into a Petri net model store (PNM-S);

g) said test state model simulator (TSTM-Sim, PNM-Sim) is a Petri net model simulator (PNM-Sim) that contains a Petri net marking store (MSt) used to store a current operating state of said Petri net;

h) said Petri net model simulator (PNM-Sim) reads the current state of said Petri net model from said Petri net marking store (MSt) as a current marking of all the places with tokens (●), reads the Petri net state model (PNM) of said test system (SUT) from said Petri net model store (PNM-S), selects in a randomly controlled manner one of the possible state transitions given by the current marking and the structure of said Petri net model, calculates the new marking resulting from this state transition and stores it as a current marking in the marking store (MSt); and i) said test state model command generator is a Petri net model command generator (PNM-CG) which is informed by said Petri net model simulator (PNM-Sim) about the performed transition, with the result that it loads from said Petri net model store (PNM-S) the corresponding test commands which constitute said generated test case, and passes them on to the test system (SUT).

60. An operational test device for executing an operational test (LT, DT, CT) for a test system (SUT) that has operating states corresponding to a real operating system (SUT-RA) used in a real operating environment, under test conditions, comprising:

a) a test case generator (TCG) for generating a number of test cases (TC) with test commands that are each intended to produce a desired change in operating state within said test system;

b) a test device interface (INT) for receiving said test commands and for outputting corresponding operating signals to the test system (SUT) for bringing about said desired changes in operating state;

c) said test case generator (TCG) comprising:

a test state model generator (TSTS-G, PNM-G) for generating a test state model of the test system (SUT) from information on the hardware configuration of the test system (SUT), information on the possible operating states of said real operating system (SUT-RA), from traffic values that indicate transitional probabilities ascertained during the real application of said operating system (SUT-RA) for said operating states, and from the permitted test commands of the test system (SUT);

a test state model store (TSTM-S, PNM-S) in which said test state model is stored;

a test state model simulator (TSTM-Sim, PNM-Sim) that statistically passes through said test state model and in doing so generates desired operating state transitions;

a test state model command generator (TSTM-CG, PNM-CG) for successively generating the test commands of said test cases (TC) on the basis of said operating state transitions generated by said test state model simulator; wherein d) said test state model command generator (TSTM-CG, PNM-CG) passes through said test state model in a Monte-Carlo simulation in a random manner, but according to natural statistical rules;

e) said test state model generator (PNM-G) generates a test state model of the test system (SUT) on the basis of a Petri net model (PNM);

f) said test state model generator (TSTM-G) executed as a Petri net model generator (PNM-G) writes the generated Petri net state model of the test system (SUT) into a Petri net model store (PNM-S);

g) said test state model simulator (TSTM-Sim, PNM-Sim) is a Petri net model simulator (PNM-Sim) that contains a Petri net marking store (MSt) used to store a current operating state of said Petri net;

h) said Petri net model simulator (PNM-Sim) reads the current state of said Petri net model from said Petri net marking store (MSt) as a current marking of all the places with tokens (●), reads the Petri net state model (PNM) of said test system (SUT) from said Petri net model store (PNM-S), selects in a randomly controlled manner one of the possible state transitions given by the current marking and the structure of said Petri net model, calculates the new marking resulting from this state transition and stores it as a current marking in the marking store (MSt);

i) said test state model command generator is a Petri net model command generator (PNM-CG) which is informed by said Petri net model simulator (PNM-Sim) about the performed transition, with the result that it loads from said Petri net model store (PNM-S) the corresponding test commands which constitute said generated test case, and passes them on to the test system (SUT);

j) said test state model store (TSTM-S, PNM-S) is a Petri net model store (PNM-S) which is provided for storing places (○) of said Petri net, said places indicating the possible operating states of individual operating means, services or components of said test system (SUT);

transitions (|) of said Petri net, said transitions describing the possible changes in state within said state model and including the operational function to be executed in the form of actions; and edges (→) which connect places to transitions and transitions to edges and which indicate the conditions that have to be satisfied before or after a transition is switched, wherein these conditions are given by that marking of the places connected to the transition via edges which is necessary for said transition and results therefrom; and an initial marking of the places of said Petri net state model (PNM), comprising tokens (●) that specify the model's initial state before starting the simulation or test case generation.

61. An operational test device for executing an operational test (LT, DT, CT) for a test system (SUT) that has operating states corresponding to a real operating system (SUT-RA) used in a real operating environment, under test conditions, comprising:

a) a test case generator (TCG) for generating a number of test cases (TC) with test commands that are each intended to produce a desired change in operating state within said test system;

b) a test device interface (INT) for receiving said test commands and for outputting corresponding operating signals to the test system (SUT) for bringing about said desired changes in operating state;

c) said test case generator (TCG) comprising:

a test state model generator (TSTS-G, PNM-G) for generating a test state model of the test system (SUT) from information on the hardware configuration of the test system (SUT), information on the possible operating states of said real operating system (SUT-RA), from traffic values that indicate transitional probabilities ascertained during the real application of said operating system (SUT-RA) for said operating states, and from the permitted test commands of the test system (SUT);

a test state model store (TSTM-S, PNM-S) in which said test state model is stored;

a test state model simulator (TSTM-Sim, PNM-Sim) that statistically passes through said test state model and in doing so generates desired operating state transitions;

a test state model command generator (TSTM-CG, PNM-CG) for successively generating the test commands of said test cases (TC) on the basis of said operating state transitions generated by said test state model simulator; wherein d) said test state model command generator (TSTM-CG, PNM-CG) passes through said test state model in a Monte-Carlo simulation in a random manner, but according to natural statistical rules;

e) said test device interface (INT) receives from said test system (SUT) operating response signals which each indicate a change in operating state executed in said test system as a response to the respective operating signal, and outputs corresponding operating response signals to said test case generator (TCG);

f) said test state model generator (TSTM-G) executed as a Petri net model generator (PNM-G) writes the generated Petri net state model of said test system (SUT) into a Petri net model store (PNM-S);

g) said test state model simulator (TSTM-Sim, PNM-Sim) is a Petri net model simulator (PNM-Sim) that contains a Petri net marking store (MSt) used to store a current operating state of said Petri net;

h) said Petri net model simulator (PNM-Sim) reads the current state of said Petri net model from said Petri net marking store (MSt) as a current marking of all the places with tokens (●), reads the Petri net state model (PNM) of said test system (SUT) from said Petri net model store (PNM-S), selects in a randomly controlled manner one of the possible state transitions given by the current marking and the structure of said Petri net model, calculates the new marking resulting from this state transition and stores it as a current marking in the marking store (MSt);

i) said test state model command generator is a Petri net model command generator (PNM-CG) which is informed by said Petri net model simulator (PNM-Sim) about the performed transition, with the result that it loads from said Petri net model store (PNM-S) the corresponding test commands which constitute said generated test case, and passes them on to the test system (SUT); and wherein said test case generator (TCG) further comprises:
a signal handler (PNM-SH) for receiving said operating response signals, for detecting a current change in state of the test system (SUT) from said operating response signals, and for outputting a current change in state in the form of tokens to said Petri net marking store (MSt) for synchronizing the current state of said Petri net to the current operating state of said test system (SUT).

62. An operational test device for executing an operational test (LT, DT, CT) for a test system (SUT) that has operating states corresponding to a real operating system (SUT-RA) used in a real operating environment, under test conditions, comprising:

a) a test case generator (TCG) for generating a number of test cases (TC) with test commands that are each intended to produce a desired change in operating state within said test system;

b) a test device interface (INT) for receiving said test commands and for outputting corresponding operating signals to the test system (SUT) for bringing about said desired changes in operating state;

c) said test case generator (TCG) comprising:
a test state model generator (TSTS-G, PNM-G) for generating a test state model of the test system (SUT) from information on the hardware configuration of the test system (SUT), information on the possible operating states of said real operating system (SUT-RA), from traffic values that indicate transitional probabilities ascertained during the real application of said operating system (SUT-RA) for said operating states, and from the permitted test commands of the test system (SUT);
a test state model store (TSTM-S, PNM-S) in which said test state model is stored;
a test state model simulator (TSTM-Sim, PNM-Sim) that statistically passes through said test state model and in doing so generates desired operating state transitions;
a test state model command generator (TSTM-CG, PNM-CG) for successively generating the test commands of said test cases (TC) on the basis of said operating state transitions generated by said test state model simulator; wherein d) said test state model command generator (TSTM-CG, PNM-CG) passes through said test state model in a Monte-Carlo simulation in a random manner, but according to natural statistical rules;

e) said test state model generator (PNM-G) generates a test state model of the test system (SUT) on the basis of a Petri net model (PNM);

f) said test state model generator (TSTM-G) executed as a Petri net model generator (PNM-G) writes the generated Petri net state model of the test system (SUT) into a Petri net model store (PNM-S);

g) said test state model simulator (TSTM-Sim, PNM-Sim) is a Petri net model simulator (PNM-Sim) that contains a Petri net marking store (MSt) used to store a current operating state of said Petri net;

h) said Petri net model simulator (PNM-Sim) reads the current state of said Petri net model from said Petri net marking store (MSt) as a current marking of all the places with tokens (●), reads the Petri net state model (PNM) of said test system (SUT) from said Petri net model store (PNM-S), selects in a randomly controlled manner one of the possible state transitions given by the current marking and the structure of said Petri net model, calculates the new marking resulting from this state transition and stores it as a current marking in the marking store (MSt);

i) said test state model command generator is a Petri net model command generator (PNM-CG) which is informed by said Petri net model simulator (PNM-Sim) about the performed transition, with the result that it loads from said Petri net model store (PNM-S) the corresponding test commands which constitute said generated test case, and passes them on to the test system (SUT);

j) said test state model store (TSTM-S, PNM-S) is a Petri net model store (PNM-S) which is provided for storing places (○) of said Petri net, said places indicating the possible operating states of individual operating means, services or components of said test system (SUT);
transitions (|) of said Petri net, said transitions describing the possible changes in state within said state model and including the operational function to be executed in the form of actions;
edges (→) which connect places to transitions and transitions to edges and which indicate the conditions that have to be satisfied before or after a transition is switched, wherein these conditions are given by that marking of the places connected to the transition via edges which is necessary for said transition and results therefrom;
an initial marking of the places of said Petri net state model (PNM), comprising tokens (●) that specify the modells initial state before starting the simulation or test case generation;

k) said signal handler (PNM-SH) generates from the information on the hardware configuration a number of tokens (●) which each indicate an operating means available within said test system or a state thereof (auto-configuration); and l) said Petri net model store (PNM-S) comprises a predetermined number of synchronization places (○), wherein a transition (|) connected to such a synchronization place (○) and if necessary to other places (○) via input edges can only be fired when said signal handler (PNM-SH) announces a change in state within the test system (SUT) via this synchronization place (○) within said Petri net state model in that on account of a response operating signal, said signal handler places a token into said synchronization place (○).

63. An operational test device for executing an operational test (LT, DT, CT) for a test system (SUT) that has operating states corresponding to a real operating system (SUT-RA) used in a real operating environment, under test conditions, comprising:

a) a test case generator (TCG) for generating a number of test cases (TC) with test commands that are each intended to produce a desired change in operating state within said test system;

b) a test device interface (INT) for receiving said test commands and for outputting corresponding operating signals to the test system (SUT) for bringing about said desired changes in operating state;

c) said test case generator (TCG) comprising:

a test state model generator (TSTS-G, PNM-G) for generating a test state model of the test system (SUT) from information on the hardware configuration of the test system (SUT), information on the possible operating states of said real operating system (SUT-RA), from traffic values that indicate transitional probabilities ascertained during the real application of said operating system (SUT-RA) for said operating states, and from the permitted test commands of the test system (SUT);

a test state model store (TSTM-S, PNM-S) in which said test state model is stored;

a test state model simulator (TSTM-Sim, PNM-Sim) that statistically passes through said test state model and in doing so generates desired operating state transitions;

a test state model command generator (TSTM-CG, PNM-CG) for successively generating the test commands of said test cases (TC) on the basis of said operating state transitions generated by said test state model simulator; wherein d) said test state model command generator (TSTM-CG, PNM-CG) passes through said test state model in a Monte-Carlo simulation in a random manner, but according to natural statistical rules;

e) the test system (SUT) is a telephone network and/or a mobile telephone network;

f) said test state model store (TSTM-S, PNM-S) is a Petri net model store (PNM-S) which is provided for storing places (○) of said Petri net, said places indicating the possible operating states of individual operating means, services or components of said test system (SUT);

transitions (|) of said Petri net, said transitions describing the possible changes in state within said state model and including the operational function to be executed in the form of actions;

edges (→) which connect places to transitions and transitions to edges and which indicate the conditions that have to be satisfied before or after a transition is switched, wherein these conditions are given by that marking of the places connected to the transition via edges which is necessary for said transition and results therefrom;

an initial marking of the places of said Petri net state model (PNM), comprising tokens (●) that specify the model's initial state before starting the simulation or test case generation;

g) said tokens (●) represent the subscribers of the telephone network, connections between them, other network services used by them, and/or timers;

h) said places (○) indicate the states which can be assumed by said subscribers, connections between said subscribers, telephone network services used by said subscribers, or timers within said test system (SUT); and i) said transitions (|) represent operational functions by which said subscribers within said net can produce a change in state, or reflect changes in state of the subscribers themselves.

* * * * *